US010951337B2

(12) United States Patent
Hwang et al.

(10) Patent No.: US 10,951,337 B2
(45) Date of Patent: *Mar. 16, 2021

(54) METHOD AND APPARATUS FOR TRANSMITTING AND RECEIVING MULTIMEDIA SERVICE

(71) Applicants: Samsung Electronics Co., Ltd., Suwon-si (KR); UNIVERSITY OF SEOUL INDUSTRY COOPERATION FOUNDATION, Seoul (KR)

(72) Inventors: Sung-Oh Hwang, Yongin-si (KR); Yong-Han Kim, Seongnam-si (KR); Kyung-Mo Park, Seoul (KR); Sung-Ryeul Rhyu, Yongin-si (KR)

(73) Assignees: Samsung Electronics Co. Ltd, Suwon-si (KR); UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,352

(22) Filed: Dec. 2, 2019

(65) Prior Publication Data

US 2020/0106540 A1 Apr. 2, 2020

Related U.S. Application Data

(63) Continuation of application No. 13/651,716, filed on Oct. 15, 2012, now Pat. No. 10,498,473.

(Continued)

(30) Foreign Application Priority Data

Oct. 13, 2011 (KR) ........................ 10-2011-0104619

(51) Int. Cl.

*H04N 5/445* (2011.01)
*H04H 60/73* (2008.01)

(52) U.S. Cl.

CPC ......... *H04H 60/73* (2013.01); *H04H 2201/40* (2013.01)

(58) Field of Classification Search

CPC .... H04N 21/435; H04N 21/84; H04N 21/235; H04N 21/482; H04N 21/812;

(Continued)

(56) References Cited

U.S. PATENT DOCUMENTS 6,029,045 A 2/2000 Picco et al.
6,249,320 B1 6/2001 Schneidewend et al.

(Continued)

FOREIGN PATENT DOCUMENTS

CN 1918833 A 2/2007
CN 101939930 A 1/2011

(Continued)

OTHER PUBLICATIONS

A.J. Stienstra et al.,Technologies for DVB Services on the Internet, IEEE,Jan. 3, 2006,vol. 94 , Issue: 1 , Jan. 2006, pp. 228-236, IEL Online,URL,https://ieeexplore.ieee.org/stamp/stamp.jsp?tp=&arnumber=1566631.

(Continued)

*Primary Examiner* — Annan Q Shang
(74) *Attorney, Agent, or Firm* — Jefferson IP Law, LLP

(57) ABSTRACT

A method for receiving a multimedia service is provided. The method includes receiving service specific information for at least one multimedia service provided from different networks, selecting one service based on the service specific information, and receiving the selected service. The service specific information includes one of a first service map table including information about at least one service which is transmitted over a plurality of logical channels, and a second service map table including information about at least one service which is transmitted over a single logical channel.

(Continued)

Each of the first and second service map tables includes asset-related information.

3 Claims, 8 Drawing Sheets

Related U.S. Application Data

(60) Provisional application No. 61/671,923, filed on Jul. 16, 2012.

(58) Field of Classification Search
CPC ......... H04N 21/6125; H04N 21/47202; H04H 60/73; H04H 2201/40
See application file for complete search history.

(56) References Cited

U.S. PATENT DOCUMENTS

| | | | | |
|---|---|---|---|---|
| 6,496,856 | B1 * | 12/2002 | Kenner | G06F 16/40 709/218 |
| 6,728,101 | B2 | 4/2004 | Barsun | |
| 7,869,359 | B2 | 1/2011 | Kohler et al. | |
| 8,239,895 | B2 | 8/2012 | Park et al. | |
| 8,296,810 | B1 | 10/2012 | Everson et al. | |
| 8,302,129 | B2 | 10/2012 | Eyer | |
| 8,307,393 | B2 | 11/2012 | Song et al. | |
| 8,489,762 | B2 | 7/2013 | McGinn et al. | |
| 8,504,714 | B2 | 8/2013 | Suh et al. | |
| 8,638,818 | B2 | 1/2014 | Hwang et al. | |
| 2001/0016948 | A1 | 8/2001 | Longhorn et al. | |
| 2001/0047377 | A1 | 11/2001 | Sincaglia et al. | |
| 2003/0229900 | A1 | 12/2003 | Reisman | |
| 2005/0068977 | A1 | 3/2005 | Na et al. | |
| 2005/0083932 | A1 | 4/2005 | Lee et al. | |
| 2005/0273833 | A1 | 12/2005 | Soinio | |
| 2006/0253868 | A1 | 11/2006 | Ludvig et al. | |
| 2008/0031601 | A1 * | 2/2008 | Hashimoto | H04N 21/858 386/336 |
| 2008/0040743 | A1 | 2/2008 | Dharmaji | |
| 2008/0040762 | A1 | 2/2008 | Jung et al. | |
| 2008/0209482 | A1 | 8/2008 | Meek et al. | |
| 2008/0233909 | A1 | 9/2008 | Matsutani | |
| 2008/0256212 | A1 | 10/2008 | Girouard et al. | |
| 2008/0270913 | A1 | 10/2008 | Singer et al. | |
| 2008/0281448 | A1 | 11/2008 | Uhrig et al. | |
| 2008/0313692 | A1 | 12/2008 | Yun et al. | |
| 2009/0055867 | A1 | 2/2009 | Kim et al. | |
| 2009/0055875 | A1 | 2/2009 | Lee et al. | |
| 2009/0103651 | A1 | 4/2009 | Lahtonen et al. | |
| 2009/0150933 | A1 | 6/2009 | Lee et al. | |
| 2009/0151003 | A1 | 6/2009 | Moon et al. | |
| 2009/0165050 | A1 * | 6/2009 | Lee | H04N 21/64322 725/39 |
| 2009/0175218 | A1 * | 7/2009 | Song | H03M 13/356 370/328 |
| 2009/0178089 | A1 | 7/2009 | Picco et al. | |
| 2009/0288116 | A1 | 11/2009 | Zalewski | |
| 2009/0296624 | A1 * | 12/2009 | Ryu | H04H 20/72 370/312 |
| 2009/0319672 | A1 | 12/2009 | Reisman | |
| 2009/0320087 | A1 | 12/2009 | Song et al. | |
| 2010/0088717 | A1 | 4/2010 | Candelore et al. | |
| 2010/0120417 | A1 | 5/2010 | Walker et al. | |
| 2010/0156058 | A1 * | 6/2010 | Koyess | A43B 5/1616 280/11.12 |
| 2010/0186058 | A1 | 7/2010 | Suh et al. | |
| 2010/0199313 | A1 | 8/2010 | Rhim | |
| 2010/0306803 | A1 | 12/2010 | Ohbitsu | |
| 2011/0004892 | A1 | 1/2011 | Dharmaji | |
| 2011/0088064 | A1 | 4/2011 | Xiong | |
| 2011/0093895 | A1 | 4/2011 | Lee et al. | |
| 2011/0099579 | A1 | 4/2011 | Kim et al. | |
| 2011/0208829 | A1 | 8/2011 | Kwon et al. | |
| 2011/0238520 | A1 * | 9/2011 | Selley | G06Q 30/02 705/26.3 |
| 2012/0026409 | A1 * | 2/2012 | Higuchi | H04N 21/43615 348/734 |
| 2012/0137015 | A1 | 5/2012 | Sun | |
| 2013/0019288 | A1 | 1/2013 | Holmgren et al. | |
| 2013/0094545 | A1 * | 4/2013 | Park | H04L 65/607 375/219 |
| 2013/0133014 | A1 | 5/2013 | Kim | |
| 2014/0010154 | A1 * | 1/2014 | Hong | H04H 60/73 370/328 |
| 2014/0130114 | A1 | 5/2014 | Hwang et al. | |
| 2014/0351874 | A1 | 11/2014 | Yoo et al. | |
| 2014/0359667 | A1 | 12/2014 | Kilar et al. | |
| 2016/0031299 | A1 | 2/2016 | Ikeda et al. | |

FOREIGN PATENT DOCUMENTS

| | | | |
|---|---|---|---|
| EP | 1 838 018 | A2 | 9/2007 |
| EP | 2 251 995 | A1 | 11/2010 |
| JP | 2002-203070 | A | 7/2002 |
| JP | 2009-296607 | A | 12/2009 |
| JP | 2013-229689 | A | 11/2013 |
| KR | 10-2007-0051027 | A | 5/2007 |
| KR | 10-0800856 | B1 | 2/2008 |
| KR | 10-2009-0060928 | A | 6/2009 |
| KR | 10-2011-0066826 | A | 6/2011 |
| KR | 10-2011-0117033 | A | 10/2011 |
| KR | 10-2013-0032019 | A | 4/2013 |
| KR | 10-2013-0032842 | A | 4/2013 |
| TW | 200926704 | A | 6/2009 |
| WO | 2011/062386 | A2 | 5/2011 |

OTHER PUBLICATIONS

Japanese Notice of Allowance dated Dec. 3, 2019, issued in Japanese Application No. 2019-025695.

Chinese Office Action dated Feb. 3, 2020, issued in Chinese Application No. 201811093505.1.

ISO/IEC 13818-6, Information technology—Generic coding of moving pictures and associated audio information—Part 6: Extensions to DSM-CC, 1st Edition, Sep. 1, 1998.

ETSI TS 102 823 VI.1.1, Digital Video Broadcasting (DVB); Specification for the carriage of synchronized auxiliary data in DVB transport streams, Nov. 2005.

ISO/IEC 13818-1, Information technology—Generic coding of moving pictures and associated audio information—Part 1: Systems, 3rd Edition, Oct. 15, 2007.

ATSC Document A/65, "Program and System Information Protocol for Terrestrial Broadcast and Cable (PSIP)", Apr. 14, 2009, Washington, DC.

ISO/IEC JTC1/SC29/WG11 N11541, MPEG Media Transport (MMT) Context and Objective, Requirements Group, Jul. 2010, Geneva, Switzerland.

ISO/IEC JTC1/SC29/WG11 N11542, Use Cases for MPEG Media Transport (MMT), Requirements Group, Jul. 2010, Geneva, Switzerland.

ISO/IEC JTC1/SC29/WG11 N11540, Requirements on MPEG Media Transport (MMT), Requirements Group, Jul. 2010, Geneva, Switzerland.

ISO/IEC JTC1/SC29/WG11 m19266, Response to Call for Proposals for MPEG Media Transport, Samsung Electronics Co. Ltd, Jan. 2011, Daegu, Korea.

Park and Fernado, ISO/IEC JTC1/SC29/WG11 N12169, Working Draft of MPEG Media Transport, Jul. 2011, Torino, Italy.

Fernado, Park, and Lee, ISO/IEC JTC1/SC29/WG11 N12170, Technologies under Consideration (TuC) for MMT, Jul. 2011, Torino, Italy.

Youngkwon, Lim, Review of w11792, JCTVC-E JCTVC-E360-v3, Internet URL: http://phenix.it-sudparis.eu/jct/doc-end-user/documents/5_Geneva/wg11/JCTVC-E360-v3-zip, Mar. 1, 2011, pp. 23-27 (Newly cited reference).

ITU-T, International Standard 13818-1 ITU-T Recommendation H.222.0, May 27, 1999, pp. 31, 43, 46, 50 and 59.

(56) References Cited

OTHER PUBLICATIONS

Korean Office Action dated Jan. 11, 2019, issued in Korean Patent Application No. 10-2014-7012751.
European Search Report dated Apr. 17, 2019, issued in European Patent Application No. 19161146.6.
Korean Office Action dated Oct. 13, 2019, issued in Korean Patent Application No. 10-2014-7033934.

* cited by examiner

METHOD AND APPARATUS FOR TRANSMITTING AND RECEIVING MULTIMEDIA SERVICE

CROSS-REFERENCE TO RELATED APPLICATIONS

This application is a continuation application of prior application Ser. No. 13/651,716, filed on Oct. 15, 2012, which was based on and claimed priority under 35 U.S.C. § 119(e) of a U.S. Provisional application Ser. No. 61/671,923, filed on Jul. 16, 2012, in the U.S. Patent and Trademark Office, and under 35 U.S.C § 119(a) of a Korean patent application number 10-2011-0104619, filed on Oct. 13, 2011, in the Korean Intellectual Property Office, the disclosure of each of which is incorporated by reference herein in its entirety.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd. and 2) University OF Seoul Industry Cooperation Foundation.

BACKGROUND OF THE INVENTION

1. Field of the Invention

The present invention relates to a method for providing multimedia services. More particularly, the present invention relates to a method in which a service provider, which provides broadcasting-communication convergence services in a heterogeneous network environment, may deliver specific information about a service that the service provider itself provides.

2. Description of the Related Art

The evolution of the Internet into the broadband Internet has enabled not only the existing broadcasting that uses dedicated channels such as terrestrial channels, satellite channels and cables, but also the Internet broadcasting that provides scheduled multimedia services using the public Internet. As realistic services, broadcasting-communication convergence services have emerged that can provide a variety of services by organically combining the existing broadcasting with the Internet broadcasting.

Broadcast service providers (or broadcasters) can deliver content not only over the dedicated channels, but also over the Internet. Even a broadcast service provider has emerged that can deliver content only over the Internet without its dedicated broadcast channels. Therefore, regardless of whether a broadcaster uses both the dedicated channels and the Internet, or only uses the Internet, the broadcaster needs to deliver its program schedule (or organization) information to viewers along with program content, promoting their program content to the viewers, thus allowing the viewers to watch the programs according to the viewers' respective schedules. The broadcasters may provide a 'Re-view' service over the Internet, thereby allowing the viewers to watch the content later if the viewers did not watch during the content during its broadcast. In the existing broadcasting, this type of information is called an Electronic Program Guide (EPG). In the case of Digital Video Broadcasting (DVB) system standard, this information is called Program and System Information Protocol (PSIP) in the North American standard, and called Service Information (SI) in the European standard. Also, the information is called Program Specific Information (PSI) in the Moving Picture Experts Group-2 (MPEG-2) system standard which is widely used in the existing digital TV standard. In the North American standard, PSI and PSIP are defined to be transmitted together, but viewers may select programs only with the PSIP. In the European standard, PSI and SI are transmitted together, and the program selection is possible only with the PSI, but a verity of guide information about programs is additionally provided using SI. In this specification, this kind of information will be referred to as 'Service Specific Information (SSI)'.

In contrast to the existing broadcasting that uses the dedicated channels, the Internet broadcasting is globally provided, so viewers may access the Internet broadcasting over the Internet anywhere in the world as long as the viewers have a receiver capable of receiving the Internet broadcasting, thereby overcoming the limitations of the regional property of the existing broadcasting. Therefore, in order to overcome the limitations of the regional property of the existing broadcasting standards, which are roughly classified into the North American standard, the European standard, and the Japanese standard, the Internet broadcasting should be provided by a single standard unique in the world to prevent the unnecessary increase in complexity of the receivers. In this regard, SSI also requires a single standard.

The future broadcasting-communication convergence system is expected to be restructured based on the Internet. In other words, even guide information not only about the program content over the existing broadcast channels but also about the program content over the Internet will be delivered in SSI in the machine-readable form in which the receivers may read the program content. Then, the receivers may acquire the SSI over broadcast channels or the Internet, utilize it in controlling broadcast reception, and if necessary, show it in the form in which the viewers can read the SSI. Of course, the Internet broadcasters, which use no dedicated broadcast channels, may deliver the SSI over the Internet.

Therefore, a need exists for an apparatus and method for providing a format by which a service provider, which provides broadcasting-communication convergence services in a heterogeneous network environment including the Internet, may deliver specific information about a service that the service provider itself provides.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a format by which a service provider, which provides broadcasting-communication convergence services in a heterogeneous network environment including the Internet, may deliver specific information about a service that the service provider itself provides.

In accordance with an aspect of the present invention, a method for receiving a multimedia service is provided. The method includes receiving service specific information for at least one multimedia service provided from different networks, selecting one service based on the service specific information, and receiving the selected service. The service specific information may include one of a first service map table including information about at least one service which is transmitted over a plurality of logical channels, and a second service map table including information about at least one service which is transmitted over a single logical channel Each of the first and second service map tables may include asset-related information.

In accordance with another aspect of the present invention, a method for transmitting a multimedia service is provided. The method includes transmitting service specific information for at least one multimedia service to be provided from different networks, and transmitting a service requested by a receiver, to the receiver based on the service specific information. The service specific information may include one of a first service map table including information about at least one service which is transmitted over a plurality of logical channels, and a second service map table including information about at least one service which is transmitted over a single logical channel Each of the first and second service map tables may include asset-related information.

In accordance with further another aspect of the present invention, an apparatus for receiving a multimedia service is provided. The apparatus includes a receiver for receiving service specific information for at least one multimedia service provided from different networks, and a controller for selecting one service based on the service specific information. The receiver may receive a service selected by the controller. The service specific information may include one of a first service map table including information about at least one service which is transmitted over a plurality of logical channels, and a second service map table including information about at least one service which is transmitted over a single logical channel Each of the first and second service map tables may include asset-related information.

In accordance with yet another aspect of the present invention, an apparatus for transmitting a multimedia service is provided. The apparatus includes a transmitter for transmitting service specific information for at least one multimedia service to be provided from different networks, and a controller for selecting a service requested by a receiver based on the service specific information. The transmitter may transmit a service selected by the controller, to the receiver based on the service specific information. The service specific information may include one of a first service map table including information about at least one service which is transmitted over a plurality of logical channels, and a second service map table including information about at least one service which is transmitted over a single logical channel Each of the first and second service map tables may include asset-related information.

In accordance with still another aspect of the present invention, a method for receiving a multimedia service is provided. The method includes receiving a control message, and decoding the control message. The control message may include at least one table. The at least one table may include a table for at least one MPEG Media Transport (MMT) Package Table (MPT) corresponding to a package. The table for an MPT may include an asset list belonging to the package.

In accordance with still another aspect of the present invention, an apparatus for receiving a multimedia service is provided. The apparatus includes a receiver for receiving a control message, and a decoder for decoding the control message. The control message may include at least one table. The at least one table may include a table for at least one MPT corresponding to a package. The table for the MPT may include an asset list belonging to the package.

In accordance with still another aspect of the present invention, a method for transmitting a multimedia service is provided. The method includes generating a control message, and transmitting the generated control message. The control message may include at least one table. The at least one table may include a table for at least one MPT corresponding to a package. The table for the MPT may include an asset list belonging to the package.

In accordance with still another aspect of the present invention, an apparatus for transmitting a multimedia service is provided. The apparatus includes a controller for generating a control message, and a transmitter for transmitting the generated control message. The control message may include at least one table. The at least one table may include a table for at least one MPT corresponding to a package. The table for the MPT may include an asset list belonging to the package.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, is should be noted that like reference numbers are used to depict the same or similar elements, features and structures.

DETAILED DESCRIPTION OF EXEMPLARY EMBODIMENTS

Figure 1:
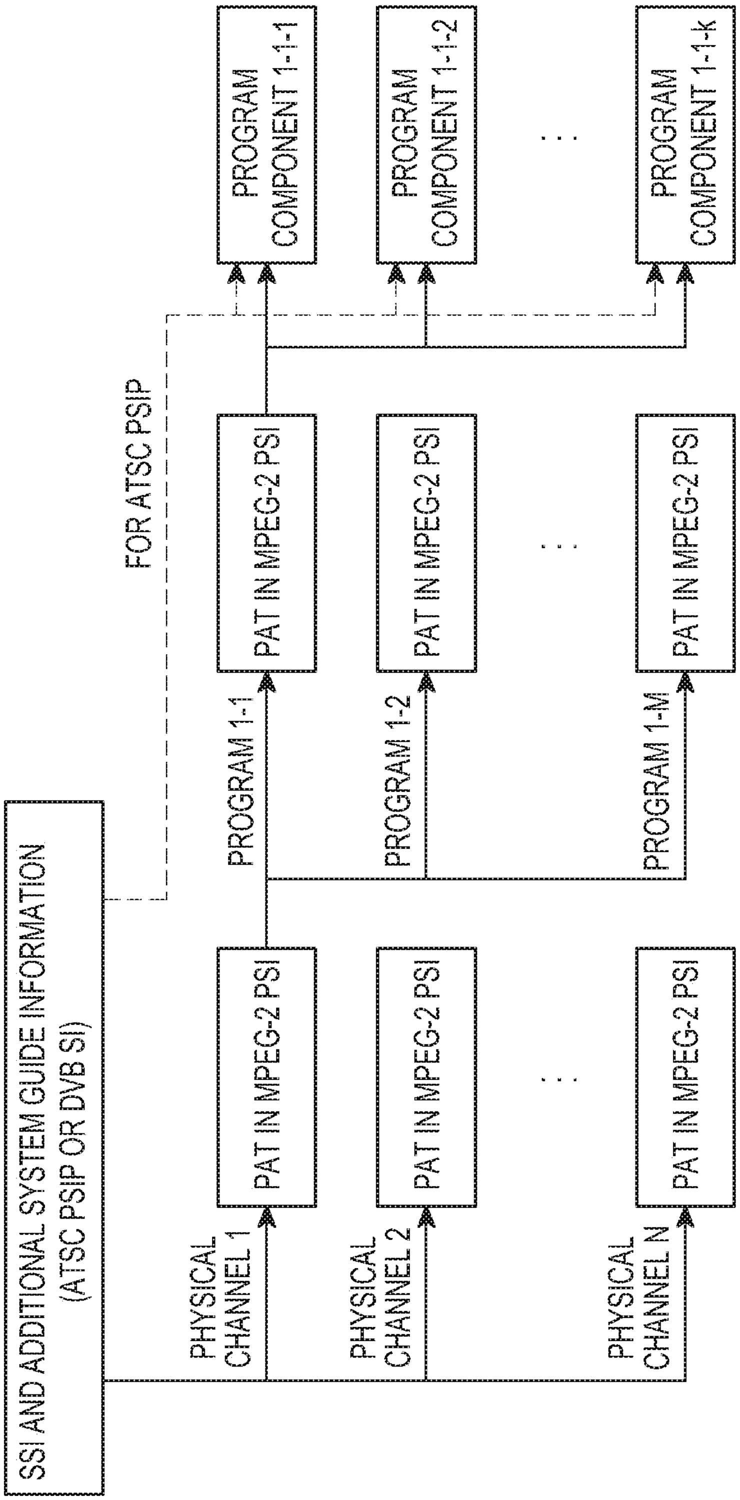
FIG. 1 shows a structure of Service Specific Information (SSI) and system guide information in an existing broadcasting that uses dedicated physical channels according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First, prior to a description of exemplary embodiments of the present invention, the terms used herein will be defined as follows.

Media Service: A service which delivers information by using one or more of various media, such as, for example, audio, video, images, texts, graphics, interactive applications, and the like.

Foreground Media Service: A free or charged media product directly exposed to a viewer to allow the viewer to select and enjoy at a time point, such as a video service, an audio service, an Electronic Program Guide (EPG) service, a push Video on Demand (VoD) service, a portable service, and the like.

Background Broadcast Service: A media delivery service which assists the foreground media service, but is not directly exposed to a viewer, such as, for example, a carousel for file download, pre-download over the Internet, and the like.

Video Service: A service in which video is the primary, and its associated audio is provided together, and audio, a subtitle, an interactive application, other additional data, and the like, in another language may also be provided together with the video.

Audio Service: A service in which audio is the primary, and video or image, an interactive application, and other additional data associated with the audio may be provided together with the audio.

Interactive Application: Software which is evoked if necessary during consumption of a video or audio service, provides information to a viewer, and receives a viewer's reaction to control a media service or deliver information to a server of a media operator, and collectively refers to software in a declarative and procedural language. This application may be evoked by a media operator in association with a currently consumed video or audio service or may be evoked by a media operator regardless of a currently consumed media service. An interactive application already stored in a receiver's cache and recognized by a viewer may be evoked at the request of the viewer.

Regular Media: Media which needs to be provided due to requirements of a media service. For example, audio of an audio service, or video and audio of its associated video service.

Adjunct Media: Media which does not need to be provided due to requirements of a media service, but may be provided when needed. For example, such media may include web documents, widgets, interactive applications, audio clips, video clips, graphics, texts, images, an auxiliary media component, or the like. The adjunct media is consumed together with regular media at all times, and cannot be consumed alone.

Media Component: A component which constitutes media. For example, in a case of stereoscopic video, a left-eye view image and a right-eye view image may be media components. As another example, in a case of 5.1-channel audio, each channel audio may be a media component.

Auxiliary Media Component: A media component which cannot constitute a single media alone, and constitutes the media together with another media component. For example, in a situation where a left-eye view image is provided as a 2-Dimensional (2D) image at all times among left-eye and right-eye view images in a 2D/3-Dimensional (3D) time combined service, the right-eye view image provided only in a stereoscopic video period is an auxiliary media component.

Asset: Encoding data regarding a media component. Herein, encoding refers to compression encoding, encoding for a standard format, and the like.

Regular Asset: Encoding data regarding a media component of regular media. Herein, encoding refers to compression encoding, encoding for a standard format, and the like.

Adjunct Asset: Encoding data regarding a media component or auxiliary media component of adjunct media. Herein, encoding refers to compression encoding, encoding for a standard format, and the like.

Program: An instance of a media service (e.g., the entire content of one broadcast channel (logical channel)).

Program Item: The content of a time period of a program. For example, when a start advertisement, intermediate advertisements, and a last advertisement are transmitted in a mixed manner in a movie, the program item is the content of a time period of the movie including the advertisement. Herein, each advertisement is an individual program item, but it is an embedded program item included in another program item. The program is a result of concatenation of program items except for the embedded program item on a timeline.

Package: Encoding data for a program item. This includes assets and control information associated with transmission, decoding, playback, and the like, of the assets.

Primary Asset: A regular asset which can include synchronization information regarding an adjunct asset among regular assets. For example, the primary asset may include synchronization and control information of an adjunct asset, as attached information of an M-unit of a video stream.

Attached Information: Additional information regarding an asset, such as control information, description information, and the like. The attached information is a logical term, and may be included in a header of multiple layers in a transport hierarchy, and in this case, it is called header information.

Stream Asset: An asset in the form of a media compression data, which can be temporally-infinitely generated like a video stream and an audio stream.

Non-Stream Asset: An asset which does not correspond to a stream asset.

M-Unit: A sub sub-component of an asset. An M-unit of a stream asset is a minimum data unit which can be input to a media decoder at a time, and a decoding result thereof may be presented at a time point or in a time period according to media. For example, for a video stream, a result of compression of a frame may be one M-unit, and for an audio stream, a result of compression of an audio sample for 24 ms may be one M-unit.

Logical Channel: A path that delivers one encoded program. For example, the logical channel corresponds to a data delivery path designated by a Program Map Table (PMT) in the existing MPEG-2 Transport Stream (TS)-based digital TV system, or a data delivery path designated by a source address, a destination address And A Port Number In The Internet.

Physical Channel: A path that delivers one or more logical channels. For example, the physical channel corresponds to a terrestrial TV channel, a cable TV channel, a satellite broadcast channel, the Internet, and the like, having a bandwidth of 6 MHz.

Internet Protocol (IP) Application Data Flow: One IP application data flow is designated by a source address and a destination address on the Internet, and by a port number in a destination designating an application that will process content of an IP packet.

Asset Path IDentifier (APID): An identifier of an asset path (e.g., an information path carrying an asset). One IP application data flow is composed of several asset paths, and each asset path is uniquely identified within one IP application data flow by an APID.

Asset Module IDentifier (AMID): When an asset is transmitted through several asset modules by being divided, the AMID is an identifier for identifying these asset modules in one asset path. For example, assuming that there is a large-sized table and this table is divided into several sub-tables, if the entire table is designated as one asset, each sub-table is an asset module.

Next, a format of service specific information according to exemplary embodiments of the present invention will be presented with reference to the drawings. First, the following requirements should be considered for the service specific information.

Integration of Guide Information: As for Service Specific Information (SSI), a broadcaster or a group of broadcasters needs to deliver, to receivers, specific information for a broadcast service provided over all media such as wire/wireless Internets, terrestrial channels, satellite channels and cables, which are operated in common.

Format of Guide Information: SSI needs to have a machine-readable format that a receiver may efficiently read and decrypt. The SSI needs to use a format in which the same SSI may be represented with as small amount of data as possible.

Target Period of Guide Information: SSI needs to guide service specification (or service history) of the past and present over a predetermined period, and of the future for a period of a predetermined time (e.g., during a half month). However, the service specification that was already broadcasted in the past may not be directly included in SSI, and in this case, a receiver may maintain the already stored past service specification without deletion for a predetermined period of time (e.g., a half month).

Valid Period of Guide Information: A specific version of SSI is valid only for a predetermined period of time, and needs to be updated automatically by a receiver upon a lapse of the predetermined period of time.

Support for Change in Program Schedule: When content different from the schedule content included in the notified SSI is broadcasted for some reason, the means that can allow a transmitter and a receiver to change the notified SSI, needs to be provided.

Delivery Means for Guide Information: When necessary, all or some of SSI needs to be delivered over one or more of the media such as wire/wireless Internets, terrestrial channels, satellite channels, and cables.

Optional Structure of Guide Information: SSI needs to have a structure in which of the SSI content, the information necessary for operations of the broadcasting system is mandatorily delivered, but the other information may be optionally delivered. For example, position information of program content is the information necessary for a receiver to read a program stream, whereas the plot of the program content is the information that can help the viewer to determine whether to view the program, but is not necessary for operations of the receiver.

Minimization of Channel Acquisition Time: SSI needs to have a structure capable of minimizing a channel acquisition time. The term 'channel acquisition time' as used herein may refer to a time in which video and audio are played after power-up or channel change.

Forward Compatibility with Existing Broadcasting: SSI needs to guide service specification of even the existing MPEG-2 TS based broadcasting.

Backward Compatibility with Existing Broadcasting: The existing MPEG-2 TS based broadcasting also needs to use SSI. Of course, the provided SSI will not be used in the existing receiver that does not support it, but it should not cause undue impact on the operation of the receiver. SSI may be utilized in a new version of the receiver that supports SSI.

Support of Several Small Screens in One Screen: SSI needs to support several small screens in one screen. It includes a function of designating spatio-temporal positions of small screens. For example, during the live broadcast of a baseball game, the SSI needs to include in the entire screen, all of the small screens showing the pitcher, the hitter, a specific infielder, the entire stadium, and the like.

Support of Receivers with Various Capabilities: SSI needs to support content guide for a receiver with various capabilities such as mobile devices, Standard Definition Television (SDTV), High Definition TV (HDTV), Ultra-High Definition (UHDTV), and the like.

Support of Multilingual Broadcast, Subtitle Broadcast, Commentary Broadcast, and Sign Language Broadcast: When auxiliary content capable of increasing accessibility, such as multilingual audio broadcast, subtitle broadcast, commentary broadcast and sign language broadcast, is included in a program, SSI needs to guide it.

Guidance of Content Restriction: SSI needs to guide several restrictions on the use of content. The restrictions may include content ratings (e.g., those below a certain age are prohibited to watch the content), recordability, accessibility, fast forward play/reverse play, pay-per-view, monthly billing, and the like.

Guidance of Position of Content Data: SSI needs to guide a position of content data. The SSI needs to efficiently guide both the same position of the entire content and the different positions of individual contempt components. In addition, the SSI needs to guide delivery of content over some or all of one or more dedicated broadcast physical channels and the Internet.

Guidance of Position of Alternative Content Data: SSI needs to guide a position of alternative content data. The term 'position of alternative content data' as used herein may refer to another position where the content, which is the same as or similar to the original content data, may be read instead of the intended original content data for the content that the viewer selected.

Guidance of Auxiliary Data: SSI needs to guide not only the main video and audio, but also its associated auxiliary data, such as web documents, widgets, interactive applications, audio clips, video clips, graphics, texts, images, and partial media streams (e.g., additional finite-length streams for demonstrating binocular 3D video for a predetermined period).

SSI is provided per broadcaster, or group of broadcasters. Terrestrial broadcasters, cable broadcasters, satellite broadcasters, Internet broadcasters, and the like cannot but independently deliver their own service specification unless they make an agreement on sharing and integrated delivery of service specifications, because they conduct their business independently. However, when such an agreement is made, the service specifications may be guided in an integrated manner to a broadcaster group, which is a group of broadcasters participating in the agreement. If the amount of information for a service specification guide is large, it takes a longer time to download it with a receiver, thereby causing an increase in the delay time in which the viewer reads the service specification guide, and increasing the receiver's burden when downloading the changed service specification guide. Therefore, a method for overcoming these disadvantages is required.

In the existing MPEG-2 standard-based broadcasting system, additional service and system guide information is defined, because Program Specific Information (PSI) provided in the MPEG-2 system standard (ISO/IEC 13818-1) is insufficient for the service specification guide. Advanced Television Systems Committee (ATSC) Program and System Information Protocol (PSIP) and DVB SI are the PSI. In the case of the ATSC PSIP, because it includes information replacing a Program Association Table (PAT) or a Program Map Table (PMT) in the MPEG-2 PSI, the ATSC PSIP is designed such that a receiver may receive a program without the necessity of decrypting the PAT and the PMT.

Unlike in the dedicated channel-based broadcasting that multiplexes several programs in one physical channel during their transmission, in the Internet broadcasting that uses only the Internet, it is common that several programs are not multiplexed in one IP application data flow. Of course, if necessary, several programs may be multiplexed in one IP application data flow, but it is assumed in the scheme proposed by exemplary embodiments of the present invention that only one program is sent in one IP application data flow. In addition, even when program components are transmitted separately over several different physical channels due to the bandwidth limitations of the physical channels, this does not correspond to the Internet broadcasting. Under these conditions, SSI for the Internet broadcasting may be simplified very much.

FIG. 1 shows a structure of Service Specific Information (SSI) in an existing broadcasting that uses dedicated physical channels according to another exemplary embodiment of the present invention.

A receiver checks specification of physical channels from an ATSC PSIP or a DVB SI. If the receiver tunes a specific physical channel, it checks a program specification in the physical channel from a PAT in an MPEG-2 PSI. If a specific program is selected, the receiver may identify program components from a PMT in the MPEG-2 PSI. In the ATSC system, the receiver may directly identify components of a specific program from PSIP information.

Figure 2:
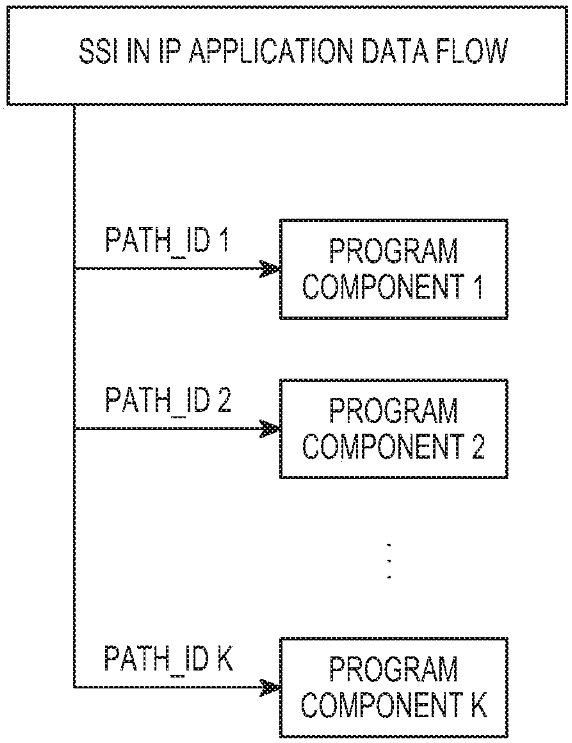
FIG. 2 shows a structure of SSI in an Internet broadcasting according to an exemplary embodiment of the present invention.

FIG. 2 shows a structure of SSI in an Internet broadcasting according to another exemplary embodiment of the present invention.

A receiver may play a program by checking a path identifier of a program component from service specific information that is delivered through a specific path in the same IP application data flow. The service specific information needs to be periodically delivered, because it is not possible to know in advance when the receiver will be powered up, and when the receiver will access the Internet broadcasting. As for the period over which the service specific information needs to be delivered, a shorter period may be preferred. Commonly, however, it is preferable to maintain the period within 500 ms. If the amount of service specific information is large, a large number of packets should be delivered within the same time period in order to transmit the service specific information in a short period, causing inefficiencies. Therefore, information that is transmitted in a short period needs to be designed to be small in amount, if possible. It is preferable that additional guide information is set to be transmitted in a longer period, or to be delivered upon request of a receiver.

Figure 3:
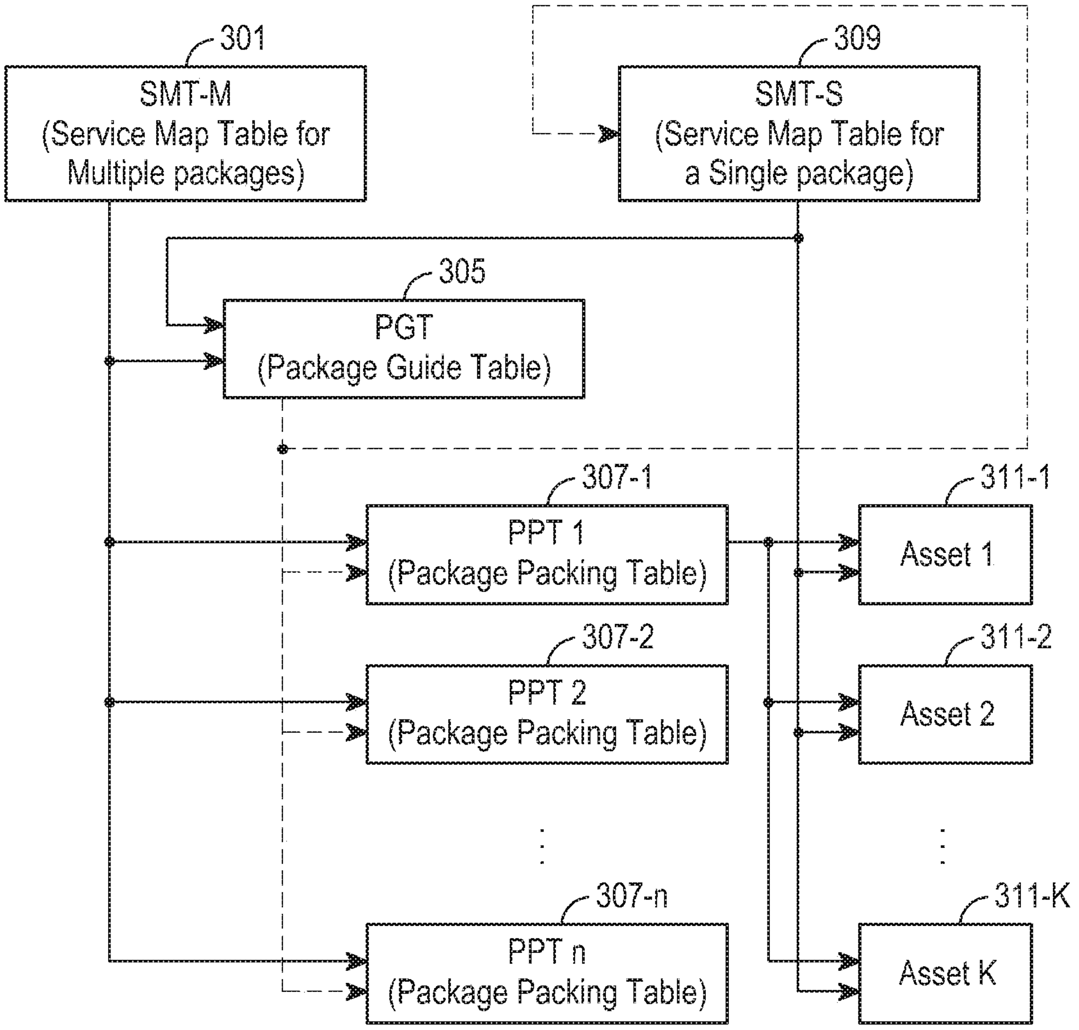
FIG. 3 shows a logical structure of SSI according to an exemplary embodiment of the present invention.

FIG. 3 shows a logical structure of SSI according to an exemplary embodiment of the present invention. For example, FIG. 3 shows a logical structure of SSI for a broadcasting-communication convergence service that uses both dedicated physical channels and the Internet, according to an exemplary embodiment of the present invention.

Referring to FIG. 3, the illustrated structure is basically an integrated form of the structures shown in FIGS. 1 and 2. A Service Map Table for Multiple packages (SMT-M) 301 is used when multiple logical channels are broadcasted over a dedicated broadcast physical channel, and a Service Map Table for a Single package (SMT-S) 309 is used when a single logical channel is broadcasted over a dedicated broadcast physical channel, when only the Internet is used, or when the Internet is mainly used for the broadcasting. An example, in which the Internet is mainly used for broadcasting, may include a case in which when a broadcaster that uses both the dedicated physical channels and the Internet performs the Internet broadcasting, the data transmitted over the dedicated physical channels may be utilized in the Internet broadcasting, if necessary. For example, when certain content is broadcasted over the Internet due to the limited bandwidth of the dedicated channels, auxiliary data to be additionally used for this content may jointly use the content transmitted over the dedicated channels. In this case, a receiver capable of only the Internet access may not utilize auxiliary data, but a smart TV receiver, which has both a tuner for dedicated channels and an Internet access device, may receive the main content over the Internet, receive the auxiliary data over the dedicated channels, and comprehensively provide them to the viewer.

The SMT-M includes simple guide content concerning all programs in the physical channel carrying the SMT-M information, and location reference information of a Package Packing Table (PPT) 307-1 to **307-*n* including information about each program item which is presently being broadcasted, and also includes location reference information and version information for a Package Guide Table (PGT) 305** including guide information about all programs provided by the broadcaster.

Because an SMT is periodically transmitted in a very short period (e.g., 500 ms) to minimize a channel acquisition time, the amount of included information is also minimized, if possible.

A PGT includes guide information corresponding to an amount of a predetermined period (e.g., the past and future half months from the present) among all program items which are serviced over all the physical channels and the Internet that one broadcaster is operating. Thus, the amount of information for the PGT is much larger than that of the SMT, and its transmission period is also much longer (e.g., 1 minute) than that of the SMT. If necessary, a receiver may be allowed to download the PGT over the Internet. The PGT guides program items depending on the broadcast schedule, and needs to have a structure that can be efficiently updated, because even the pre-announced broadcast schedule is subject to change. Therefore, information included in the PGT is configured on a module basis for each type, and a receiver is allowed to download only the updated modules. Of course, the receiver may be allowed to gather only the updated modules and download them at a time. This is called an integrated delta module.

For example, if several integrated delta modules are provided together, which have a PGT version difference of 1 to N (where N indicates a number corresponding to one or two days), the download burden of the receiver may be significantly reduced. If a version of a PGT included in the SMT is different from a version of a PGT presently stored in the receiver, indicating that one or more modules in the PGT are added/updated/deleted, the receiver is allowed to download the added or updated modules, and delete the content to be deleted. If the version of the PGT is the same, the receiver does not need to newly download or decrypt the PGT.

Each module of a PGT includes one or more program items or guide information about a package corresponding thereto, or includes an additional associated table (e.g., a rating table) needed for decryption of the PGT. Location reference information for a PPT is included in guide information about a package included in the PGT, allowing a viewer to select a program using the PGT and watch or scheduled-record it. By guiding a Uniform Resource Locator (URL) of a program homepage on the Internet instead of guiding the overview of the program content by long-text information, it is possible to reduce the amount of information to be included in the PGT, and to enable various program guides and services such as ‘Preview’ and ‘Review’ on an HTML page, overcoming the program content guide that depends only on the texts.

A PPT is information similar to a MPEG-2 Program Map Table (PMT). However, while the MPEG-2 PMT is information about configuration of a program logic channel that does not distinguish between program items, the PPT guides program items individually. The PPT may guide only one package corresponding to one program item. The PPT includes information not only about all program item components constituting a program item, but also about auxiliary data components. In other words, the PPT may include information not only about a regular asset such as video and its associated audio, but also about an adjunct asset which is provided together when necessary, such as web documents, widgets, interactive applications, audio clips, video clips, graphics, texts, images, and auxiliary media components, and may also include location reference information for the resources. Adjunct assets, which are used in common in several packages, provide information about and resources for the adjunct assets in the form that several packages may share.

Referring to FIG. 3, an SMT-S is similar to a PPT in terms of structure and function. In the case of the Internet broadcasting, commonly, only one program exists in one IP application data flow, so there is no need to acquire program access information in two steps of SMT and PPT. The same is true even when only one program item is broadcasted in one broadcast-only physical channel. The SMT-S reduces the channel acquisition time by combining functions of SMT and PPT into one. In the SMT-S are included a simple guide for the Internet broadcast channels or logical channels, a simple guide for the program item corresponding to location reference information of the PGT, a version of the PGT, and the package presently being broadcasted, and various information about assets 311-1 to 311-K constituting a package. Therefore, the SMT-S collectively delivers the logical channel guide, the program item guide, and the program item component information.

A PGT used in the Internet broadcasting may include a guide for all Internet broadcast channels that an Internet broadcaster or a group of broadcasters is operating, i.e., for all programs included in several IP application data flows. Using the PGT, viewers may navigate and select a program from an Internet broadcaster or a group of broadcasters.

If real-time Internet broadcasting is performed by MPEG-DASH, an SMT-S may not individually guide program items included in the Internet broadcasting. For example, this corresponds to live streaming in which a length of program items (the actual content is a program in which several program items are continued) is not designated. However, in this case, a PGT needs to guide program items individually.

A location of a PGT provided by an SMT-M may be any one of a stream in a physical channel carrying the SMT-M, a stream in another physical channel, a stream in an IP application data flow, and an Internet URL.

A location of an asset corresponding to each program item component provided by a PPT may be any one of a stream in a physical channel carrying the PPT, a stream in another physical channel, a stream in an IP application data flow, and an Internet URL (including MPEG-DASH URL). If a program item transmitted over a broadcast-only physical channel broadcasts live only some of the event the viewer wants to watch, for various reasons, then it may include information about alternative program items by which the viewer may watch the entire event. For example, if a live HDTV baseball broadcast is interrupted due to the regular broadcast schedule, it is possible to guide MPEG-DASH based alternative program items which are low-resolution video but allow the viewer to continuously watch the broadcast.

A location of a PGT provided in an SMT-S and a location of a program item component may be any one of a stream in a broadcast-only physical channel carrying the SMT-S (or a stream in an IP application data flow), a stream in another broadcast-only physical channel (or a stream in another separate IP application data flow), and an Internet URL. If a broadcaster that uses both the dedicated channel and the Internet performs the Internet broadcasting, a location of some program item components for the Internet broadcasting may be a stream in a broadcast-only physical channel.

If a location of a PGT is an Internet URL, a receiver accesses the URL to download the entire PGT or updated or added some modules in the PGT, whenever necessary, or at state periods.

Only one of an SMT-M and an SMT-S is included at one point in one physical channel. However, if logical channels in a certain physical channel are changed in number from multiple channels to a single channel, the physical channel, which included only the SMT-M, may include only the SMT-S. In this case, because the SMT-M and the SMT-S are different in a value of table_id, the receiver may easily distinguish them.

One of the major functions of the SMT-M and the SMT-S is to deliver the latest version information of the PGT and the location reference information of the PGT. The receiver is allowed to download the latest PGT based on the latest version information of the PGT and the location reference information of the PGT, which are included in the SMT-M and the SMT-S. If the latest version of the PGT included in the SMT-M and the SMT-S is the same version as that of the PGT that the receiver has already stored, then the receiver allows the viewer to select a program item based on the stored PGT content. If the latest version of the PGT included in the SMT-M and the SMT-S is different from the PGT content that the receiver has already stored, the viewer is not allowed to select a program item based on the PGT, until the updated PGT is downloaded and completely stored in the receiver.

In the actual system, no PGT may be transmitted. In this case, the viewer may select program items mainly based on the SMT-M or the SMT-S.

When a receiver is first installed, a broadcast-only physical channel and logical channels included therein are searched for one by one by automatic channel search, because there is no downloaded PGT. If the broadcasting system provides a PGT, the PGT is downloaded based on PGT location reference information of the first identified SMT-M or SMT-S, and the viewer is allowed to select a program item based on the PGT. If the broadcasting system provides no PGT, the receiver checks all logical channels provided by the broadcasting system, by continuously performing automatic channel search, and then allows the viewer to navigate channels in order of the logical channel.

If the receiver, which was continuously used, is powered up again while it was turned off, the receiver first plays the program item of a logical channel, which was previously watched by the viewer, and in this process, the receiver updates the PGT by checking PGT information of the SMT-M or the SMT-S. The viewer may navigate channels in order of the logical channel, or read PGT information to select his/her desired program item from among the program items presently being broadcasted.

In the case of the Internet broadcasting, a broadcast server address already stored in a receiver during its manufacturing, a broadcast server address that a viewer inputted later to the receiver, and a broadcast server address acquired by a PGT are stored in the receiver in advance, and they may be selected by user's channel navigation, or based on a program item guide of the PGT.

If a viewer selects a certain program item based on the program item guide of the PGT, the receiver accesses a logical channel over which the program item is actually delivered, and shows the program item that is presently being broadcasted over the logical channel. Though very rare, content of a PGT may be updated, which is from the point where the viewer selected a certain program item based on the program item guide of the PGT, until just before the receiver actually decrypts the SMT-M or the SMT-S of the program time. In this case, the receiver updates the PGT based on the PGT information included in the SMT-M or the SMT-S. If the program item that the viewer is presently watching is different from the program item guided in the previous version of the PGT due to the unscheduled program, the receiver may display an appropriate guide on its screen, allowing the viewer to recognize the program item that he/she is presently watching.

Referring to FIG. 3, an asset, which is referenced by the SMT-S or the PPT, may be actually a media asset or another PPT. However, double recursive reference is not allowed, which means that a PPT, which is referenced by an SMT-S or a PPT, references again another PPT. If an SMT-S or a PPT references another PPT as an asset, MPEG Media Transport (MMT) composition information needs to be transmitted for a screen layout. If the screen layout is fixed without being changed over the time in one program item, and its amount is not large, MMT composition information may be transmitted by being included in a descriptor in a PPT. If the screen layout is changed over the time in one program item, MMT composition information is transmitted as a timed asset. On the other hand, if the screen layout is not changed over the time in one program item but the amount of MMT composition information is large, MMT composition information may be transmitted as an untimed asset.

The SSI proposed by exemplary embodiments of the present invention may be used in a compatible way with the existing MPEG-2 system standard based broadcasting system.

Figure 4:
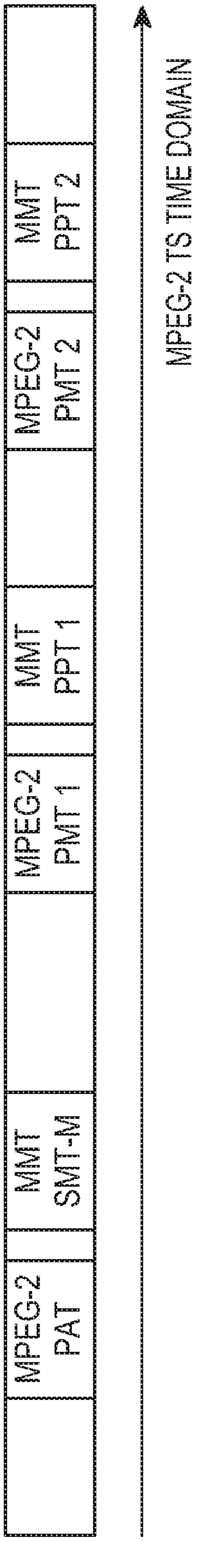
FIG. 4 shows an example of SSI in an MPEG-2 Transport Stream (TS) based broadcasting according to an exemplary embodiment of the present invention.

FIG. 4 shows an example of SSI in an MPEG-2 Transport Stream (TS) based broadcasting according to an exemplary embodiment of the present invention. For example, FIG. 4 shows an example of an MPEG-2 TS that may be analyzed by both the existing broadcast receiver and a receiver supporting MMT.

Referring to FIG. 4, in this example, one TS has two programs. The existing broadcast receiver receives programs by decrypting MPEG-2 PAT, MPEG-2 PMT 1, and MPEG-2 PMT 2. The receiver supporting MMT receives programs by decrypting MMT SMT-M, MMT PPT 1, and MMT PPT 2. Of course, a PID of a TS packet carrying an MMT SMT-M needs to be assigned in advance as a fixed value, and an SMT-M and a PPT need to be transmitted after being encapsulated in a structure of an MPEG-2 session.

Next, the specification of an SSI information format proposed by exemplary embodiments of the present invention will be described.

A Service Map Table for Multiple packages (SMT-M) is used when multiple logical channels are broadcasted over a dedicated broadcast physical channel, and is used to deliver a location of a PPT corresponding to all program items presently being broadcasted over the broadcast-only physical channel, and a version and a location for a program guide. Preferably, the SMT-M is transmitted in a period of 500 ms or less. When a receiver accesses the broadcast-only physical channel, the SMT-M allows the receiver to rapidly find a package corresponding to a program item.

An APID of an SMT-M is fixed to a specific value (e.g., 0x0000) at all times. If an SMT-M is delivered using an MPEG-2 TS, a PID of a TS packet carrying the SMT-M needs to be designated as a fixed value.

The syntax of an SMT-M is as defined in Table 1. A definition of content listed in a 'Format' column in Table 1 is the same as that in the MPEG-2 system standard. In addition, a loop count, which is not shown in a 'Value' column in Table 1, is a value derived from the values indicating a length. These principles may be applied to other tables proposed by exemplary embodiments of the present invention.

TABLE 1

| Syntax | Value | No. of Bits | Format |
|---|---|---|---|
| SMT-M( ) { | | | |
| table_id | | 8 | uimsbf |
| version_id | | 8 | uimsbf |
| table_length | | 16 | uimsbf |
| service_id | | 16 | uimsbf |
| SMT_update_version | | 8 | uimsbf |
| SMT_prefix_count | N1 | 8 | uimsbf |
| for (i=0; i<N1; i++) { | | | |
| SMT_prefix_length | N2 | 8 | uimsbf |
| for (j=0; j<N2; j++) { | | | |
| SMT_prefix_byte | | 8 | uimsbf |
| } | | | |
| } | | | |
| SMT_M_descriptors_length | N3 | 16 | uimsbf |
| for (i=0; i<N3; i++) { | | | |
| SMT_M_descriptor( ) | | | |
| } | | | |
| number_of_packages | N4 | 8 | uimsbf |
| for (i=0; i<N4; i++) { | | | |
| package_path_number | | 16 | uimsbf |
| package_id | | 16 | uimsbf |
| reserved | '1111' | 4 | bslbf |
| simple_location_type | | 4 | uimsbf |
| if (simple_location_type == '0') { | | | |
| PPT_APID | | 16 | uimsbf |
| } else if (simple_location_type == '1') | | | |
| { | '111' | 3 | bslbf |
| reserved | | 13 | uimsbf |
| PPT_PID | | | |
| } | | | |
| } | | | rpchof |
| CRC_32 | | | |
| } | | | |

In Table 1, semantics of each syntax element are as follows:

table_id: An identifier indicating the type of the table. A unique value corresponding to an SMT-M is assigned.

version_id: An identifier indicating the structure of this table. If the structure of the table is modified by an amendment of the standard, this value is also changed. Based on this value, a receiver determines whether this table is configured such that it can understand the content of the table. This value is incremented only when the content of the table is amended to be incompatible with the existing one.

table_length: The number of bytes counted from the next field to the last byte of service_map_table_type_I( ). A value of 0 is not used.

service_id: A unique identifier for a broadcast service that uses a dedicated broadcast channel A unique identifier needs to be assigned for each dedicated broadcast channel of each broadcaster through a registration authority.

SMT_update_version: An SMT-M is periodically delivered to receivers. This value is incremented by one, if content of an SMT-M is different from content of an SMT-M which is transmitted just before and has the same service_id. This value is reset to 0 after its maximum value of 255. If this value is changed, a receiver reads again and decrypts content of an SMT-M.

SMT_prefix count: The number of the subsequent SMT_prefixes.

SMT prefix is concatenated in front of a string included in an SMT-M, forming a URL. When desiring to reference SMT_prefix, a receiver references SMT_prefix by using its SMT_prefix occurrence order as an index. A value '0xFF' of this value is not used. Therefore, a maximum of 255 SMT_prefixess may be included.

SMT_prefix_length: A length of a SMT_prefix string.

SMT_prefix_byte: A byte in a SMT_prefix string. The last null byte of the string is not included.

SMT_M_descriptors_length: A length of a SMT_M_descriptor syntax loop following this field is represented as the number of bytes counted from the next byte to the last byte of the SMT_M_descriptor syntax loop. Various descriptors including the below-described PGT_reference_descriptor( ) may be included in SMT_M_descriptor( ).

number_of_packages: The number of packages which are presently being delivered over this broadcast channel.

package_path_number: A package path number for distinguishing logical channels in a certain broadcast channel. A value of '0' is not used. The package_path_number is uniquely assigned in a physical channel by a broadcaster or a group of broadcasters.

package_id: An identifier of a package which is presently being delivered over this virtual channel. The package_id is a value that a broadcaster assigns for each package, and has a unique value for the packages that a broadcaster or a group of broadcasters provides over a period of time. This value may be reused after a predetermined period of time.

simple_location_type: This field indicates the type of location reference information for a PPT corresponding to the package presently being delivered. All PPTs that an SMT-M references, are delivered in the same IP application data flow as the IP application data flow carrying an SMT-M, or in the same MPEG-2 TS as the MPEG-2 TS carrying an SMT-M. If a value of this field is '0', an asset path carrying a PPT is designated by an APID, and if a value of this field is '1', an MPEG-2 TS carrying a PPT is designated by a PID defined in MPEG-2.

PPT_APID: An identifier of an asset path that carries a PPT in an IP application data flow.

PPT_PID: A PID of a TS packet that carries a PPT in an MPEG-2 TS.

CRC_32: The same field as CRC_32 defined in the section syntax of the MPEG-2 system standard.

A Service Map Table for a Single package (SMT-S) is used when one logical channel is broadcasted over a dedicated broadcast physical channel, or when only the Internet is used or it is mainly used, and is used to deliver simple guide information for a program item and its associated package, location reference information for more detailed program guide information, a structure of a program item, and location reference information of its component. The SMT-S needs to be transmitted in a period of 500 ms or less, and an APID of an SMT-S is fixed as a specific value (e.g., 0x0000) at all times. Therefore, an SMT-M and an SMT-S are identified by table_id, though they are transmitted through the path having the same APID.

The syntax of an SMT-S is as shown in Table 2.

TABLE 2

| Syntax | Value | No. of Bits | Format |
|---|---|---|---|
| SMT-S( ) { | | | |
| table_id | | 8 | uimsbf |
| version_id | | 8 | uimsbf |
| table_length | | 16 | uimsbf |
| service_id | | 16 | uimsbf |
| SMT_update_version | | 8 | uimsbf |
| PPT_body( ) | | | |
| CRC_32 | | 32 | rpchof |
| } | | | |

In Table 2, semantics of each syntax element are as follows:

table_id: An identifier indicating the type of the table. A unique value corresponding to an SMT-S is assigned.

version_id: An identifier indicating the structure of this table. If the structure of the table is modified by an amendment of the standard, this value is also changed. Based on this value, a receiver determines whether this table is configured such that it can understand the content of the table. This value is incremented only when the content of the table is amended to be incompatible with the existing one.

table_length: The number of bytes counted from the next field to the last byte of service_map_table_type_II( ). A value of 0 is not used.

service_id: A unique identifier for an Internet broadcasting service. A unique identifier needs to be assigned for each IP application data flow of each broadcaster through a registration authority.

SMT_update_version: Because an SMT-S is periodically transmitted, this value is incremented by one, if content of an SMT-S is different from content of an SMT-S which is transmitted just before and has the same service_id. This value is reset to 0 after its maximum value of 255. If this value is changed, a receiver reads again and decrypts content of an SMT-S.

CRC_32: The same field as CRC_32 defined in the section syntax of the MPEG-2 system standard.

PPT_body( ): A syntax element group corresponding to a body of a PPT in MMT. Its syntax is as shown in Table 3.

TABLE 3

| Syntax | Value | No. of Bits | Format |
|---|---|---|---|
| PPT_body( ) { | | | |
| short_channel_name_length | N1 | 8 | uimsbf |
| for (i=0; i<N1; i++) { | | | |
| short_channel_name_byte | | 8 | uimsbf |
| } | | | |
| package_id | | 16 | uimsbf |
| prefix_count | N2 | 8 | uimsbf |
| for (i=0; i<N2; i++) { | | | |
| prefix_length | N3 | 8 | uimsbf |
| for (j=0; j<N3; j++) { | | | |
| prefix_byte | | 8 | uimsbf |
| } | | | |
| } | | | |
| descriptors_length | N4 | 16 | uimsbf |
| for (i=0; i<N4; i++) { | | | |
| descriptor( ) | | | |
| } | | | |
| reserved | ‘1’ | 1 | bslbf |
| parental_guidance_flag | | 1 | bslbf |
| recording_flag | | 1 | bslbf |
| random_access_flag | | 1 | bslbf |
| fast_forward_play flag | | 1 | bslbf |
| fast_reverse_play_flag | | 1 | bslbf |
| timescale_flag | | 1 | bslbf |
| protection_scheme_id_flag | | 1 | bslbf |
| if (time_scale_flag == 1) { | | | |
| timescale | | 32 | uimsbf |
| } | | | |
| if (protection_scheme_id_flag == 1) { | | | |
| protection_scheme_id | | 8 | uimsbf |
| } | | | |
| clock_reference_id | | 8 | uimsbf |
| number_of_asset_groups | N5 | 8 | uimsbf |
| for (i=0; i<N5; i++) { | | | |
| level_of_mandatory_playing | | 8 | uimsbf |
| number_of_assets_in_group | N6 | 8 | uimsbf |
| for (j=0; j<N6; j++) { | | | |

TABLE 3-continued

| Syntax | Value | No. of Bits | Format |
|---|---|---|---|
| asset_type | | 16 | uimsbf |
| if (asset_type == PPT_ASSET) { | | | |
| PPT_asset( ) | | | |
| } else { | | | |
| asset_id | | 16 | uimsbf |
| reserved | '1111' | 4 | bslbf |
| default_selection_flag | | 1 | bslbf |
| clock_reference_flag | | 1 | bslbf |
| asset_timescale_flag | | 1 | bslbf |
| asset_protected_flag | | 1 | bslbf |
| if (clock reference flag == 1) { | | | |
| clock_rererence_id | | 8 | uimsbf |
| } | | | |
| if (asset_time_scale_flag == 1) { | | | |
| timescale | | 32 | uimsbf |
| } | | | |
| if (asset_protected_flag == 1) { | | | |
| reserved | '111 | 7 | bslbf |
| scheme_id_flag | 1111' | 1 | bslbf |
| if (scheme_id_flag == 1) { | | | |
| protection_scheme_i d | | 8 | uimsbf |
| } | | | |
| } | | | |
| MMT_gcncral_location_info( ) | | 16 | uimsbf |
| asset_descriptors_length | N7 | | |
| for (k=0; k<N7; k++) { | | | |
| asset_descriptor( ) | | | |
| } | | | |
| } | | | |
| } | | 32 | rpchof |
| } | | | |
| CRC_32 | | | |
| } | | | |

In Table 3, semantics of each syntax element are as follows:

short_channel_name_length: The number of bytes of a logical channel name expressed in a string that uses UTF-8 encoding.

short_channel_name_byte: Byte data constituting a logical channel name package_id: An identifier of a package which is presently being delivered over this virtual channel. The package_id is a value that a broadcaster assigns for each package, and has a unique value for the packages that a broadcaster or a group of broadcasters provides over a period of time. This value may be reused after a predetermined period of time.

prefix_count: The number of the subsequent prefixes. The prefix is concatenated in front of a string, forming a URL. When desiring to reference a prefix, a receiver references a prefix by using its prefix occurrence order as an index. A value '0xFF' of this value is not used. Therefore, a maximum of 255 prefixes may be included.

prefix_length: A length of a prefix string.

prefix_byte: A byte in a prefix string. The last null byte of the string is not included.

descriptors_length: A length of a descriptor syntax loop following this field is represented as the number of bytes counted from the next byte to the last byte of the descriptor syntax loop. Various descriptors may be included in descriptor( ), and when the PPT_body( ) syntax element group in Table 3 is included in an SMT-S, PGT_reference_descriptor ( ) may be included in the descriptor( ).

parental_guidance_flag: If a value of this flag is '1', a receiver does not play the content restored from a package until it decrypts a PGT and checks an exact viewer rating applied to this package. If a value of this flag is '0', the receiver plays the content restored from the package even before it checks the viewer rating.

recording_flag: If a value of this flag is '1', a receiver may store this packet in its internal storage.

random_access_flag: If a value of this flag is '1', a viewer may perform a random access to this package.

fast_forward_play_flag: If a value of this flag is '1', a viewer may perform fast forward play on this package.

fast_reverse_play_flag: If a value of this flag is '1', a viewer may perform fast reverse play on this package.

timescale_flag: If a value of this field is '1', a timescale field is included in the following.

protection_scheme_id_flag: If a value of this field is '1', a protection scheme id field is included in the following.

timescale: A time unit applied to various timestamps of an asset is represented as the number of time units for 1 second. A default value is 90,000. There are two placeholders for a timescale field in PPT_body( ). While the former is a value applied to all assets in this package, the latter in the syntax loop for an asset is a value applied to each asset. If there is a value applied to each asset, this value precedes the values which are applied to all preceding assets.

protection_scheme_id: A value designating a protection scheme for an asset. There are two placeholders for a protection_scheme_id field in PPT_body( ). While the former is a value applied to all assets in this package, the latter in the syntax loop for an asset is a value applied to each asset. If there is a value applied to each asset, this value precedes the values which are applied to all preceding assets.

clock_reference_id: An identifier of a clock used by an asset encoder. There are two placeholders for a clock_reference_id field in PPT_body( ). While the former is a value applied to all assets in this package, the latter in the syntax loop for an asset is a value applied to each asset. If there is a value applied to each asset, this value precedes the values which are applied to all preceding assets.

number_of_asset_groups: The number of asset groups. Assets in the same asset group are exclusive to each other. In other words, a receiver plays only one asset among the assets in the same asset group. For example, for multilingual support, an audio in a language A and an audio in a language B may belong to the same asset group.

level_of_mandatory_playing: A value indicating whether a receiver needs to mandatorily play one asset in an asset group. If a value of this field is ‘0’, a receiver needs to mandatorily play one asset in an asset group. Otherwise, if a value of this field is not ‘0’, the receiver may play no asset in the asset group depending on its capability. A higher value of this field means lower importance. A receiver may omit an asset group with this field having a small value, and needn’t play an asset group with the field having a value greater than the small value.

number_of_assets_in_group: The number of assets in the asset group.

asset_type: A type of an asset. This field is similar to, but an extension of the stream_type defined in MPEG-2 PMT. If the asset type is PPT, the asset is called a “PPT asset”. A PPT asset included in a SMT-S or a PPT must not include another PPT asset, i.e. a “double recursive reference” of PPT assets is not permitted.

asset_id: An asset identifier. An asset_id is used to make reference to an asset, in MMT_package_composition_descriptor( ).

default_selection_flag: If a value of this flag is ‘1’, it indicates that this asset is the most recommended asset in its asset group. Among assets in the same asset group, only one asset needs to have this flag with value of ‘1’. If a value of this flag is ‘0’ for all assets in the same asset group, a receiver chooses the first asset in the list as the most recommended asset.

clock_reference_flag: If a value of this field is ‘1’, it indicates that a clock_reference_id field is included in the following syntax.

asset_timescale_flag: If a value of this flag is ‘1’, it indicates that a timescale field is included in the following syntax.

asset_protected_flag: If a value of this flag is ‘1’, it indicates that this asset is protected.

scheme_id_flag: If a value of this flag is ‘1’, it indicates that a protection_scheme_id field is included in the following syntax.

MMT_general_location_info( ): General location reference information for MMT, which indicates a location of an asset. Its content is as shown in Table 5.

asset_descriptors_length: The number of bytes counted from the next field to the last byte of the descriptor syntax loop.

asset_descriptor( ): A descriptor for an asset.

PPT_asset( ) is a syntax element group used to include another package in a certain package. Its syntax is as shown in Table 4, and the meaning of each syntax element is as defined in Table 3.

TABLE 4

| Syntax | Value | No. of Bits | Format |
|---|---|---|---|
| PPT_asset( ) { | | | |
| descriptors_length | N1 | 16 | uimsbf |
| for (i=0; i<N1; i++) { | | | |
| descripor( ) | | | |
| } | | | |
| reserved | ‘11 1111’ | 6 | bslbf |
| timescale_flag | | 1 | bslbf |
| protection_scheme_id_flag | | 1 | bslbf |
| if (time_scale_flag == 1) { | | | |
| timescale | | 32 | uimsbf |
| } | | | |
| if (protection_scheme_id_flag == 1) { | | | |
| protection_scheme_id | | 8 | uimsbf |
| } | | | |
| clock_reference_id | | 8 | uimsbf |
| number_of_asset_groups | N2 | 8 | uimsbf |
| for (i=0; i<N2; i++) { | | | |
| level_of_mandatory_playing | | 8 | uimsbf |
| number_of_assets_in_group | N3 | 8 | uimsbf |
| for (j=0; j<N3; j++) { | | | |
| asset_type | | 16 | uimsbf |
| asset_id | | 16 | uimsbf |
| reserved | ‘1111’ | 4 | bslbf |
| default_selection_flag | | 1 | bslbf |
| clock_reference_flag | | 1 | bslbf |
| asset_timescale_flag | | 1 | bslbf |
| asset_protected_flag | | 1 | bslbf |
| if (clock_reference_flag == 1) { | | | |
| clock_rererence_id | | 8 | uimsbf |
| } | | | |
| if (asset_time_scale_flag == 1) { | | | |
| timescale | | 32 | uimsbf |
| } | | | |
| if (asset_protected_flag == 1) { | | | |
| reserved | ‘111 | 7 | bslbf |
| scheme_id_flag | 1111’ | 1 | bslbf |
| if (scheme_id_flag == 1) { | | | |
| protection_scheme_id | | 8 | uimsbf |
| } | | | |

TABLE 4-continued

| Syntax | Value | No. of Bits | Format |
|---|---|---|---|
| } | | | |
| MMT_general_location_info( ) | | | |
| asset_descriptors_length | | 16 | uimsbf |
| for (k=0; k<N4; k++) { | N4 | | |
| asset_descriptor( ) | | | |
| } | | | |
| } | | | |
| } | | | |
| } | | | |

MMT_general_location_info( ) is a syntax element group that provides location reference information in MMT. Its syntax is as shown in Table 5.

TABLE 5

| Syntax | Value | No. of Bits | Format |
|---|---|---|---|
| MMT_general_location_info( ) { | | | |
| location_type | | 8 | uimsbf |
| if (location_type == '0') { | | | |
| AMID | | 8 | uimsbf |
| } else if (location_type == 0x01) { | | | |
| APID | | 16 | uimsbf |
| } else if (location_type == 0x02) { | | | |
| APID | | 16 | uimsbf |
| AMID | | 8 | uimsbf |
| } else if (location_type == 0x03) { | | | |
| ipv4_src_addr | | 32 | uimsbf |
| ipv4_dst_addr | | 32 | uimsbf |
| dst_port | | 16 | uimsbf |
| APID | | 16 | uimsbf |
| } else if (location_type == 0x04) { | | | |
| ipv4_src_addr | | 32 | uimsbf |
| ipv4_dst_addr | | 32 | uimsbf |
| dst_port | | 16 | uimsbf |
| APID | | 16 | uimsbf |
| AMID | | 8 | uimsbf |
| } else if (location_type == 0x05) { | | | |
| ipv6_src_addr | | 64 | uimsbf |
| ipv6_dst_addr | | 64 | uimsbf |
| dst_port | | 16 | uimsbf |
| APID | | 16 | uimsbf |
| } else if (location type == 0x06) { | | | |
| ipv6_src_addr | | 64 | uimsbf |
| ipv6_dst_addr | | 64 | uimsbf |
| dst_port | | 16 | uimsbf |
| APID | | 16 | uimsbf |
| AMID | | 8 | uimsbf |

TABLE 5-continued

| Syntax | Value | No. of Bits | Format |
|---|---|---|---|
| } else if (location type == 0x07) { | | | |
| reserved | '111' | 3 | bslbf |
| MPEG_2_PID | | 13 | uimsbf |
| } else if (location_type == 0x08) { | | | |
| MPEG_2_transport_stream_id | | 16 | uimsbf |
| reserved | '111' | 3 | bslbf |
| MPEG_2_PID | | 13 | uimsbf |
| } else if (location_type == 0x09) { | | | |
| network_id | | 16 | uimsbf |
| MPEG_2_transport_stream_id | | 16 | uimsbf |
| reserved | '111' | 3 | bslbf |
| MPEG_2_PID | | 13 | uimsbf |
| } else if (location_type == '0x0A') { | | | |
| byte_offset | | 16 | uimsbf |
| length | | 16 | uimsbf |
| } else if (location_type == '0x0B') { | | | |
| prefix_index | | 8 | uimsbf |
| URL_length | N1 | 8 | uimsbf |
| For (i=0; i<N1; i++) { | | | |
| URL_byte | | 8 | uimsbf |
| } | | | |
| } else if (location_type == '0x0C') { | | | |
| prefix_index | | 8 | uimsbf |
| URL_length | N2 | 8 | uimsbf |
| For (i=0; i<N2; i++) { | | | |
| URL_byte | | 8 | uimsbf |
| } | | | |
| byte_offset | | 16 | uimsbf |
| length | | 16 | uimsbf |
| } else if (location_type == '0x0D') { | | | |
| } | | | |
| } | | | |

In Table 5, semantics of each syntax element are as follows:

location_type: This field indicates the type of the location reference information as defined in Table 6.

TABLE 6

| Value | Meaning |
|---|---|
| 0x00 | A module in the same program item components in the same IP packet application data flow as the IP application data flow that carries a data structure including this field |
| 0x01 | A program item component in the same IP application data flow as the IP application data flow that carries a data structure including this field |
| 0x02 | A module in a program component in the same IP application data flow as the IP application data flow that carries a data structure including this field |
| 0x03 | A program item component in an IP version 4 application data flow |
| 0x04 | A module in a program component in an asset path in an IP version 4 application data flow |
| 0x05 | A program component in an IP version 6 application data flow |
| 0x06 | A module in a program component in an IP version 6 application data flow |

TABLE 6-continued

| Value | Meaning |
|---|---|
| 0x07 | An ES in the same MPEG-2 TS as the MPEG-2 TS that carries the data structure including this field |
| 0x08 | An ES in a MPEG-2 TS in the same broadcast network as the broadcast network that carries the data structure including this field |
| 0x09 | An ES in a MPEG-2 TS in a broadcast network |
| 0x0A | A data block (i.e., byte range) in the same data structure or the same file including this field. This data block is specified using a byte offset and a length (the number of bytes) from the first byte of a data structure or the first byte of a file |
| 0x0B | A URL |
| 0x0C | A byte range in the file addressed by a URL |
| 0x0D | A value used in alternate_package_descriptor or alternate_program_descriptor. Location reference information is used, which is stored in a receiver in the previous period and corresponds to a live broadcast program channel used just before alternative program is watched by a viewer (this information is used for channel switching from an alternative program to a live broadcast program). |
| 0x0E~0xFF | reserved for future use |

AMID: An identifier of a module within an asset path.

APID: An identifier of an asset path within an IP application data flow.

ipv4_src_addr: An IP version 4 source address of an IP application data flow.

ipv4_dst_addr: An IP version 4 destination address of an IP application data flow.

dst_port: A destination port number of an IP application data flow.

ipv6_src_addr: An IP version 6 source address of an IP application data flow.

ipv6_dst_addr: An IP version 6 destination address of an IP application data flow.

network_id: A broadcast network identifier that carries an MPEG-2 TS.

MPEG_2_transport_stream_id: An identifier of an MPEG-2 TS.

MPEG_2_PID: A PID of an MPEG-2 TS packet.

prefix index: An index indicating one of the prefixes which are stored in a receiver before this field is decrypted. If a value of this field is 0xFF, it indicates that there is no prefix.

URL_length: A length in bytes of a URL. The last null byte (0x00) of the string is not counted.

URL_byte: Byte data in a URL. The last null byte (0x00) of the string is not included.

byte_offset: A byte offset from the first byte of a file.

length: A length in bytes.

A Package Packing Table (PPT), in the case of broadcasting using a broadcast-only physical channel, is used to deliver simple guide information for a program item and its associated package, location reference information for more detailed program guide information, a structure of a program item, and location reference information of its component. Preferably, a PPT is transmitted in a period of 500 ms or less.

The syntax of a PPT is almost the same as the syntax of an SMT-S except that in the syntax of the SMT-S, a service_id syntax element is replaced with a package_path_number syntax element. The syntax of a PPT is as shown in Table 7. Because most syntax elements of the PPT are the same as those of the SMT-S in terms of semantics, only the syntax elements having different meanings are defined.

TABLE 7

| Syntax | Value | No. of Bits | Format |
|---|---|---|---|
| package_packing_table( ) { | | | |
| table_id | | 8 | uimsbf |
| version_id | | 8 | uimsbf |
| table_length | | 16 | uimsbf |
| package_path_number | | 16 | uimsbf |
| PPT_update_version | | 8 | uimsbf |
| PPT_body( ) | | | |
| CRC_32 | | 32 | rpchof |
| } | | | |

In Table 7, semantics of each syntax element are as follows:

table_id: An identifier indicating the type of the table. A unique value corresponding to a PPT is assigned.

package_path_number: A package path number for distinguishing logical channels in a certain broadcast channel. A value of '0' is not used. The package_path_number is uniquely assigned in a physical channel by a broadcaster or a group of broadcasters.

A Package Guide Table (PGT) is program guide information, and may guide programs scheduled (or organized) for all broadcasts that a broadcaster or a group of broadcasters are operating. Preferably, a PGT is transmitted in a period of 1 minute or less.

A PGT basically provides guide information on a program item basis. A receiver may provide the guide information by sorting it for individual physical channels or logical channels. Of course, a PGT includes information that makes the sorting possible. A transmitter may deliver program item guide information by arranging it according to certain rules.

A program item is identified by an identifier package_id of a package, which is an encoded form of the program item. The package_id makes it possible to uniquely identify a program item provided by a broadcaster or a group of broadcasters. A broadcaster or a group of broadcasters is uniquely identified by PGT_provider_id. The PGT_provider_id needs to be assigned by specifying a registration authority and upon request of a broadcaster or a group of broadcasters. As for the package_id, a broadcaster or a group of broadcasters uniquely assigns it to its program item by itself. The package_id, which has a 16-bit value, makes it possible to identify a finite number of program items, so it needs to be reused after a predetermined period of time.

Upon the reuse, package_id_recycle_number (which is one of the syntax elements included in PGT_package_info( ) and includes 8 bits) is increased by one. A 3-information pair, which includes PGT_provider_id, package_id_recycle_number, and package_id, is a globally unique identifier for a certain program item or its associated package until the package_id_recycle_number is exhausted. For example, if it takes one year until the package_id is exhausted, its uniqueness is guaranteed for about 256 years because package_id_recycle_number includes 8 bits.

A PGT includes an identifier of a broadcaster or a group of broadcasters that provides the PGT, an update version, a URL of a homepage of a broadcaster or a group of broadcasters that provides the PGT, update module information, logical channel information, package information, associated table information, etc. The update module information is in the form of delta information, and includes only the different parts of the previous PGT version distinguishable from the current PGT version. If update module information corresponding to one or two days is included in a PGT, a PGT update process in a receiver may be performed very efficiently.

The syntax of a PGT is as shown in Table 8.

TABLE 8

| Syntax | Value | No. of Bits | Format |
|---|---|---|---|
| package__guide__table( ) { | | | |
|     table__id | | 8 | uimsbf |
|     version__id | | 8 | uimsbf |
|     PGT__provider__id | | 16 | uimsbf |
|     PGT__update__version | | 8 | uimsbf |
|     table__length | | 16 | uimsbf |
|     PGT__prefix count | N1 | | uimsbf |
|     for (i=0; i<N1; i++) { | | | |
|         PGT__prefix__length | N2 | | uimsbf |
|         for (j=0; j<N2; j++) { | | | |
|             PGT__prefix__byte | | | uimsbf |
|         } | | | |
|     } | | | |
|     PGT__provider__homepage__URL__prefix__index | | 8 | uimsbf |
|     PGT__provider__homepage__URL__length | N3 | 8 | uimsbf |
|     for (i=0; i<N3; i++) { | | | |
|         PGT__provider__homepage__URL__byte | | 8 | uimsbf |
|     } | | | |
|     PGT__descriptors__length | N4 | 16 | uimsbf |
|     for (i=0; i<N4; i++) { | | | |
|         PGT__descriptor( ) | | | |
|     } | | | |
|     redirect__flag__for__delta__update__info | | 1 | bslbf |
|     redirect__flag__for__logical__channel__info | | 1 | bslbf |
|     redirect__flag__for__package__info | | 1 | bslbf |
|     redirect__flag__for__associated__table__info | | 1 | bslbf |
|     reserved | '1111' | 4 | bslbf |
|     PGT__delta__update__info__molude__count | N5 | 8 | uimsbf |
|     if (redirect__flag__for__delta__update__info == 1) { | | | |
|         for (i=0; i<N5; i++) { | | | |
|             PGT__update__delta | | 8 | uimsbf |
|             MMT__general__location__info( ) | | | |
|         } | | | |
|     } else { | | | |
|         for (i=0; i<N5; i++) { | | | |
|             PGT__delta__update__info__module( ) | | | |
|         } | | | |
|     } | | | |
|     if (redirect__flag__for__logical__channel__info == 1) { | | | |
|         PGT__logical__channel__info__update__version | | 8 | uimsbf |
|         MMT__general__location__info( ) | | | |
|     } else { | | | |
|         PGT__logical__channel__info( ) | | | |
|     } | | | |
|     if (redirect__flag__for__package__info == 1) { | | | |
|         PGT__package__info__module__count | N6 | 8 | uimsbf |
|         for (i=0; i<N6; i++) { | | | |
|             PGT__package__info__module__id | | 8 | uimsbf |
|             PGT__package__info__module__update__version | | 8 | uimsbf |
|             MMT__general__location__info( ) | | | |
|         } | | | |
|     } else { | | | |
|         PGT__package__count | N7 | 16 | uimsbf |
|         for (i=0; i<N7; i++) { | | | |
|             PGT__package__info( ) | | | |
|         } | | | |
|     } | | | |
|     if (redirect__flag__for__associated__table__info == 1) { | | | |
|         PGT__associated__table__info__module__count | N8 | 8 | uimsbf |
|         for (i=0; i<N8; i++) { | | | |
|             PGT__associated__table__info__module__id | | 8 | uimsbf |

TABLE 8-continued

| Syntax | Value | No. of Bits | Format |
|---|---|---|---|
| PGT_associated_table_info_module_update_version | | 8 | uimsbf |
| MMT_general_location_info( ) | | | |
| } | | | |
| } else { | | | |
| PGT_associated_table_count | N9 | 8 | uimsbf |
| for (i=0; i<N9: i++) { | | | |
| PGT_associated_sub_table_count | N10 | 8 | uimsbf |
| for (i=0; i<N10; i++) { | | | |
| PGT_associated_sub_table( ) | | | |
| } | | | |
| } | | | |
| } | | | |
| CRC_32 | | | rpchof |
| } | | | |

In Table 8, semantics of each syntax element are as follows:

table_id: An identifier indicating the type of the table. A unique value corresponding to a PGT is assigned.

version_id: An identifier indicating the structure of this table. If the structure of the table is modified by an amendment of the standard, this value is also changed. Based on this value, a receiver determines whether this table is configured such that it can understand the content of the table. This value is incremented only when the content of the table is amended to be incompatible with the existing one.

PGT_provider_id: A unique identifier of the organization that provides this PGT. An organization can provide only one PGT, and PGT_provider_id is assigned by an appropriate registration authority.

PGT_update_version: A version number indicating whether content of a PGT is changed. If the content of a PGT is updated, a value of this number is incremented by one. This value is reset to 0 after its maximum value of 255. A receiver reads again and parses content of a PGT, if this value is different from the version number of a PGT that the receiver stored in its memory in the previous period.

table_length: The number of bytes counted from the next field to the last byte of package_guide_table( ). A value of 0 is not used.

PGT_prefix_count: The number of the prefixes used in a PGT. The prefixes are concatenated in front of a string included in a PGT. When desiring to reference a prefix, a receiver references a prefix by using its prefix occurrence order as an index. The value 0xFF is not used as an index value. Therefore, a PGT may include a maximum of 255 prefixes.

PGT_prefix_length: A length of a PGT_prefix string.

PGT_prefix_byte: A byte in a PGT_prefix string. The last null byte of the string is not included.

PGT_provider_homepage_URL_prefix_index: An index to the list of prefixes for the homepage URL of the organization that provides this PGT. A value of the index specifies one of the preceding prefixes. If a value of this field is 0xFF, it indicates that there is no prefix string.

PGT_provider_homepage_URL_length: A length in bytes of the following postfix of the homepage URL of the organization that provides this PGT.

PGT_provider_homepage_URL_byte: An ASCII character value of the postfix of the homepage URL of the organization that provides this PGT.

PGT_descriptors_length: A length in bytes of the following descriptor syntax loop.

PGT_descriptor( ): A descriptor related to this PGT.

redirect_flag_for_delta_update_info: If a value of this flag is '0', PGT update information is directly included in this PGT. Otherwise, if a value of this flag is '1', it is located in another place.

redirect_flag_for_logical_channel_info: If a value of this flag is '0', logical channel information is directly included in this PGT. Otherwise, if a value of this flag is ' '1, it is located in another place.

redirect_flag_for_package_info: If a value of this flag is '0', package guide information is directly included in this PGT. Otherwise, if a value of this flag is '1', it is located in another place.

redirect_flag_for_associated_table_info: If a value of this flag is '0', associated table information is directly included in this PGT. Otherwise, if a value of this flag is '1', it is located in another place.

PGT_delta_update_info_molude_count: The number of PGT_delta_update_info_modules.

PGT_update_delta: A value corresponding to a difference between the previous PGT version and the current PGT version. This value is a criterion used to generate a PGT_delta_update_module. The following MMT_general_location_info( ) specifies a location of a PGT_delta_update_info_module( ).

PGT_delta_update_info_module( ): A data module composed of only delta (or different) information between the PGT with an update version of PGT_update_delta and the current version of this PGT.

PGT logical channel info update version: A version of the PGT_logical_channel_info( ) defined in Table 10. The MMT_general_location_info( ) following this field provides a location of the PGT_logical_channel_info( ).

PGT_logical_channel_info( ): The logical channel information defined in Table 10.

PGT_package_info module count: The number of the PGT_package_info_module( ).

PGT_package_info_module_id: An identifier of a PGT_package_info_module( ).

PGT_package_info_module_update_version: A version of a PGT_package_info_module( ). The MMT_general_location_info( ) following this field provides a location of the PGT_package_info_module( ).

PGT_package_count: The number of packages.

PGT_package_info( ): Package guide information as defined in Table 11. A PGT_package_info( ) includes guide information of only one package.

PGT_associated_table_info_module_count: The number of PGT_associated_table_info_module( )s.

PGT_associated_table_info_module_id: An identifier of PGT_associated_table_info_module( ).

PGT_associated_table_info_module_update_version: A version of PGT_associated_table_info_module( ). The MMT_general_location_info( ) following this field provides a location of the PGT_associated_table_info_module( ).

PGT_associated_table_count: The number of the tables associated with this PGT. All tables with the identical table_id are treated as one table.

PGT_associated_sub_table_count: The number of the sub-tables within a PGT-associated table.

PGT_associated_sub_table( ): A sub-table within a PGT-associated table.

The PGT_delta_update_info_module( ) is a syntax element group including only the updated information in the content of the PGT. The PGT_delta_update_info_module( ) may optionally include updated logical channel information, updated individual package information, and each updated associated sub-table.

A receiver parses a PGT_descriptor( ) loop as well in the content of the PGT, if the PGT_update_version is different from a PGT version it stores in its memory. The receiver determines if there is a PGT_update_delta, which is a difference obtained by subtracting the PGT version it stores in its memory, from the PGT_update_version. If the PGT_update_delta exists, the receiver may complete PGT update by parsing the PGT_delta_update_info_module( ).

The syntax of the PGT_delta_update_info_module( ) is as shown in Table 9.

TABLE 9

| Syntax | Value | No. of Bits | Format |
|---|---|---|---|
| PGT_delta_update_info_module( ) { | | | |
| PGT_update_delta | | 8 | uimsbf |
| PGT_delta_update_info_module_length | | 16 | uimsbf |
| update_logical_channel_info_flag | | 1 | uimsbf |
| update_package_info_flag | | 1 | uimsbf |
| update_associated_table_flag | | 1 | uimsbf |
| reserved | '1 1111' | 5 | uimsbf |
| if (update_logical_channel_info_flag == 1) | | | |
| { | | | |
| PGT_logical_channel_info( ) | | | |
| } | | | |
| if (update_package_info_flag == 1) { | N1 | 16 | uimsbf |
| PGT_package_update_count | | | |
| for (i=0; i<N1; i++) { | | | |
| PGT_packagc_info( ) | | | |
| } | | | |
| } | | | |
| if (update_associated_table_flag == 1) { | N2 | 16 | uimsbf |
| PGT_associated_table_update_count | | | |
| for (i=0; i<N2; i++) { | | | uimsbf |
| PGT_associated_sub_table( ) | | | |
| } | | | |
| } | | | |
| } | | | |

In Table 9, semantics of each syntax element are as follows:

PGT_update_delta: A value corresponding to a difference between the previous PGT version and the current PGT version. This value is a criterion used to generate a PGT_delta_update_module.

PGT_delta_update_info_molude_length: The number of bytes counted from the next byte after this field to the last byte of this PGT_delta_update_info_module( ).

update_logical_channel_info_flag: If a value of this flag is '1', it indicates that update information for logical channel information is included in this PGT_delta_update_info_module( ).

update_package_info_flag: If a value of this flag is '1', it indicates that update information for package guide information is included in this PGT_delta_update_info_module( ).

update_associated_table_flag: If a value of this flag is '1', it indicates that update information for PGT-associated table information is included in this PGT_delta_update_info_module( ).

PGT_logical_channel_info( ): Logical channel information as defined in Table 10.

PGT_package_update_count: The number of packages included in the following syntax loop.

PGT_package_info( ): Package guide information as defined in Table 11.

PGT associated table update count: The number of sub-tables included in the following syntax loop of the update information for PGT-associated table information.

PGT_associated_sub_table( ): A sub-table in a PGT-associated table.

The PGT_logical_channel_info( ) is a syntax element group included in the PGT and corresponding to metadata for all logical channels that a PGT provider provides.

The syntax of the PGT_logical_channel_info( ) is as shown in Table 10. It is to be noted that a syntax loop index PGT_logical_channel_index is an index used in package guide information.

TABLE 10

| Syntax | Value | No. of Bits | Format |
|---|---|---|---|
| PGT_logical_channel_info( ) { | | | |
| PGT_logical_channel_info_update_version | | 8 | uimsbf |
| PGT_logical_channel_info_length | | 16 | uimsbf |
| PGT_logical_channel_count | N1 | 16 | uimsbf |
| for (PGT_logical_channel_index =i=0; i<N1; i++) { | | | |
| short_channel_name_length | | 8 | uimsbf |
| for (j=0; j<N2; j++) { | N2 | | |
| short_channel_name_byte | | 8 | uimsbf |
| } | | | |
| reserved | '11 1111' | 6 | bslbf |
| physical_channel_type | | 2 | uimsbf |
| if (physical_channel_type != 0) { | | | |
| major_channel_number | | 12 | uimsbf |
| minor_channel_number | | 12 | uimsbf |
| } | | | |
| service_id | | 16 | uimsbf |
| if (physical_channel_type != 0) { | | | |
| package_path_number | | 16 | uimsbf |
| } | | | |
| reserved | '111' | 3 | bslbf |
| test_channel_flag | | 1 | bslbf |
| nvod_channel_flag | | 1 | bslbf |
| relay_broadcast_flag | | 1 | bslbf |
| channel_protection_type | | 2 | uimsbf |
| for (relay_broadcast_flag == 1) { | | | |
| reserved | '11 1111' | 6 | bslbf |
| original_physical_channel_type | | 2 | uimsbf |
| if (original_physical_channel_type != 0) { | | 12 | uimsbf |
| original_major_channel_number | | 12 | uimsbf |
| original_minor_channel_number | | | |
| } | | | |
| } | | | |
| MMT_general_location_info( ) | N3 | 16 | uimsbf |
| descriptors_length | | | |
| for (j=0; j<N3; j++) { | | | |
| descriptor( ) | | | |
| } | | | |
| } | | | |
| } | | | |

In Table 10, semantics of each syntax element are as follows:

PGT_logical_channel_info_update_version: A version of PGT_logical_channel_info( ). A value of this field is incremented by one whenever content of logical channel information is changed. A value of 255 is reset to 0.

PGT_logical_channel_info_length: The number of bytes counted from the next byte after this field to the last byte of this PGT_logical_channel_info( ).

PGT_logical_channel_count: The number of logical channels for which PGT provides guide information.

short_channel_name_length: The number of bytes of a logical channel name expressed in a string that uses UTF-8 encoding.

short_channel_name_byte: Byte data constituting a logical channel name physical_channel_type: A type of the physical channel that carries this logical channel. If a value of this field is '0', it indicates the Internet; if '1', a terrestrial channel; if '2', a satellite channel; and if '3', a cable channel.

major_channel_number: A major channel number.

minor_channel_number: A minor channel number.

service_id: An identifier of an MMT broadcast service.

package_path_number: A package path number for distinguishing logical channels in a certain broadcast channel. A value of '0' is not used. The package_path_number is uniquely assigned in a physical channel by a broadcaster or a group of broadcasters.

test_channel_flag: This flag indicates that this logical channel is a test channel. If a value of this flag is '1', normal receivers do not provide information on this logical channel during the program guide.

nvod_channel_flag: This flag indicates that this logical channel is for use of Near Video On Demand (NVOD).

relay_broadcast_flag: This flag indicates that this logical channel is a relay broadcast channel for other logical channel. For example, if a cable channel relays a terrestrial broadcast channel, this flag is set to '1' for the logical channel.

channel_protection_type: This field indicates the protection type applied to this logical channel. If a value of this field is '0', it indicates that no protection is applied; if '1', it indicates that all the packages in this logical channel are protected; if '2', it indicates that some or all assets for all the packages delivered by this logical channel are partially or completely protected; and if '3', it indicates that some packages delivered by this logical channel are protected. For example, if a value of this field is '2', it indicates that protected is only the video out of a package or the first 10 minutes of a package. As another example, if a value of this field is '3', it is implied that a few out of all the packages delivered by this logical channel are protected.

original physical_channel_type: A type of the original physical channel.

original_major_channel_number: The original major channel number.

original_minor_channel_number: The original minor channel number.

MMT_general_location_info( ): This syntax element group provides the location information of the PPT or the SMT-S currently carried by this logical channel.

descriptors_length: A length in bytes of the following descriptor syntax loop.

descriptor( ): A descriptor related to this logical channel information.

The PGT_package_info( ) is a syntax element group corresponding to metadata for one package, in the content of a PGT. The syntax of the PGT_package_info( ) is as shown in Table 11.

TABLE 11

| Syntax | Value | No. of Bits | Format |
|---|---|---|---|
| PGT_package_info( ) { | | | |
| package_id | | 16 | uimsbf |
| PGT_package_info_update_version | | 8 | uimsbf |
| PGT_package_info_length | | 16 | uimsbf |
| package_id_recycle_number | | 8 | uimsbf |
| start_time | | 32 | uimsbf |
| duration | | 20 | uimsbf |
| title_text_language_count | N1 | 4 | uimsbf |
| for (i=0; i<N1; i++) { | | | |
| title_text_language | | 3*8 | uimsbf |
| title_text_length | N2 | 8 | uimsbf |
| for (j=0; j<N2; j++) { | | | |
| title_text_byte | | 8 | uimsbf |
| } | | | |
| } | | | |
| package_homepage_URL_prefix_index | | 8 | uimsbf |
| package_homepage_URL_length | N3 | 8 | uimsbf |
| for (i=0; i<N3; i++) { | | | |
| package_homepage_URL_byte | | 8 | uimsbf |
| } | | | |
| reserved | '1111' | 4 | bslbf |
| format_type | | 4 | uimsbf |
| if (format_type == 0) { | | | |
| PGT_logical_channel_index | | 16 | uimsbf |
| } else if (format_type == 1) { | | | |
| reserved | '111 | 7 | bslbf |
| post_event_replay_URL_flag | 1111' | 1 | bslbf |
| if (post_event_replay_URL_flag == 1) { | | | |
| post_event_replay_URL_prefix_index | | 8 | uimsbf |
| post_event_replay_URL_length | | 8 | uimsbf |
| for (i=0; i<N4; i++) { | N4 | | |
| post_event_replay_URL_byte | | 8 | uimsbf |
| } | | | |

TABLE 11-continued

| Syntax | Value | No. of Bits | Format |
|---|---|---|---|
| } | | | |
| } else if (format_type == 2) { | | | |
| PGT_logical_channel_index | | 16 | uimsbf |
| package_protection_type | | 2 | uimsbf |
| pay_type | '1' | 1 | bslbf |
| content_id_flag | | 1 | bslbf |
| genre_flag | | 1 | bslbf |
| parental_guidance_flag | | 1 | bslbf |
| live_flag | | 1 | bslbf |
| serial_flag | | 1 | bslbf |
| rebroadcast_flag | | 1 | bslbf |
| rebroadcast_exist_flag | | 1 | bslbf |
| recording_flag | | 1 | bslbf |
| multilingual_flag | | 1 | bslbf |
| commentary_channel_flag | | 1 | bslbf |
| sign_language_flag | | 1 | bslbf |
| subtitles_flag | | 1 | bslbf |
| multivew_flag | | 1 | bslbf |
| picture_size_grade_count | | 4 | uimsbf |
| for (i=0; i<N5; i++) { | | | |
| picture_size_grade | | 4 | uimsbf |
| } | | | |
| if (not byte-aligned) { | | | |
| reserved | | 4 | bslbf |
| } | '1111' | | |
| audio_language | | 3*8 | uimsbf |
| audio_grade | | 4 | uimsbf |
| if (mutilingual_flag == 1) { | | | |
| additional_audio_count | | 4 | uimsbf |
| for (i=0; i<N6; i++) { | N6 | | |
| additional_audio_language | | 3*8 | uimsbf |
| additional_audio_grade | | 4 | uimsbf |
| } | | | |
| } | | | |
| if (not byte-aligned) { | | | |
| reserved | | 4 | bslbf |
| } | '1111' | | |
| if (content_id_flag == 1) { | | | |
| content_originator_id | | 32 | uimsbf |
| content_id | | 32 | uimsbf |
| content_major_version | | 4 | uimsbf |
| content_minor_version | | 4 | uimsbf |
| } | | | |
| if (genre_flag == 1) { | | | |
| genre_system_id | | 8 | uimsbf |
| major_genre_index | | 8 | uimsbf |
| minor_genre_index | | 8 | uimsbf |
| } | | | |
| if (parental_guidance_flag == 1) { | | | |
| rating_system_id | | 8 | uimsbf |
| rate_index | | 8 | uimsbf |
| } | | | |
| if (serial_flag == 1) { | | | |
| season_number | | 8 | uimsbf |
| serial_number_minus1 | | 16 | uimsbf |
| prequel_package_id | | 16 | uimsbf |
| sequel_package_id | | 16 | uimsbf |
| } | | | |
| if (rebroadcast_exist_flag == 1) { | | | |
| rebroadcast_package_id | | 16 | uimsbf |
| } | | | |
| if (commentary_channel_flag == ) { | | | |
| commentary_channel_count | N7 | 8 | uimsbf |
| for (i=0; i< N7 ; i++) { | | | |
| commentary_language | | 3*8 | uimsbf |
| } | | | |
| } | | | |
| if (subtitles_flag == 1) ( | | | |
| subtitle_count | N8 | 8 | uimsbf |
| for (i=0; i<N8; i++) { | | | |
| subtitle_language | | 3*8 | uimsbf |
| karaoke_flag | | 1 | uimsbf |
| } | | | |
| } | | | |
| if (multiview_flag == 1) | | | |
| multiview_coverage_type | | 2 | uimsbf |
| multiview_scheme_type | | 6 | uimsbf |

TABLE 11-continued

| Syntax | Value | No. of Bits | Format |
|---|---|---|---|
| } | | | |
| } | | | |
| PGT__package__info__descriptors__length | N9 | | uimsbf |
| for (i=0; i<N9; i++) { | | | |
| PGT__package__info__descriptor( ) | | | |
| } | | | |
| } | | | |

In Table 11, semantics of each syntax element are as follows:

package_id: An identifier of a package which is presently being delivered by this logical channel. The package_id is a value that a broadcaster assigns for each package, and has a unique value for the packages that a broadcaster or a group of broadcasters provides over a period of time. This value may be reused after a predetermined period of time.

PGT_package_info_update_version: A version of PGT_package_info( ). A value of this field is incremented by one, whenever content of package information is changed. A value of 255 is reset to 0.

PGT_package_info_length: The number of bytes counted from the next byte after this field to the last byte of this PGT_package_info( ).

package_id_recycle_number: A value of this field is incremented by one, whenever assignment of the 16-bit number for package_id is completed. This field, together with package_id, constitutes a unique package identifier.

start_time: A start time of a program item corresponding to this package. A value of this field is represented in a UTC format.

duration: A duration of a program item corresponding to this package is represented in seconds. If a value of this field is '0', it means that the duration is unknown.

title_text_language_count: The number of different languages that express the title text of a program item corresponding to this package.

title_text_language: a 3-byte language identifier indicating the title language of a program item corresponding to this package and defined in ISO 639 standard.

title_text_length: This field indicates in bytes a length of the UTF-8 string representing the title text of a program item corresponding to this package.

title_text_byte: A byte in the title text of a program item corresponding to this package.

package_homepage_URL_prefix_index: An index to the list of prefixes for the homepage URL of a program item corresponding to this package. This field has a value specifying one of the prefixes defined in PGT_header( ). If a value of this field is 0xFF, it indicates that there is no prefix.

package_homepage_URL_length: A length in bytes of the following postfix of the homepage URL of a program item corresponding to this package.

package_homepage_URL_byte: An ASCII character value of the postfix of the homepage URL of a program item corresponding to this package.

format_type: This field indicates the format of this PGT_package_info( ). If a value of this field is '0', PGT_package_info( ) includes minimum information on a current or a future package; if '1', PGT_package_info( ) includes only "re-view" service information on a past package; and if '2', PGT_package_info( ) includes complete information on a current or a future package. A re-view service is a download or streaming service, free or paid, through the Internet by which a viewer can enjoy a past but missed package.

PGT_logical_channel_index: An index indicating information about logical channels carrying this package. A value of this index is an index of logical channels provided by PGT_logical_channel_info( ) defined in Table 10.

post_event_replay_URL_flag: This flag indicates that there is a "re-view" URL for this package.

post_event_replay_URL_prefix_index: An index to a prefix of the "re-view" URL of this package. This field has a value indicating one of the prefixes defined in PGT_header ( ). If a value of this field is '0', it indicates that there is no prefix. If a value of this field is not '0' but 'N', it specifies an N-th prefix.

post_event_replay_URL_length: A length in bytes of the following postfix of the "re-view" URL of this package.

post_event_replay_URL_byte: An ASCII character value of the postfix of the "re-view" URL of this package.

package_protection_type: This field indicates the protection type applied to this package. If a value of this field is '0', it indicates that no protection is applied;

if '1', it indicates that all the assets in this package are protected; and if '2', it indicates that some assets in this package are partially or completely protected. The value '3' is reserved and not used. For example, if a value of this field is '2', protected is only the video asset of this package or the first 10 minutes of the video and the audio assets of this package.

pay_type: This field has no meaning and is ignored by a receiver when the package_protection_type is '0'. This field has a meaning only when the package_protection_type is '1' or '2'. If a value of this field is '0', it indicates that a subscription is required to view this package, and if '1', it indicates that this package is for pay-per-view. The related payment information needs to be provided using a descriptor within PGT_descriptor( ) syntax loop in Table 8 or PGT_package_info descriptor( ) syntax loop in Table 11. If the same payment information is provided both in PGT_descriptor( ) syntax loop and PGT_package_info descriptor( ) syntax loop, the one in PGT_package_info descriptor( ) syntax loop takes precedence.

content_id_flag: If a value of this flag is '1', it indicates that a globally unique content identifier for a program item corresponding to this package is included in the following.

genre_flag: If a value of this flag is '1', it indicates that genre information for a program item corresponding to this package is included in the following. When a value of this flag is '1', a genre table needs to be delivered to receivers as a PGT associated table.

parental_guidance_flag: If a value of this flag is ' 1', rating information is included in the following. When a value of this flag is ' 1', a rating table needs to be delivered to receivers as a PGT associated table.

live_flag: If a value of this flag is '1', it indicates that this package is from a live content rather than a pre-recorded content.

serial_flag: If a value of this flag is '1', it indicates that a program item corresponding to this package is an instance of a serial content such as a serial drama.

rebroadcast_flag: If a value of this flag is '1', it indicates that a program item corresponding to this package is a rebroadcast of a previously broadcasted program item.

rebroadcast_exist_flag: If a value of this flag is '1', it indicates that there is a rebroadcast schedule for a program item corresponding to this package.

recording_flag: If a value of this flag is '1', it is allowed to record this package into internal storage of a receiver.

multilingual_flag: If a value of this flag is '1', it indicates that this package has multilingual audio.

commentary_channel_flag: If a value of this flag is '1', it indicates that this package has one or more commentary channels.

sign_language_flag: If a value of this flag is '1', it indicates that this package has a sign language channel.

subtitles_flag: If a value of this flag is '1', it indicates that this package has one or more subtitles. Character in all subtitles may be UTF-8 encoded.

multivew_flag: If a value of this flag is '1', it indicates that the whole package or some parts of the package is multiview broadcasting. The multiview broadcasting includes stereoscopic broadcasting, multiview 3D broadcasting, inward/outward multiview broadcasting, and the like.

picture_size_grade_count: The number of picture size levels provided by this package. If a value of this field is greater than or equal to '2', it indicates that multiple picture size levels are provided by simulcast or spatial scalability encoding.

picture_size_grade: A grade of a picture size. For example, if a value of this field is '0', it indicates that the horizontal resolution of the picture is of 240-pixel grade; if '1', it indicates that the horizontal resolution of the picture is of 480-pixel grade; if '2', it indicates that the horizontal resolution of the picture is of 720-pixel grade; if '3', it indicates that the horizontal resolution of the picture is of 1280-pixel grade; if '4', it indicates that the horizontal resolution of the picture is of 1,920-pixel grade; if '5', it indicates that the horizontal resolution of the picture is of 3,840-pixel grade, and if '6', it indicates that the horizontal resolution of the picture is of 7,680-pixel grade. If there are two or more picture_size_grades, it indicates that video is provided by spatial scalability encoding.

audio_language: 3-byte ISO 639 language identifier for an audio.

audio_grade: This field indicates a grade of an audio. For example, if a value of this field is '0', it indicates that the audio is mono; if '1', it indicates that the audio is stereo; if '2', it indicates that the audio is a 5.1 channel audio; and if '3', it indicates that the audio is a 22.2 channel audio.

additional_audio_count: The number of other additional audios.

additional audio_language: 3-byte ISO 639 language identifier for an additional audio for a language different from that of the main audio.

additional audio_grade: This field indicates a grade of another additional audio. For example, if a value of this field is '0', it indicates that the audio is mono; if '1', it indicates that the audio is stereo; if '2', it indicates that the audio is a 5.1 channel audio; and if '3', it indicates that the audio is a 22.2 channel audio.

content_originator_id: A globally unique identifier of the content creator of a program item corresponding to this package. This identifier needs to be registered through an appropriate registration authority before its use.

content_id: A content identifier for a program item corresponding to this package. This identifier is managed by each content creator. A pair of a content_originator_id and a content_id is a globally unique content identifier.

content_major_version: A major version of the content of a program item corresponding to this package.

content_minor_version: A minor version of the content of a program item corresponding to this package.

genre_system_id: An identifier of the genre classification system. This field is in fact a sub_table_id in a genre table.

major_genre: An index of the major genre of a program item corresponding to this package. This field is in fact an index to a major genre entry in the genre table. For example, a major genre may be "sports".

minor_genre: An index of the minor genre of a program item corresponding to this package. This field is in fact an index to a minor genre entry in the genre table. For example, a minor genre may be "soccer" among "sports".

rating_system_id: An identifier of the rating classification system. This field is in fact a sub_table_id in a rating table.

rate_index: An index of the rating of a program item corresponding to this package. This field is in fact an index to a rating entry in the rating table.

season_number: A season number of a serial package. If a value of this field is '0', it indicates that there no season in the serial package.

serial_number_minus_1: A serial number minus 1 of a serial package. If there are seasons in the serial package, the serial number is counted within a season.

prequel_package_id: A package_id of the prequel package of a program item corresponding to this package. If a value of this field is '0', it indicates that a program item corresponding to this package is the first instance in the season of the serial package.

sequel_package_id: A package_id of the sequel package of a program item corresponding to this package. If a value of this field is '0', it indicates that a program item corresponding to this package is the last instance in the season of the serial package.

rebroadcast_package_id: A package_id of a package corresponding to a rebroadcast for this package.

commentary_channel_count: The number of the commentary channels in different languages included in this package.

commentary_language: A 3-byte ISO 639 language identifier for a commentary channel of this package.

subtitle_count: The number of subtitles in different languages included in this package.

subtitle_language: A 3-byte ISO 639 language identifier for a subtitle of this package.

karaoke_flag: If a value of this flag is '1', it indicates that the subtitle is in a karaoke style.

multiview_coverage_type: If a value of this field is '0', it indicates that the whole package is a multiview video, and if '1', it indicates that a part of the package is a multiview video.

multiview_scheme_type: If a value of this field is '1', it indicates that the scheme of the multiview video is stereoscopic; if '2', it indicates that the scheme of the multiview video is multiview 3D; if '3', it indicates that the scheme of the multiview video is inward multiview; if '4', it indicates that the scheme of the multiview video is outward multiview; and if '5', it indicates that the scheme of the multiview video is arbitrary multiview.

PGT_package__info_descriptors_length: A length in bytes of the following PGT_package_info_descriptor( ) syntax loop.

PGT_package_info_descriptor( ): An area where additional descriptors may be put in.

The syntax of the PGT_associated_sub_table( ) follows the syntax of the general MMT table as shown in Table 12. Semantics of each syntax element are defined in the following.

TABLE 12

| Syntax | Value | No. of Bits | Format |
|---|---|---|---|
| PGT__associated__table( ) { | | | |
| table__id | | 8 | uimsbf |
| version__id | | 8 | uimsbf |
| table__sub__id | | 16 | uimsbf |
| update__version | | 8 | uimsbf |
| table__length | | 16 | uimsbf |
| sub__table__contents( ) | | | |
| CRC__32 | | 32 | rpchof |
| } | | | |

table_id: An identifier that indicates the kind of this table.

version_id: An identifier that indicates the structure of this table. If the structure of this table is modified by an amendment of this standard, a value of this field is also changed. Based on the value of this field, a receiver determines whether this table is configured such that it can understand the content of the table. This value is incremented only when the content of the table is amended to be incompatible with the existing one.

table_sub_id: An identifier of a sub-table.

update_version: A version number indicating a change in content from the next byte after this field to the last byte of this table. If the content of this table is updated, a value of this number is incremented by one. This value is reset to 0 after its maximum value of 255. A receiver reads again and parses content of this sub-table, if this value is different from the version number of this sub-table that the receiver stored in its memory in the previous period.

table_length: A length in bytes of this sub-table counted from the next byte after this field to the last byte of this sub-table.

sub_table_contents( ): sub-table contents that are different according to each sub-table.

CRC_32: The same field as CRC_32 defined in the section syntax of the MPEG-2 system standard.

The PGT_package_info_module( ) is a data structure that includes a guide for one or more packages when a PGT indirectly includes package guide information by referencing an external path or a file having the package guide information, without directly including the package guide information.

The syntax of the PGT_package_info_module( ) as shown in Table 13, and semantics of each syntax element are as defined thereunder.

TABLE 13

| Syntax | Value | No. of Bits | Format |
|---|---|---|---|
| PGT_package_info_module( ) { | | | |
| PGT_package_info_module_id | | 8 | uimsbf |
| PGT_package_info_module_update_version | | 8 | uimsbf |
| PGT_package_info_module_length | | 16 | uimsbf |
| reserved | '111 | 7 | bslbf |
| reallocation_flag | 1111' | 1 | bslbf |
| PGT_package_count_in_this_module | | 8 | uimsbf |
| for (i=0; i<N1; i++) { | N1 | | |
| PGT_package_info( ) | | | |
| } | | | |
| CRC_32 | | | rpchof |
| } | | | |

PGT_package_info_module_id: An identifier of a PGT_package_info_module( ). This identifier can be re-used. As long as this identifier is not re-used, this module includes information about the same packages at all times.

PGT_package_info_module_update_version: An update version of a PGT_package_info( ). Whenever content of the next field is changed, this field is incremented by one regardless of whether the identifier is re-used or not. This value is reset to 0 after its maximum value of 255.

PGT_package_info_module_length: A length in bytes counted from the next byte after this field to the last byte of the PGT_package_info( ).

reallocation_flag: If a value of this field is '1', it indicates that this module includes information about packages different from the packages included in the previously received module having the same identifier as that of this module. In other words, it indicates that the identifier is re-used.

PGT_package_count_in_this_module: The number of packages, the guide information of which is included in this module.

CRC_32: The same field as CRC_32 defined in the section syntax of the MPEG-2 system standard.

An Adjunct Asset Table (AAT) carries information about adjunct assets. An AAT is periodically delivered as a separate asset that constitutes a package belonging to a primary asset corresponding to the target to which adjunct assets included in an AAT are to be synchronized.

A synchronization method between the primary asset and the adjunct assets, and a definition of the AAT are disclosed in Korean Patent Application No. P2011-0095458. In this specification, for convenience of description, the syntax of the AAT and the semantics of each field are included in the following.

The syntax of the AAT is as shown in Table 14, and the semantics of each field are as defined thereunder.

TABLE 14

| Syntax | Value | No. of bits | Format |
|---|---|---|---|
| adjunct__asset__table( ) { | | | |
| table__id | | 8 | uimsbf |
| version__id | | 8 | uimsbf |
| sub__table__id | | 10 | uimsbf |
| update__version | | 6 | uimsbf |
| table__length | | 16 | uimsbf |
| locator__prefix__count | N1 | 8 | uimsbf |
| for (i=0; i<N1; i++) { | | | |
| locator__prefix__length | N2 | 8 | uimsbf |
| for (j=0; j<N2; j++) { | | | |
| locator__prefix__byte | | 8 | uimsbf |
| } | | | |
| } | | | |
| for (i=0; i<N3; i++) { | | | |
| adjunt__asset__type | | 16 | uimsbf |
| adjuct__asset__count__minus1 | N4 | 8 | uimsbf |
| for (j=0; j<N4+1; j++) { | | | |
| adjunct__asset__id { | | | |
| provider__idendifier | | 32 | uimsbf |
| asset__identifier | | 16 | uimsbf |
| } | | | |
| execution__attribute { | | | |
| execution__on__reception | | 1 | bslbf |
| media__service__bound | | 1 | bslbf |
| execution__entry__point | | 1 | bslbf |
| reserved | ‘1’ | 1 | bslbf |
| visible__to__user | | 2 | bslbf |
| secure__execution | | 2 | bslbf |
| adjunct__asset__priority | | 8 | uimsbf |
| } | | | |
| reserved | 0x3F | 6 | bslbf |
| adjunct__asset__locator__count__minus1 | N5 | 2 | uimsbf |
| for (k=0; k<N5+1; k++) { | | | |
| adjunct__asset__locator( ) | | | |
| } | | | |
| adjunct__asset__descriptors__length | | 16 | uimsbf |
| for (k=0; k<N6; k++) { | | | |
| adjunct__asset__descriptor( ) | | | |
| } | | | |
| } | | | |
| } | | | |
| CRC__32 | | 32 | rpchof |
| } | | | |

table_id: An identifier indicating a type of a table. It assigns a unique value corresponding to the AAT.

version_id: An identifier indicating the structure of the AAT. If the structure of the table is modified by an amendment of this standard, the value of this field is also changed. A receiver, by looking into the value of this field, determines whether the receiver can understand this table.

sub_table_id: When the table is divided into several sub-tables for transmission, this field identifies each sub-table.

update_version: The AAT is periodically transmitted, such that if the content of the AAT is different from that of the most recently transmitted AAT having the same sub_table_id, this value of this field is incremented. After a maximum value of ‘255’, the value is reset to ‘0’. A receiver reads and parses the content of the AAT again if the value of this field is changed.

table_length: The number of bytes from the next field to the last byte of the AAT. The value ‘0’ is not used.

locator_prefix_count: The number of following locator_prefix strings. The locator_prefix is concatenated by adding ‘/’ to the end thereof in front of a locator string provided in the adjunct_asset_locator, thus forming an URL. In the adjunct_asset_locator, the locator_prefix is referred to by using an appearing order of the locator_prefix as an index. The value ‘0xFF’ is not used for this field. Therefore, a maximum of 255 locator_prefixs may be included.

locator_prefix_length: A length of a locator_prefix string.

locator_prefix_byte: A byte in a locator_prefix string. The terminating null byte shall not be included in the locator_prefix string.

adjunct_asset_type: A type of adjunct assets. For example, a unique value is allocated to each type, such as web documents, widgets, interactive applications, audio clips, video clips, graphics, texts, images, auxiliary media components, and the like. This adjunct_asset_type value is equally applied to adjunct assets in the following syntax loop.

adjunct_asset_count_minus1: A value less by one than the number of adjunct assets described in the following syntax loop. This value can indicate a maximum of 256 adjunct assets. If the number of adjunct assets having the same adjunct_asset_type exceeds 256, those adjunct assets are described using two or more syntax loops.

adjunct_asset_id: A globally unique identifier of 48 bits for identifying an adjunct asset. The uniqueness is maintained only for a predefined time, and after the predefined time, the identifier can be reused. To be a global identifier, this field is divided into two parts: a 32-bit provider_identifier and a 16-bit asset_identifier. The provider_identifier is assigned by a registration authority and registered for each provider, and the asset_identifier is managed by each provider.

execution_attribute: This field indicates how a receiver, upon receiving an adjunct asset, executes the adjunct asset, and includes the following fields:

execution_on_reception: A flag indicating whether to "immediately execute" an adjunct asset received by the receiver after storing the adjunct asset in an adjunct asset cache. If the adjunct asset is not immediately executed, it may be executed at a time point designated by the synchronization method suggested in the exemplary embodiment of the present invention, upon a user's selection or upon being called from another adjunct asset. If this flag is '1', execution_entry_point is also set to '1'.

media_service_bound: A flag indicating whether the adjunct asset is media-service-bound. If this flag is '1', it indicates that the adjunct asset is bound to the media service, and the adjunct asset is automatically terminated when a broadcast channel change occurs.

execution_entry_point: A flag indicating that the adjunct asset can be directly executed. If this flag is '0', the adjunct asset is indirectly executed by another adjunct asset.

visible_to_user: A 2-bit field indicating whether a user can selectively execute the adjunct asset by using an adjunct asset navigation function or whether the adjunct asset is visible when another adjunct asset navigates an adjunct asset list through an Application Programming Interface (API) provided by the receiver. The semantics of the visible_to_user are as shown in Table 15 below.

secure_execution: 2-bit information indicating whether adjunct assets are secure. The semantics of the secure_execution are as shown in Table 16 below.

adjunct_asset_priority: A field indicating the execution priority of the adjunct asset. The higher value of adjunct_asset_priority means the higher priority. When receiver resources for executing the adjunct asset are insufficient, the adjunct asset with the lowest priority among the currently executed adjunct assets is first paused or terminated.

TABLE 15

| Value | Semantics |
|---|---|
| 0b00 | This adjunct asset can neither be selectively executed by a user using an adjunct asset navigation function nor be visible when another adjunct asset navigates an adjunct asset list through an API provided by a receiver |
| 0b01 | This adjunct asset cannot be selectively executed by a user using an adjunct asset navigation function, but is visible when another adjunct asset navigates an adjunct asset list through an API provided by a receiver |
| 0b10 | reserved for future use |
| 0b11 | This adjunct asset can be selectively executed by a user using an adjunct asset navigation function, and is visible when another adjunct asset navigates an adjunct asset list through an API provided by a receiver |

TABLE 16

| Value | Semantics |
|---|---|
| 0b00 | trusted |
| 0b01 | untrusted |
| 0b10 | privileged |
| 0b11 | reserved for future use |

adjunct_asset_locator_count_minus1: A value less by one than the number of locations from which the adjunct asset is to be read. A maximum of 4 locations can be provided using 2 bits. When two or more locations are provided, the order of appearance of adjunct_asset_locator is the priority. One or more adjunct_asset_locator appear.

adjunct_asset_locator: This syntax element group provides information of a location from which the adjunct asset is to be read.

adjunct_asset_descriptors_length: This field provides the number of bytes in the range from the next byte to the last byte of the following descriptors syntax loop.

adjunct_asset_descriptor: Various descriptors may be included in this descriptor syntax loop.

CRC_32: The same field as CRC_32 defined in the section syntax of the MPEG-2 system standard (ISO/IEC 13818-1:2007).

The resource data location information, adjunct_asset_locator, indicates a location from which the adjunct asset is to be read. The adjunct asset is delivered through a carousel of a broadcast network or is downloaded over the Internet. The AAT needs to include one or more adjunct_asset_locators for each adjunct asset. The receiver reads the adjunct asset from a location designated by the first appearing adjunct_asset_locator, and if an error occurs, the receiver reads the adjunct asset from a location designated by the next adjunct_asset_locator.

The syntax of the adjunct_asset_locator is as shown in Table 17 below. Table 17 includes only the Internet case, and for the carousel case, the syntax may vary according to the carousel defined in ISO/IEC 13818-6:1998. Therefore, for the purpose of the present specification, details are not included in Table 17.

TABLE 17

| Syntax | Value | No. of bits | Format |
|---|---|---|---|
| adjunct_asset_locator( ) { | | | |
|   locator_type | | 8 | uimsbf |
|   locator_prefix_index | | 8 | uimsbf |
|   if (locator_type == 0x01) { // Internet | | | |
|     directory_path_length | N1 | 8 | uimsbf |
|     for (i=0; i<N1; i++) { | | | |
|       directory_path_byte | | 8 | uimsbf |
|     } | | | |
|     entry_path_length | N2 | 8 | uimsbf |
|     for (i=0; i<N2; i++) { | | | |

TABLE 17-continued

| Syntax | Value | No. of bits | Format |
|---|---|---|---|
| entry__path__byte | | 8 | uimsbf |
| } | | | |
| object__count | N3 | 8 | uimsbf |
| for (i=0; i<N3; i++) { | | | |
| object__path__length | N4 | 8 | uimsbf |
| for (j=0; j<N4; j++) { | | | |
| object__path__byte | | 8 | uimsbf |
| } | | | |
| } | | | |
| } else if (locator__type == 0x02) { // carousel type A | | | |
| ... // content defined differently according to carousel | | | |
| } else { // carousel type B | | | |
| ... | | | |
| } | | | |
| } | | | |

locator_type: An 8-bit field indicating whether a location from which the adjunct asset is to be read is Internet or a carousel of a broadcast network, and indicating a carousel type if the location is a carousel and various types of carousels are used together.

locator_prefix_index: An index designating one of the locator prefixes of Table 14. If the value of this field is ‘0xFF’, this means that the locator prefix is not used.

directory_path_length: A length of the following directory path. The terminating null byte of a string is not included. If the value of this field is ‘0’, the directory path is not used.

directory_path_byte: A byte of a directory path. The terminating null byte of a string is not included.

entry_path_length: A length of the following path of the initial page file. The terminating null byte of a string is not included. This field has a meaning only when the adjunct asset includes multiple files, such as a web page. If the adjunct asset is a single file, this field has a value of ‘0’.

entry_path_byte: A byte of the path of the initial page file. The terminating null byte of a string is not used.

object_count: The number of following paths for files. If this field has a value of ‘0’, the entire directory is designated.

object_path_length: A length of a string of the following file path. The terminating null byte of the string is not included.

object_path_byte: A byte of a file path. The terminating null byte of the string is not included.

As described above, several descriptors may be included in the adjuct_asset_descriptor of Table 14. These descriptors may include handler_capability_descriptor( ) indicating the capability of a receiver capable of handling adjunct assets, adjunct_asset_cache_descriptor( ) indicating the amount of memory required for management of adjunct asset caches, a valid period, and the like, display_position_descriptor( ) indicating a position on a display of a adjunct asset to be expressed on a screen, adjunct_asset_name_descriptor( ) indicating a name of an adjunct asset, which is to be shown to the user, and adjunct_asset_icon_descriptor( ) indicating an icon of an adjunct asset, which is to be shown to the user.

PGT_reference_descriptor delivers the version and location reference information of a PGT. It can be included in a SMT_M_descriptor syntax loop or a SMT_S_descriptor syntax loop (The name, SMT_S_descriptor, is used for a descriptor in the PPT_body( ) syntax element group included in an SMT-S). If there is no PGT_reference_descriptor in SMT-M or SMT-S, the service represented by the SMT-M or the SMT-S doesn’t provide package guide information.

The syntax of the PGT_reference_descriptor is as shown in Table 18, and semantics of each field are as defined thereunder.

TABLE 18

| Syntax | Value | No. of Bits | Format |
|---|---|---|---|
| PGT__reference__descriptor( ) { | | | |
| descriptor__tag | | 16 | uimsbf |
| descriptor__length | | 16 | uimsbf |
| PGT__provider__id | | 32 | uimsbf |
| PGT__update__version | | 8 | uimsbf |
| reserved | | | bslbf |
| number__of__locations | N | 4 | uimsbf |
| for (i=0; i<N; i++) { | | | |
| MMT__general__location__info( ) | | | |
| } | | | |
| } | | | |

descriptor_tag: A unique value indicating the type of this descriptor.

descriptor_length: A length in bytes counted from the next byte after this field to the last byte of this descriptor.

PGT_provider_id: A unique identifier of the organization that provide this PGT. An organization can provide only one PGT and PGT_provider_id needs to be registered before use through an appropriate registration authority.

PGT_update_version: A version number indicating whether content of a PGT is changed. If the content of a PGT is updated, a value of this number is incremented by one. This value is reset to 0 after its maximum value of 255. A receiver reads again and parses content of a PGT, if this value is different from the version number of a PGT that the receiver stored in its memory in the previous period.

number_of_locations: The number of PGT locations provided in this descriptor. The locations of the PGTs with identical update version follow this field.

MMT_general_location_info( ): This syntax element group provides a PGT location.

MMT_general_location_info( ) is a general pointer to a location and its syntax and semantics are defined in Table 5. If there are more than one MMT_general_location_info( ) in this descriptor, a receiver make access to the location in the order of the list of MMT_general_location_info( ).

An MMT_composition_descriptor provides spatial screen layout information of assets (including PPT assets) belonging to a certain package based on SMIL. If the screen layout is not changed during a playback period of a certain package, screen layout information may be provided using this descriptor. This descriptor may be included in a SMT_S_descriptor syntax loop or a PPT_descriptor syntax loop (The name, PPT_descriptor, is used for a descriptor in the PPT_body( ) syntax element group included in a PPT).

The syntax of the MMT_composition_descriptor is as shown in Table 19, and semantics of each field are as defined thereunder.

TABLE 19

| Syntax | Value | No. of Bits | Format |
|---|---|---|---|
| language__descriptor( ) { | | | |
| descriptor__tag | | 16 | uimsbf |
| descriptor__length | | 16 | uimsbf |
| version | | 8 | uimsbf |
| compression__type | | 8 | uimsbf |
| XML__length | N | 16 | uimsbf |
| for (i=0; i<N; i++) { | | | |
| XML__package__composition__byte | | 8 | uimsbf |
| } | | | |
| } | | | |

descriptor_tag: A unique value indicating the type of the descriptor.

descriptor_length: A length in bytes counted from the next byte after this field to the last byte of the descriptor.

version: A version of the package composition information. If the package composition information is changed, a value of this field is incremented by one. This value is reset to 0 after its maximum value of 255.

compression_type: A compression_type of package composition information. If a value of this field is '0', it indicates that package composition is not compressed, and if '1', it indicates that the package composition is compressed by GZIP. The other values are reserved for future use.

XML_length: A length in bytes of the package composition information.

XML_package composition byte: A byte in the package composition information, which is defined in ISO/IEC JTC 1/SC 29/WG 11 m19266.

An alternate_package descriptor is a descriptor that allows a viewer to watch an event from the beginning using an alternative package, when the viewer continuously watches the live broadcast that was interrupted due to the regular broadcast schedule, using an alternative package, or when a broadcaster live broadcasts only the second half of the entire event (e.g., golf broadcast). This alternate_package_descriptor may also be used to an alternative package for the whole (i.e., from the begging to the end) of a certain package regardless of whether it is live broadcasted or not.

An_MMT_package_descriptor may be included in a SMT_S_descriptor syntax loop or a PPT_descriptor syntax loop. If there are several locations for alternative packages, several alternate_package_descriptors may be included in the MMT_package descriptor.

Purposes, usage scenarios, definitions and usages of this descriptor are disclosed in Korean Patent Application No. P2011-0095665. In this specification, for convenience of description, the syntax of the alternate_package_descriptor is shown in Table 20, and semantics of each field are included in the following.

TABLE 20

| Syntax | Value | No. of Bits | Format |
|---|---|---|---|
| alternate__package descriptor( ) { | | | |
| descriptor__tag | | 16 | uimsbf |
| descriptor__length | | 16 | uimsbf |
| alternate__package__id | | 8 | uimsbf |
| reserved | '111 | 6 | bslbf |
| just__alternate__flag | 1111' | 1 | bslbf |
| future__flag | | 1 | bslbf |
| if (future__flag == 1) { | | | |
| time__to__future__live__package | | 16 | uimsbf |
| } | | | |
| MMT__general__location__info( ) | | | |
| text__length | | 8 | uimsbf |
| for (i=0; i<N1; i++) { | N1 | | |
| text__byte | | 8 | uimsbf |
| } | | | |
| for (i=0; i<N2; i++) { | | | |
| extension__descriptor( ) | | | |
| } | | | |
| } | | | |

descriptor_tag: An 8-bit field indicating the type of this descriptor. A unique value is assigned, which indicates an alternative program descriptor distinguishable from other descriptors defined in the MPEG-2 system standard or the broadcast standard based thereon.

descriptor_length: An 8-bit field indicating a length of this descriptor in bytes. It indicates a length in bytes counted from the next byte after this field to the last byte of the descriptor.

alternate_program_id: An 8-bit field corresponding to an alternative program identifier. If alternative programs described by the alternate_program_descriptor are different from each other, different alternate_program_ids are assigned. If a viewer is guided to watch an alternative program, before the live broadcast is actually started, then guide information may be periodically transmitted several times for the same alternative program. In this case, the same alternate_program_id is continuously used. If the values of 0 to 255 are used all, the already used values may be re-used.

reserved: A field reserved for future use. A value thereof is filled with 0x7F.

just_alternate_flag: It indicates that the content included in this descriptor is for an alternative package to a package (regardless of whether it is for live broadcast) including this descriptor. If a value of this flag is '1', future_flag is no meaning, and text_length is '0' at all times.

future_flag: A 1-bit field indicating whether content included in this descriptor is for an alternative program that a viewer will watch in advance, or for an alternative program that a viewer will continuously watch after an end of the current program. If a value of this field is ' 1', it indicates an alternative program that a viewer will watch in advance, and if a value of this field is '0', indicates an alternative program that a viewer will continuously watch.

time_to_future_live_program: A 16-bit field that indicates the time in seconds, until which the live broadcast will be started through this program channel, if future_flag is '1'. If a value of this field is 0x0000, it indicates that the live broadcast is immediately started, or was started already. This value may be used during the return from the Internet live broadcast service, which is an alternative package, to the live program of a broadcast channel. If a value of this field is '0xFFFF', it indicates that it is not possible to know the time, until which the live broadcast will be started through this channel. This value is used when the viewer does not know when the live broadcast will be started through this program channel, even though the viewer watches as alternate broadcast the event, which is to be broadcasted live through this program channel, using the Internet live broadcast service.

MMT_general_location_info( ): General location reference information defined in MMT, and its content is as shown in Table 5.

text_length: An 8-bit field indicating the number of the following text_bytes. A value of 0x00 indicates that there is no string describing an alternative program.

text_byte: Bytes constituting a string that describes an alternative program. This field does not include null bytes at the end.

extension_descriptor( ): Descriptors that deliver additional information and correspond to options. An 8-bit tag value for distinguishing the type of the descriptors is uniquely identified only in the alternate_package_descriptor, and is the first byte of these descriptors. This field is followed by an 8-bit value indicating a length of a descriptor.

An alternate_program_descriptor is the same in content as the 16-bit alternate_package_descriptor except that descriptor_tag and descriptor_length have a size of 8 bytes and a value of the descriptor_tag is allocated as an MPEG-2 descriptor tag value. In other words, alternate_program_descriptor is obtained by modifying alternate_package_descriptor as an MPEG-2 descriptor.

The alternate_program_descriptor is used for the similar purpose as the alternate_package_descriptor, but it is included in the descriptor syntax loop following the program_info_length of the MPEG-2 PMT. In the case of MPEG-2 TS based MPEG-DASH, this descriptor may be directly included in a PMT.

A language_descriptor is used to specify the language, for an asset, a language used for which needs to be specified. For example, for an asset corresponding to audios, subtitles, commentary channels, and the like, the language used to create them needs to be specified. The language_descriptor may be included in a PPT_descriptor syntax loop or an asset_descriptor syntax loop of a PPT, and in a SMT_S_descriptor syntax loop or an asset_descriptor syntax loop within an SMT-S. If this descriptor is included in a PPT_descriptor or SMT_S_descriptor syntax loop, a language of all assets of the package is specified by this descriptor. If this descriptor is included in an asset_descriptor syntax loop, a language of the asset is specified by this descriptor. The content of a descriptor, to which the asset is applied, precedes the content of a descriptor which is applied to all assets of the package. In this specification, for convenience of description, the syntax of the language_descriptor is shown in Table 21, and semantics of each field are included in the following.

TABLE 21

| Syntax | Value | No. of Bits | Format |
|---|---|---|---|
| language_descriptor( ) { | | | |
| descriptor_tag | | 16 | uimsbf |
| descriptor_length | | 16 | uimsbf |
| ISO_639_language_code | | 8*3 | uimsbf |
| } | | | |

descriptor_tag: A unique value indicating a type of this descriptor.

descriptor_length: A length in bytes counted from the next byte after this field to the last byte of this descriptor.

ISO_639_language_code: A 3-byte ISO 639 language identifier.

A clock_reference_descriptor is used to inform a receiver of a relationship between an encoder clock and an MMT system clock for media synchronization. In MMT, UTC in the form of a Network Time Protocol (NTP) is used as a system clock, and an asset encoder clock allows assets to use different clocks. The clock used by an asset encoder is identified by clock_reference_id.

The clock_reference_descriptor needs to be periodically delivered in a period of 100 ms or less, and is delivered in a separate asset. In this specification, for convenience of description, the syntax of the clock_reference_descriptor is shown in Table 22, and semantics of each field are included in the following.

TABLE 22

| Syntax | Value | No. of Bits | Format |
|---|---|---|---|
| clock_reference_descriptor( ) { | | | |
| descriptor_tag | | 16 | uimsbf |
| descriptor_length | | 16 | uimsbf |
| clock_reference_id | | 8 | uimsbf |
| encoder_clock_sample | | 42 | uimsbf |
| system_clock_time | | 64 | uimsbf |
| } | | | |

descriptor_tag: A unique value indicating a type of this descriptor.

descriptor_length: A length in bytes counted from the next byte after this field to the last byte of this descriptor.

clock_reference_id: An identifier of a clock used by an asset encoder.

encoder_clock_sample: A value of an asset clock sample corresponding to system_clock_time following this field.

system_clock_time: An MMT system_clock_time corresponding to the encoder_clock_sample preceding this field. This is a UTC time value in the form of NTP.

Figure 5:
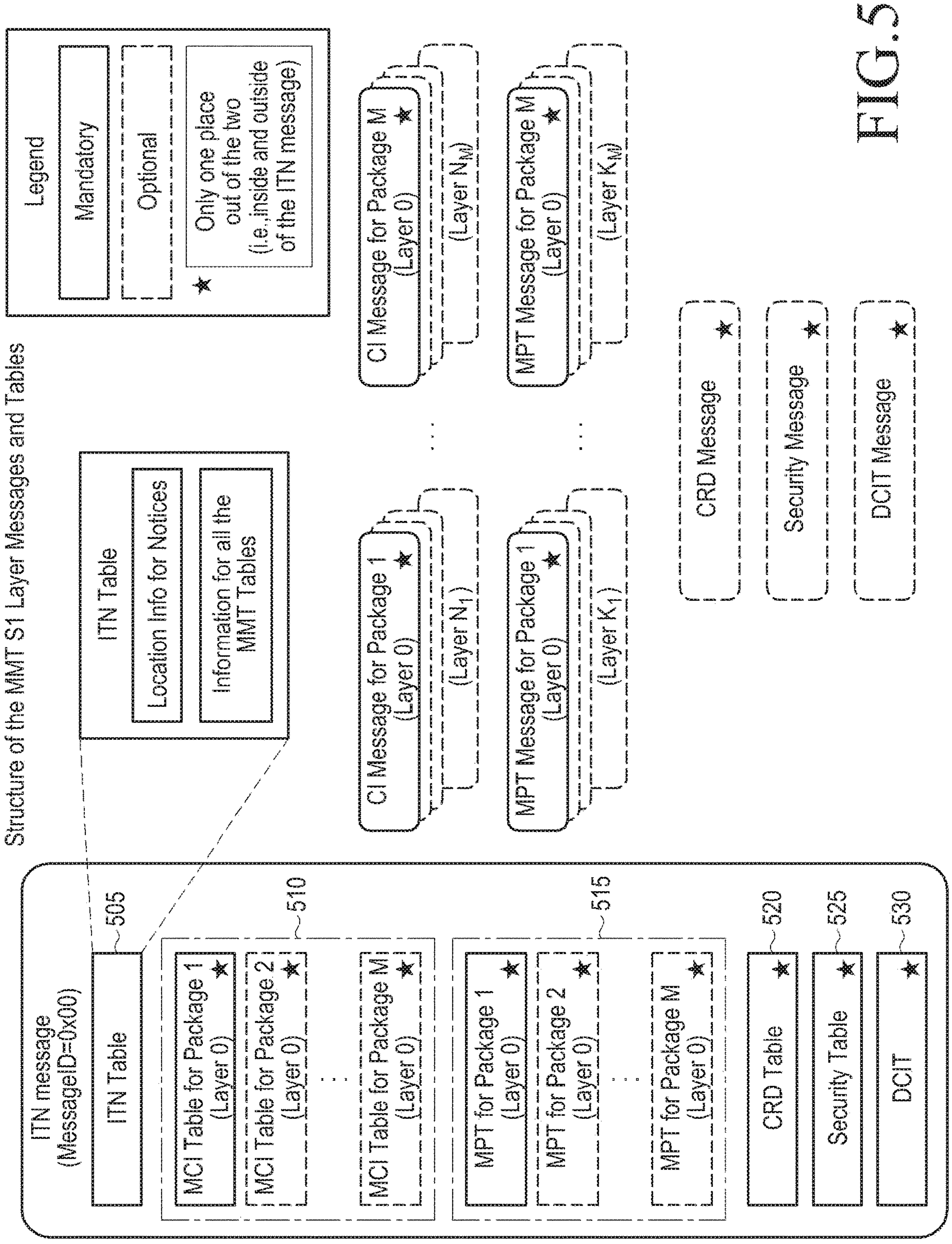
FIG. 5 shows a structure of S1 signaling according to an exemplary embodiment of the present invention.

FIG. 5 shows a structure of S1 signaling according to an exemplary embodiment of the present invention.

Six S1-layer messages according another exemplary embodiment of the present invention may be summarized as follows.

(1) Messages for Information on Tables and Notices (ITN): This message carries the ITN table and optionally other tables that can be used for the fast access to a package. The role of ITN is similar to MPEG-2 PAT but has other MMT specific functionalities. The ITN table includes the full information on all other S1 tables. In addition, ITN has the information about the notice reception. The typical example of Notices is emergency warning, urgent notification, and the like.

(2) Messages for MMT Composition Information (MCI): This message carries the MMT CI. It carries full CI as well as layered CIs.

(3) Messages for Clock Reference Descriptors (CRD): This message carries clock reference information to be used for mapping between MMT system clock (e.g., the NTP clock) and any other clock (e.g., MPEG-2 or MPEG-4 clock).

(3) Messages for Security Information: This message carries security information used for MMT content protection. The security system is DRM, Downloadable DRM and Downloadable Conditional Assess System (D-CAS) information.

(4) Messages for MMT Package Table (MPT): This message carries an MMT Package Table (MPT). A complete or Layer-0 MPT corresponds to an MMT package. It includes a globally unique identifier of the package, the location of the MMT Composition Information (MCI) and a complete or partial (possibly if layered MPTs are used) list of the MMT assets that belong to the MMT package. Also it includes package type, package name, short description of the package, parental rating, the language of audio, the language of text, target user profile, required device capability, package policy such as recording permission and fast play permission, and the like. The role of MPT is similar to MPEG2 PMT but has the more functionalities for MMT purpose.

(5) Messages for Device Capability Information Table (DCIT): This message carries Device Capability Information Table (DCIT). Device Capability information presents the required and/or recommended device capability for MPEG Media content consumption.

Also the following 3 descriptors are defined:

(1) Language descriptor (2) Clock reference descriptor (3) D-CAS descriptor

1. Syntax and Semantics of S1 Layer Messages, Tables, and Descriptors 1.1 Message for Information on Tables and Notices (ITN)

This message carries the ITN table (505). The role of ITN is similar to MPEG-2 PAT but has other MMT specific functionalities. The ITN table includes the full information on all other S1 tables.

In addition, ITN has the information about the notice reception. The typical example of Notices is emergency warning, urgent notification, and the like.

The ITN message (e.g., the message that includes the ITN table) may optionally include one or more MMT Package Tables (MPTs) that corresponds to an MMT package. A MPT includes a globally unique identifier of the package, the location of the MMT Composition Information (MCI) and a complete or partial (possibly if layered MPTs are used) list of the MMT assets that belong to the MMT package. In addition, a MPT includes package type, package name, short description of the package, parental rating, the language of audio, the language of text, target user profile, required device capability, package policy such as recording permission and fast play permission, and the like.

If an ITN message includes only one MPT, then the media delivery service provides the users only one package at any fixed time instance. If an ITN table includes multiple MPTs that have any overlaps in timeline, then the media delivery service provides the users multiple packages at any fixed time instance. If an ITN table includes multiple MPTs that have no time-overlap and the corresponding packages are associated with the same logical channel, then the media delivery service provides the users multiple packages in a sequential time order.

The S layer message with MessageID=0x00 must include the ITN table. Also the payload_id of the asset path in an IP application data flow that carries the S layer message with MessageID=0x00 is fixed with '0x0000'. A receiver must read and parse the ITN message before it reads any other messages.

The ITN message is normally being periodically transmitted with a very short period (e.g., 500 ms in a broadcast environment) in order to guarantee short power-up delay or low zapping time.

1.1.1 ITN Message Syntax and Semantics

The syntax of the ITN message is defined in Table 23 and the semantics of its syntax elements are provided below Table 23. The method of syntax definition is based on that of MPEG-2 Systems standard (ISO/IEC 13818-1). The loop count not indication in the "value" column can be deduced from the length of the table. The same rule applies to other tables in this specification.

TABLE 23

| Syntax | Value | No. of bits | Format |
|---|---|---|---|
| ITN_message ( ) { | | | |
| message_id | 0x00 | 8 | uimsbf |
| version | | 8 | uimsbf |
| length | | 16 | uimsbf |
| extension_fields { | | | |
| ITN_transmission_info { | | | |
| reserved | '1111 | 7 | bslbf |
| start_time_flag | 111' | 1 | bslbf |
| if (start_time_flag ==1) { | | | |
| start_time | | 64 | uimsbf |
| } | | | |
| retransmission_period | | 16 | uimsbf |
| } | | | |
| number_of_tables | | 8 | uimsbf |
| for (i=0; i<N1; i++) { | N1 | | |
| table_id | | 8 | uimsbf |
| table_version | | 8 | uimsbf |
| table_length | | 16 | uimsbf |
| } | | | |
| } | | | |
| Payload { | | | |
| for (i=0; i<N1; i++) { | | | |
| table( ) | | | |
| } | | | |
| } | | | |
| } | | | |

message_id: It indicates the type of S layer messages. The length of this field is 8 bits. An ITN message has fixed message_id with value 0x00.

version: It indicates the version of S Layer messages. MMT client can determine whether the received S layer message is new or not. This field is useful in case in which the S layer messages are repeatedly transmitted via broadcasting network. The length of this field is 8 bits.

length: It indicates the length of S1 Layer Messages. The length of this field is 16 bits. It indicates the length of the ITN message counted in bytes starting from the next field to the last byte of the ITN message. The value '0' is never used for this field.

start_time_flag: If this flag is '1', the optional syntax element start_time is used.

start_time: It indicates the starting time, in NTP, of the ITN message transmission.

retransmission_period: It indicates the retransmission time of this ITN message. The unit of retransmission_period is 10 ms.

number_of_tables: It indicates the number_of_tables included in this ITN message.

table_id: It indicates the table identifier of the table included in this ITN message. It is a copy of the table_id field in the table included in the payload of this ITN message.

table_version: It indicates the version of the table included in this ITN message. It is a copy of the version field in the table included in the payload of this ITN message.

table_length: It indicates the length of the table included in this ITN message. It is a copy of the length field in the table included in the payload of this ITN message. The actual length of the table is table_length+4.

table( ): It indicates an S layer table. The tables in the payload appear in the same order as the table ids in the extension field.

1.1.2 ITN Table Syntax and Semantics

The syntax of the ITN table is defined in Table 24 and the semantics of its syntax elements are provided below Table 24.

TABLE 24

| Syntax | Value | No. of bits | Format |
|---|---|---|---|
| ITN_table ( ) { | | | |
| table_id | | 8 | uimsbf |
| version | | 8 | uimsbf |
| length | | 16 | uimsbf |
| notice_reception { | | | uimsbf |
| reserved | '1111 | 7 | bslbf |
| method_flag | 111' | 1 | bslbf |
| if(method_flag == 0) { | | | |
| IP_broadcast_delivery { | | | |
| MMT_general_location_info( ) | | | |
| } | | | |
| } else { | | | |
| poll_URL { | | | |
| MMT_general_location_info( ) | | | |
| } | | | |
| poll_period | | 16 | uimsbf |
| } | | | |
| } | | | |
| information_table_info { | | | |
| number_of_tables | N1 | 8 | uimsbf |
| for (i=0; i<N1; i++) { | | | |
| information_table_id | | 8 | uimsbf |
| information_table_version | | 8 | uimsbf |
| package_path_number | | 16 | uimsbf |
| location { | | | |
| MMT_general_location_info( ) | | | |
| } | | | |
| reserved | '1111 | 6 | bslbf |
| second_location_flag | 11' | 1 | bslbf |
| table_filter_code_flag | | 1 | bslbf |
| if (second_location_flag == 1) { | | | |
| second_location { | | | |
| MMT_general_location_info( ) | | | |
| } | | | |
| } | | | |
| if (table_filter_code_flag == 1) { | | | |
| table_filter_codes { | | | |
| number_of_languages_for_table_filter_codes | | 8 | uimsbf |
| for (j=0; j<N2; j++) { | N2 | | |
| table_filter_code_language | | 24 | uimsbf |
| number_of_table_filter_codes | | 8 | |
| for (k=0; k<N3; k++) { | N3 | | |
| table_filter_code_length | | 8 | uimsbf |
| for (m=0; m<N4; m++) { | N4 | | |
| table_filter_code_byte | | 8 | uimsbf |
| } | | | |
| } | | | |
| } | | | |
| } | | | |
| } | | | |
| } | | | |
| } | | | |
| reserved | | 7 | bslbf |
| private_extension_flag | '1111 | 1 | bslbf |
| if (private_extension_flag == 1) | 111' | | |
| private_extension { | | | |
| } | | | |
| } | | | |
| } | | | |

table_id: Table identifier of the ITN table.

version: Version of the ITN table. The newer version overrides the older one as soon as it has been received.

length: The length of the ITN table counted in bytes starting from the next field to the last byte of the ITN table. The value '0' is never used for this field.

method_flag: It indicates the notice reception method. If this flag is '0', the notices are delivered by IP broadcast delivery. If this flag is '1', the notices are delivered through interaction channel. For IP broadcast delivery, an IP address and a port number are provided. For delivery over interaction channel, provided is a URL through which a client can poll notices over an interaction channel.

MMT_general_location_info( ): General location reference information for MMT defined in Table 25 of section 1.1.3. The actual location depends on the syntax element location_type within MMT_general_location_info( ).

MMT_general_location_info( ) for IP broadcast delivery: For IP_broadcast_delivery, only location_type=0x14 and 0x15 are allowed.

MMT_general_location_info( ) for poll URL: For poll_URL, only location_type=0x0E is allowed.

poll_period: While polling the notices, a client or a receiver is expected to poll the notice URL, poll_URL, every poll_period seconds.

number_of_tables: It indicates the number of information tables whose information is provided in this ITN table.

information_table_id: The identifier of the information table whose information is provided in this ITN table. The table_id of ITN table never appear here.

information_table_version: The version of the information table whose information is provided in this ITN table.

package_path_number: An identifier for a logical channel to which the information table belongs. The broadcaster assigns the identifier uniquely to a logical channel within a physical channel. The value ‘0’ has a special usage and is not used as an identifier. If this field is ‘0’, then the information table is channel-independent (e.g., the information table has service-wide information).

MMT_general_location_info( ) for location: Address where a client gets the information table. Only location_type=0x0F~0x13 are allowed.

second_location_flag: If this flag is set, an alternative address at which a client gets the information table is provided.

table_filter_code_flag: If this flag is set, one or more table filter codes are provided. A table filter code specifies the criteria for grouping tables. If several criteria for grouping are present at the same time, all those grouping criteria apply to the information table.

MMT_general_location_info( ) for second_location: an alternative address where a client gets the information table. Only 0x0F~0x13 are allowed.

number_of_table_filter_codes: The number of table filter codes for the information table.

language_for_all_table_filter_codes: The language of all the table_filter_codes that follow immediately. The language code is a 3-byte language identifier defined in ISO 639 standard.

table_filter_code_language_flag: If this flag is ‘1’, the language for the table_filter_code that follows is separately specified and overrides the language provided by the language_for_all_table_filter_codes. The language code is a 3-byte language identifier defined in ISO 639 standard.

table__filter_code_language: The language of the table_filter_code that follows immediately. The language code is a 3-byte language identifier defined in ISO 639 standard.

table__filter_code_length: Byte length of the table_filter_code.

table__filter_code_byte: A byte in the table_filter_code.

private_extension_flag: If this flag is ‘1’, the private extension is present.

private_extension( ): A syntax element group serving as a container for proprietary or application-specific extensions.

1.1.3 MMT_General_Location_Info( ) Syntax Element Group

An MMT_general_location_info( ) syntax element group is used to provide location information. The syntax of the MMT_general_location_info( ) is defined in Table 25 and the semantics of its syntax elements are provided below Table 25.

TABLE 25

| Syntax | Value | No. of bits | Format |
|---|---|---|---|
| MMT__general__location__info( ) { | | | |
| location__type | | 8 | uimsbf |
| if (location__type == 0x00) { | | | |
| } else if (location__type == 0x01) { | | | |
| payload__id | | 16 | uimsbf |
| } else if (location__type == 0x02) { | | | |
| } else if (location__type == 0x03) { | | | |
| ipv4__src__addr | | 32 | uimsbf |
| ipv4__dst__addr | | 32 | uimsbf |
| dst__port | | 16 | uimsbf |
| payload__id | | 16 | uimsbf |
| } else if (location__type == 0x04) { | | | |
| } else if (location__type == 0x05) { | | | |
| ipv6__src__addr | | 32 | uimsbf |
| ipv6__dst__addr | | 32 | uimsbf |
| dst__port | | 16 | uimsbf |
| payload__id | | 16 | uimsbf |
| } else if (location__type == 0x06) { | | | |
| } else if (location__type == 0x07) { | | | |
| reserved | ‘111’ | 3 | bslbf |
| MPEG__2__PID | | 13 | uimsbf |
| } else if (location__type == 0x08) { | | | |
| MPEG__2__transport__stream__id | | 16 | uimsbf |
| reserved | ‘111’ | 3 | bslbf |
| MPEG__2__PID | | 13 | uimsbf |
| } else if (location__type == 0x09) { | | | |
| network__id | | 16 | uimsbf |
| MPEG__2__transport__stream__id | | 16 | uimsbf |
| reserved | ‘111’ | 3 | bslbf |
| MPEG__2__PID | | 13 | uimsbf |
| } else if (location__type == ‘0x0A’) { | | | |
| byte__offset | | 16 | uimsbf |
| length | | 16 | uimsbf |
| } else if (location__type == ‘0x0B’) { | | | |
| prefix__index | | 8 | uimsbf |
| URL__length | N1 | 8 | uimsbf |
| For (i=0; i<N1; i++) { | | | |
| URL__byte | | 8 | uimsbf |
| } | | | |
| } else if (location__type == ‘0x0C’) { | | | |
| prefix__index | | 8 | uimsbf |
| URL__length | N2 | 8 | uimsbf |
| For (i=0; i<N2; i++) { | | | |
| URL__byte | | 8 | uimsbf |
| } | | | |
| byte__offset | | 16 | uimsbf |
| length | | 16 | uimsbf |
| } else if (location__type == ‘0x0D’) { | | | |
| } else if (location__type == ‘0x0E’) { | | | |
| URL__length | N3 | 16 | uimsbf |
| For (i=0; i<N1; i++) { | | | |
| URL__byte | | 8 | uimsbf |
| } | | | |
| } else if (location__type == ‘0x0F’) { | | | |
| } else if (location__type == ‘0x10’) { | | | |
| message__id | | 8 | uimsbf |
| } else if (location__type == ‘0x11’) { | | | |
| payload__id | | 16 | uimsbf |
| message__id | | 8 | uimsbf |
| } else if (location__type == ‘0x12’) { | | | |
| ipv4__src__addr | | 32 | uimsbf |
| ipv4__dst__addr | | 32 | uimsbf |
| dst__port | | 16 | uimsbf |
| payload__id | | 16 | uimsbf |
| message__id | | 8 | uimsbf |
| } else if (location__type == ‘0x13’) { | | | |
| ipv6__src__addr | | 64 | uimsbf |
| ipv6__dst__addr | | 64 | uimsbf |
| dst__port | | 16 | uimsbf |
| payload__id | | 16 | uimsbf |
| message__id | | 8 | uimsbf |
| } else if (location__type == ‘0x14’) { | | | |
| ipv4__addr | | 32 | uimsbf |
| port | | 16 | uimsbf |

TABLE 25-continued

| Syntax | Value | No. of bits | Format |
|---|---|---|---|
| } else if (location_type == '0x15') { | | | |
| ipv6_addr | | 64 | uimsbf |
| port | | 16 | uimsbf |
| } else { | | | |
| } | | | |
| } | | | |

location_type: This field indicates the type of the location information as defined in Table 26.

TABLE 26

| Value | Meaning |
|---|---|
| 0x00 | Reserved |
| 0x01 | An asset path in the same IP application data flow as the one that carries the data structure to which this MMT_general_location_info( ) belongs |
| 0x02 | Reserved |
| 0x03 | An asset path in an IP version 4 application data flow |
| 0x04 | Reserved |
| 0x05 | An asset path in an IP version 6 application data flow |
| 0x06 | Reserved |
| 0x07 | An elementary stream (ES) in the same MPEG-2 TS as the one that carries the data structure to which this MMT_general_location_info( ) belongs |
| 0x08 | An elementary stream (ES) in a MPEG-2 TS in the same broadcast network as the one that carries the data structure to which this MMT_general_location_info( ) belongs |
| 0x09 | An elementary stream (ES) in a MPEG-2 TS in a broadcast network |
| 0x0A | A data block specified by a byte rage in the same data structure or the same file as the one to which this MMT_general_location_info( ) belongs. A byte range is composed of the byte offset of the first byte of the data block from the first byte of a data structure or a file and the length of the data block in bytes. |
| 0x0B | A URL with prefix |
| 0x0C | A byte range in the file addressed by a URL |
| 0x0D | A location information previously stored (e.g., pushed into a memory stack) within a receiver |
| 0x0E | A URL |
| 0x0F | The same S layer message that includes the MMT_general_location_info( ) |
| 0x10 | An S layer message delivered in the same asset path as the one that carries the data structure to which this MMT_general_location_info( ) belongs. |
| 0x11 | An S layer message delivered in an asset path in the same IP application data flow as the one that carries the data structure to which this MMT_general_location_info( ) belongs. |
| 0x12 | An S layer message delivered in an asset path in an IP version 4 application data flow |
| 0x13 | An S layer message delivered in an asset path in an IP version 6 application data flow |
| 0x14 | An IP version 4 application data flow |
| 0x15 | An IP version 6 application data flow |
| 0x16~0xFF | reserved for future use |

payload_id: Asset path identifier unique within an IP application data flow.

ipv4_src_addr: IP version 4 source address of an IP application data flow.

ipv4_dst_addr: IP version 4 destination address of an IP application data flow.

dst_port: Destination port number of an IP application data flow.

ipv6_src_addr: IP version 6 source address of an IP application data flow.

ipv6_dst_addr: IP version 6 destination address of an IP application data flow.

network_id: broadcast network identifier that carries MPEG-2 TS.

MPEG_2_transport_stream_id: MPEG-2 TS identifier.

MPEG_2_PID: PID of MPEG-2 TS packet.

prefix index: An index to a prefix list that are defined before this syntax element group. If this field is 0xFF, no prefix is used.

URL_length: Length in bytes of a URL. The terminating null (0x00) shall not be counted.

URL_byte: A byte data in a URL. The terminating null (0x00) shall not be included.

byte_offset: A byte_offset from the first byte of a file.

length: Length in bytes.

message_id: S layer message identifier.

ipv4_addr: IP version 4 address of an IP application data flow.

ipv6_addr: IP version 6 address of an IP application data flow.

1.2 Messages for MMT Composition Information (CI)

MMT Composition Information (CI) is delivered by a CI message for the out of band signaling. A CI message can deliver either a complete CI or a Layered CIs. When a layered CI is delivered, it is highly recommended to carry a Layer-0 CI by the ITN message to reduce the required time for package consumption in broadcast scenario. When Layer-0 CI is carried within the ITN message as reference number 510, the CI shall be encapsulated in an MCI (MMT Composition Information) table before included in the ITN message.

When the layered CI mechanism is employed, Layer-N CIs, where N is not 0, are usually carried in the CI messages with varied repetition period and with different message identifiers.

1.2.1 CI Message Syntax and Semantics

The syntax of the CI message is defined in Table 27 and the semantics of its syntax elements are provided below Table 27.

TABLE 27

| Syntax | Value | No. of bits | Format |
|---|---|---|---|
| CI_message ( ) { | | | |
| message_id | | 8 | uimsbf |
| version | | 8 | uimsbf |
| length | | 16 | uimsbf |
| extension_fields { | | | |
| CI_transmission_info { | | | |
| reserved | '1111 | 7 | bslbf |
| start_time_flag | 111' | 1 | bslbf |
| if (start_time_flag ==1) { | | | |
| start_time | | 64 | uimsbf |
| } | | | |
| retransmission_period | | 16 | uimsbf |
| } | | | |
| } | | | |
| Payload { | | | |
| for (i=0; i<N1; i++) { | | | |
| CI_byte | | 8 | uimsbf |
| } | | | |
| } | | | |
| } | | | |

message_id: It indicates the type of S layer messages. The length of this field is 8 bits. An S layer message shall have a distinct message_id if it carries CI at a distinct CI layer for a distinct package.

version: It indicates the version of S Layer messages. MMT client can determine whether the received S layer message is new or not. This field is useful in case in which the S layer messages are repeatedly transmitted via broadcasting network. The length of this field is 8 bits.

length: It indicates the length of S Layer Messages. The length of this field is 16 bits. It indicates the length of the CI message counted in bytes starting from the next field to the last byte of the CI message. The value '0' is never used for this field.

start_time_flag: If this flag is '1', the optional syntax element start_time is used.

start_time: It indicates the starting time, in NTP, of the CI message transmission.

retransmission_period: It indicates the retransmission time of this CI message. The unit of retransmission_period is 10 ms.

CI_byte: A byte in CI.

1.2.2 MCI Table Syntax and Semantics

The syntax of the MCI table is defined in Table 28 and the semantics of its syntax elements are provided below Table 28. The MCI table shall be used only for a complete CI or a Layer-0 CI.

TABLE 28

| Syntax | Value | No. of bits | Format |
|---|---|---|---|
| MCI_table ( ) { | | | |
| table_id | | 8 | uimsbf |
| version | | 8 | uimsbf |
| length | | 16 | uimsbf |
| for (i=0; i<N1; i++) { | | | |
| CI_byte | | 8 | uimsbf |
| } | | | |
| } | | | |

table_id: Table identifier of the MCI table.

version: Version of the MCI table. The newer version overrides the older one as soon as it has been received.

length: The length of the MCI table counted in bytes starting from the next field to the last byte of the MCI table. The value '0' is never used for this field.

CI_byte: A byte in CI.

1.3 Messages for Clock Reference Descriptors (CRD)

Clock reference descriptors defined in section 1.7.2 are delivered within a CRD message. One CRD message may include multiple clock reference descriptors.

When clock reference descriptors are carried within the ITN message, the clock reference descriptors shall be encapsulated with a table structure called CRD table 520.

1.3.1 CRD Message Syntax and Semantics

The syntax of the CRD message is defined in Table 29 and the semantics of its syntax elements are provided below Table 29.

TABLE 29

| Syntax | Value | No. of bits | Format |
|---|---|---|---|
| CRD_message ( ) { | | | |
| message_id | | 8 | uimsbf |
| version | | 8 | uimsbf |
| length | | 16 | uimsbf |
| extension_fields { | | | |
| CRD_transmission_info { | | | |
| reserved | '1111 | 7 | bslbf |
| start_time_flag | 111' | 1 | bslbf |
| if (start_time_flag ==1) { | | | |
| start_time | | 64 | uimsbf |
| } | | | |
| retransmission_period | | 16 | uimsbf |
| } | | | |
| } | | | |
| Payload { | | | |
| for (i=0; i<N1; i++) { | | | |
| clock_reference_descriptor( ) | | | |
| } | | | |
| } | | | |
| } | | | |

message_id: It indicates the type of S layer messages. The length of this field is 8 bits.

version: It indicates the version of S Layer messages. MMT client can determine whether the received S layer message is new or not. This field is useful in case in which the S layer messages are repeatedly transmitted via broadcasting network. The length of this field is 8 bits.

length: It indicates the length of S Layer Messages. The length of this field is 16 bits. It indicates the length of the CI message counted in bytes starting from the next field to the last byte of the CI message. The value '0' is never used for this field.

start_time_flag: If this flag is '1', the optional syntax element start_time is used.

start_time: It indicates the starting time, in NTP, of the CRD message transmission.

retransmission_period: It indicates the retransmission time of this CRD message. The unit of retransmission_period is 10 ms.

clock_reference_descriptor( ): It is defined in 1.7.2

1.3.2 CRD Table Syntax and Semantics

The syntax of the CRD table is defined in Table 30 and the semantics of its syntax elements are provided below Table 30. The MCI table shall be used only for a complete CI or a Layer-0 CI.

TABLE 30

| Syntax | Value | No. of bits | Format |
|---|---|---|---|
| CRD_table ( ) { | | | |
| table_id | | 8 | uimsbf |
| version | | 8 | uimsbf |
| length | | 16 | uimsbf |
| for (i=0; i<N1; i++) { | | | |
| clock_reference_descriptor( ) | | | |
| } | | | |
| } | | | |

table_id: Table identifier of the CDR table.

version: Version of the CRD table. The newer version overrides the older one as soon as it has been received.

length: The length of the CRD table counted in bytes starting from the next field to the last byte of the CRD table. The value '0' is never used for this field.

clock_reference_descriptor( ): It is defined in section 1.7.2

1.4 Messages for Security

Security information is delivered within a Security message or an ITN message. When security information is carried within an ITN message as reference number 525, it shall be encapsulated in a security table before included in the ITN message.

1.4.1 Security Message Syntax and Semantics

The syntax of the security message is defined in Table 31 and the semantics of its syntax elements are provided below Table 31.

TABLE 31

| Syntax | Value | No. of bits | Format |
|---|---|---|---|
| Security_message ( ) { | | | |
| message_id | | 8 | uimsbf |
| version | | 8 | uimsbf |
| length | | 16 | uimsbf |
| extension_fields { | | | |
| Security_transmission_info { | | | |
| reserved | '1111 | 7 | bslbf |
| start_time_flag | 111' | 1 | bslbf |
| if (start_time_flag ==1) { | | | |
| start_time | | 64 | uimsbf |
| } | | | |
| retransmission_period | | 16 | uimsbf |
| } | | | |
| } | | | |
| Payload { | | | |
| for (i=0; i<N1; i++) { | | | |
| Security_descriptor( ) | | | |
| } | | | |
| } | | | |
| } | | | |

message_id: It indicates the type of S layer messages. The length of this field is 8 bits.

version: It indicates the version of S Layer messages. MMT client can determine whether the received S layer message is new or not. This field is useful in case in which the S layer messages are repeatedly transmitted via broadcasting network. The length of this field is 8 bits.

length: It indicates the length of S Layer Messages. The length of this field is 16 bits. It indicates the length of the CI message counted in bytes starting from the next field to the last byte of the CI message. The value '0' is never used for this field.

start_time_flag: If this flag is '1', the optional syntax element start_time is used.

start_time: It indicates the starting time, in NTP, of the Security message transmission.

retransmission_period: It indicates the retransmission time of this Security message. The unit of retransmission_period is 10 ms.

Security_descriptor( ): It is defined in section 1.7.3.

1.4.2 Security Table Syntax and Semantics

The syntax of the Security table is defined in Table 32 and the semantics of its syntax elements are provided below Table 32.

TABLE 32

| Syntax | Value | No. of bits | Format |
|---|---|---|---|
| Security_table ( ) { | | | |
| table_id | | 8 | uimsbf |
| version | | 8 | uimsbf |
| length | | 16 | uimsbf |
| for (i=0; i<N1; i++) { | | | |
| Security_descriptor( ) | | 8 | uimsbf |
| } | | | |
| } | | | |

table_id: Table identifier of the security table.

version: Version of the security table. The newer version overrides the older one as soon as it has been received.

length: The length of the security table counted in bytes starting from the next field to the last byte of the security table. The value '0' is never used for this field.

security_descriptor( ): It is defined in section 1.7.2.

1.5 Messages for MPT (MMT Package Table)

MMT Package Table (MPT) delivers all the information on a single package. The S layer message that carries an MPT is called "an MPT message". MPT may be included in the ITN message with other tables as reference number 515 or carried in a separate MPT message.

For layered delivery of a package which has layered CI, an MPT can be partitioned into multiple layered MPTs. The Layer-0 MPT is the base MPT and if layered delivery is not used, only Layer-0 MPT is delivered. In the latter case, the Layer-0 MPT is a complete MPT. MPTs at different layers shall have different table identifiers (table ids). In this standard, we assigned 8 different values for MPT table_id so that we can have up to 8 layers of MPT. The smaller value of MPT table_id, the nearer the MPT layer to the base MPT.

It is highly recommended to carry a complete MPT or a Layer-0 MPT, if layered MPT is used, within the ITN message in order to reduce package acquisition time in broadcast scenario.

1.5.1 MPT Message Syntax and Semantics

The syntax of the MPT message is defined in Table 33 and the semantics of its syntax elements are provided below Table 33. An MPT message carries only one complete MPT or one Layer-N MPT if MPT layering is employed.

TABLE 33

| Syntax | Value | No. of bits | Format |
|---|---|---|---|
| MPT_message ( ) { | | | |
| message_id | | 8 | uimsbf |
| version | | 8 | uimsbf |
| length | | 16 | uimsbf |
| extension_fields { | | | |
| MPT_transmission_info { | | | |
| reserved | '1111 | 7 | bslbf |
| start_time_flag | 111' | 1 | bslbf |
| if (start_time_flag ==1) { | | | |
| start_time | | 64 | uimsbf |
| } | | | |
| retransmission_period | | 16 | uimsbf |
| } | | | |
| } | | | |
| Payload { | | | |
| MMT_package_table( ) | | | |
| } | | | |
| } | | | |

message_id: It indicates the type of S layer messages. The length of this field is 8 bits.

version: It indicates the version of S Layer messages. MMT client can determine whether the received S layer message is new or not. This field is useful in case in which the S layer messages are repeatedly transmitted via broadcasting network. The length of this field is 8 bits.

length: It indicates the length of S Layer Messages. The length of this field is 16 bits. It indicates the length of the MPT message counted in bytes starting from the next field to the last byte of the MPT message. The value '0' is never used for this field.

start_time_flag: If this flag is '1', the optional syntax element start_time is used.

start_time: It indicates the starting time, in NTP, of the MPT message transmission.

retransmission_period: It indicates the retransmission time of this MPT message. The unit of retransmission_period is 10 ms. If layered MPTs are used, the retransmission_period of a higher layer MPT is usually longer that those of MPT layers below the higher layer MPT.

MMT_package_table( ): It is defined in section 1.5.2.

1.5.2 MPT Syntax and Semantics

The syntax of the MPT( ) is defined in Table 34 and the semantics of its syntax elements are provided below Table 34.

TABLE 34

| Syntax | Value | No. of bits | Format |
|---|---|---|---|
| MMT_package_table( ) { | | | |
| table_id | | 8 | uimsbf |
| version | | 8 | uimsbf |
| length | | 16 | uimsbf |
| MMT_package_id | | 64 | uimsbf |
| If (table_id == Layer0_MPT_id) { | | | |
| MPT_descriptors { | | | |
| MPT_descriptors_length | N1 | 16 | uimsbf |
| for (i=0; i<N1; i++) { | | | |
| MPT_descriptors_byte | | 8 | uimsbf |
| } | | | |
| } | | | |
| package_type | | 8 | uimsbf |
| package_name { | | | |
| number_of_languages_for_name | | 8 | uimsbf |
| for (j=0; j<N2; j++) { | | | |
| language_code_for_name | | 24 | uimsbf |
| name_length | N3 | 8 | uimsbf |
| for (j=0; j<N3; j++) { | | | |
| name_byte | | 8 | uimsbf |
| } | | | |
| } | | | |
| } | | | |
| package_description { | | | |
| number_of_languages_for_description | N4 | 8 | uimsbf |
| for (j=0; j<N4; j++) { | | | |
| language_code_for_description | | 24 | uimsbf |
| description_length | N5 | 8 | uimsbf |
| for (j=0; j<N5; j++) { | | | |
| description_byte | | 8 | uimsbf |
| } | | | |
| } | | | |
| } | | | |
| audio_languages { | | | |
| number_of_audio_languages | | 8 | uimsbf |
| for (j=0; j<N6; j++) { | | | |
| audio_language_code | | 24 | uimsbf |
| } | | | |
| } | | | |
| text_languages { | | | |
| number_of_text_languages | | 8 | uimsbf |
| for (j=0; j<N7; j++) { | | | |
| text_language_code | | 24 | uimsbf |
| } | | | |
| } | | | |
| target_user_profiles { | | | |
| number_of_target_user_profiles | | 8 | uimsbf |
| for (j=0; j<N8; j++) { | | | |
| target_user_profile_id | | 8 | uimsbf |
| } | | | |
| } | | | |
| required_device_capability_profiles { | | | |
| number_of_required_device_capability_profiles | | 8 | uimsbf |
| for (j=0; j<N9; j++) { | | | |
| required_device_capability_profile_id | | 8 | uimsbf |
| } | | | |
| } | | | |
| reserved | ‘111’ | 3 | bslbf |
| parental_guidance_flag | | 1 | bslbf |
| package_policy { | | | |
| recording_flag | | 1 | bslbf |
| fast_play_flag | | 1 | bslbf |
| } | | | |
| clock_reference_flag | | 1 | bslbf |
| protection_scheme_id_flag | | 1 | bslbf |
| if (clock_reference_flag == 1) { | | | |
| clock_reference_id | | 8 | uimsbf |
| reserved | ‘1111 111’ | 7 | bslbf |
| timescale_flag | | 1 | bslbf |
| if (time_scale_flag == 1) { | | | |
| timescale | | 32 | uimsbf |
| } | | | |
| } | | | |
| if (protection_scheme_id_flag == 1) { | | | |
| protection_scheme_id | | 8 | uimsbf |
| } | | | |
| } | | | |

TABLE 34-continued

| Syntax | Value | No. of bits | Format |
|---|---|---|---|
| CI_location { | | | |
| MMT_general_location_info( ) | | | |
| } | | | |
| number_of_assets | | 8 | uimsbf |
| for (i=0; i<N6; i++) { | N6 | | |
| asset_type | | 8 | uimsbf |
| asset_id | | 16 | uimsbf |
| reserved | | 6 | bslbf |
| asset_clock_reference_flag | '1111 11' | 1 | bslbf |
| asset_protected_flag | | 1 | bslbf |
| if (asset_clock_reference_flag == 1) { | | | |
| asset_clock_rererence_id | | 8 | uimsbf |
| reserved | | 7 | bslbf |
| asset_timescale_flag | '1111 | 1 | bslbf |
| if (asset_time_scale_flag == 1) { | 111' | | |
| asset_timescale | | 32 | uimsbf |
| } | | | |
| } | | | |
| if (asset_protected_flag == 1) { | | | |
| reserved | | 7 | bslbf |
| asset_protection_scheme_id_flag | | 7 | bslbf |
| if (asset_protection_scheme_id_flag == 1) { | '111 | | |
| asset_protection_scheme_id | 1111' | 8 | uimsbf |
| } | | | |
| } | | | |
| asset_location { | | | |
| MMT_general_location_info( ) | | | |
| } | | | |
| asset_descriptors { | | | |
| asset_descriptors_length | | 16 | uimsbf |
| for (k=0; k<N10; k++) { | | | |
| asset_descriptors_byte | N10 | 8 | uimsbf |
| } | | | |
| } | | | |
| } | | | |
| } | | | |

table_id: Table identifier of the MPT. MPTs at different layers shall have different table identifiers (table_ids). For the MPT table_id, eight different values are assigned. Among the 8 MPT table_ids, the smallest is the table_id for a complete MTP or a Layer-0 MPT when layered MPTs are used. For the remaining MPT tablee_ids, smaller value means lower layer MPT.

version: Version of the MPT. The newer version overrides the older one as soon as it has been received.

length: The length of the MPT counted in bytes starting from the next field to the last byte of the ITN table. The value '0' is never used for this field.

MMT_package_id: A globally unique identifier of the MMT package.

MPT_descriptors_length: Length of the descriptor syntax loop. The length is counted from the next field to the end of the descriptor syntax loop. Several descriptors can be inserted in this syntax loop.

MPT_descriptors_byte: one byte in the descriptors loop.

package_type: It indicates the type of the package. Allowed values are in Table 35.

TABLE 35

| Value | Meaning |
|---|---|
| 0x00 | Unspecified |
| 0x01 | basic Video |
| 0x02 | basic Audio |
| 0x03 | rich media |
| 0x04 | Ebook |
| 0x05 | Application |

TABLE 35-continued

| Value | Meaning |
|---|---|
| 0x06 | Text |
| 0x07 | HTML |
| 0x08~0xFF | reserved for future use |

package_name: name of the package, possibly in multiple languages. The language code is a 3-byte language identifier defined in ISO 639 standard. The first language in the list is default.

package_description: textual description of the package, possibly in multiple languages. The language code is a 3-byte language identifier defined in ISO 639 standard. The first language in the list is default.

audio_languages: audio language(s) used in the package. The language code is a 3-byte language identifier defined in ISO 639 standard. The first language in the list is default.

text_languages: text language(s) used in the package. The language code is a 3-byte language identifier defined in ISO 639 standard. The first language in the list is default.

target_user_profiles: profile(s) of the users at whom the package is targeted.

required_device_capability_profiles: profile(s) of the required device capability for the package consumption.

parental_guidance_flag: If this flag is '1', a receiver shall not present what is decoded from this package until it can make sure from the rating information (whose delivery method is currently not specified in this standard) that it is allowed to show the content against what is set by a viewer for child protection. If this flag is '0', a receiver just presents what is decoded from this package without checking the rating.

recording_flag: If this flag is '1', a receiver can store this package into its internal storage for later use.

fast_play_flag: If this flag is '1', a receiver let viewers command a fast play of this package.

clock_reference_flag: If this flag is '0', clock_reference_id is not present and by default the MMT system clock is the NTP clock (e.g., the time base of all the assets in this package is the NTP clock). If this flag is '1', clock_reference_id field is included in the following.

protection_scheme_id_flag: If this flag is '1', protection_scheme_id field is included in the following.

clock_reference_id: Clock reference identifier. This field is used to reference the clock delivered by a clock_reference_descriptor( ) as the default time base of all assets in this package. Value 0 is not permitted for this field. There are two placeholders for a clock reference identifier field in the MPT syntax. While one (this field) applies to all assets in this package, the other applies only to the asset entry in the syntax loop. If both fields are included in the MPT syntax, the latter takes precedence.

timescale_flag: If this flag is '1', timescale field is included in the following.

timescale: time unit for all timestamps used for all assets in this package expressed in a number of units in one second. A default value is 90,000. There are two placeholders for a timescale field in the MPT syntax. While one (this field) applies to all assets in this package, the other applies only to the asset entry in the syntax loop. If both fields are included in the MPT syntax, the latter takes precedence.

protection_scheme_id: This field indicates the protection scheme used for all assets in this package. There are two placeholders for a protection scheme identifier field in the MPT syntax. While one (this field) applies to all assets in this package, the other applies only to the asset entry in the syntax loop. If both fields are included in the MPT syntax, the latter takes precedence. The value of this field is one of the DCAS_types specified by D-CAS descriptors in 1.7.3.

protection_scheme_id_flag: If this flag is '1', protection_scheme_id field is included in the following.

MMT_general_location_info( ) for the CI location: General location reference information for MMT defined in Table 25 in 1.1.3. Only location_type=0x0F~0x13 are allowed for a CI location.

number_of_assets: The number of assets in this MPT.

asset_type: Type of an asset. This field is similar to, but an extension of the stream_type defined in MPEG-2 PMT.

asset_id: Asset identifier. In CI, an asset_id is used to make reference to an asset. The asset_id defined in CI is globally unique. This field is a short alias for the globally unique asset_identifier. The aliasing is performed automatically by mapping the order of asset appearance in the List of Assets (LoA) in CI. If CI layering is employed, the aliasing is performed within an ordered concatenation of all the LoAs form Layer 0 to Layer N. In the asset information syntax loop within an MPT, the asset_id aliases shall appear incrementally.

asset_clock_reference_flag: If this flag is '1', asset_clock_ reference_id field is included in the following syntax.

asset_clock_reference_id: Clock reference identifier for the asset. This field is used to reference the clock delivered by a clock_reference_descriptor( ) as the time base of the asset. If this field is '0', the NTP clock is used for the asset. If this field is not '0', the value of this field is one of the clock_reference_id values provided by the clock reference descriptors.

asset_timescale_flag: If this flag is '1', asset_timescale field is included in the following syntax.

asset_timescale: time unit for all timestamps used for the asset expressed in a number of units in one second. A default value is 90,000.

asset_protected_flag: If this flag is '1', this asset is protected.

asset_protection_scheme_id_flag: If this flag is '1', asset_protection_scheme_id field is included in the following syntax.

MMT_general_location_info( ) for the asset location: General location reference information for MMT defined in Table 25 in 1.1.3. Only location_type=0x03, 0x05, and 0x07-0x0D are allowed for an asset location.

asset_descriptors_length: Number of bytes counted from the next field to the end of the asset descriptors syntax loop.

asset_descriptors_byte: A byte in asset descriptors.

1.6 Messages for DCIT (Device Capability Information Table)

DCIT provides the device capability information. The DCIT 530 may be included in the ITN message.

1.6.1 DCIT Message Syntax and Semantics

The syntax of the DCIT message is defined in Table 36 and the semantics of its syntax elements are provided below Table 36.

TABLE 36

| Syntax | Value | No. of bits | Format |
|---|---|---|---|
| DCIT_message ( ) { | | | |
| message_id | | 8 | uimsbf |
| version | | 8 | uimsbf |
| length | | 16 | uimsbf |
| extension_fields { | | | |
| DCIT_transmission_info { | | | |
| reserved | '1111 | 7 | bslbf |
| start_time_flag | 111' | 1 | bslbf |
| if (start_time_flag ==1) { | | | |
| start_time | | 64 | uimsbf |
| } | | | |
| retransmission_period | | 16 | uimsbf |
| } | | | |
| } | | | |
| Payload { | | | |
| DCIT( ) | | | |
| } | | | |
| } | | | |

message_id: It indicates the type of S layer messages. The length of this field is 8 bits.

version: It indicates the version of S Layer messages. MMT client can determine whether the received S layer message is new or not. This field is useful in case in which the S layer messages are repeatedly transmitted via broadcasting network. The length of this field is 8 bits.

length: It indicates the length of S Layer Messages. The length of this field is 16 bits. It indicates the length of the MPT message counted in bytes starting from the next field to the last byte of the DCIT message. The value '0' is never used for this field.

start_time_flag: If this flag is '1', the optional syntax element start_time is used.

start_time: It indicates the starting time, in NTP, of the DCIT message transmission.

retransmission_period: It indicates the retransmission time of this DCIT message. The unit of retransmission_period is 10 ms. If layered MPTs are used, the retransmission_period of a higher layer MPT is usually longer that those of MPT layers below the higher layer MPT.

MMT_package_table( ): It is defined in section 1.5.2.

DCIT( ): It is defined in section 1.6.2.

1.6.2 DCIT Syntax and Semantics

The syntax and semantics of the DCIT is defined in Table 37.

TABLE 37

| Name | Description | Data Type | Level |
|---|---|---|---|
| DCIT | Device Capability Information Table<br>Includes the following elements:<br>Video<br>Audio<br>DownloadFile<br>Rich Media | | 0 |
| List of Package or Asset | List of Package or Asseclientt that recommend the capabilities in DCIT | | 0 |
| Video | Video codec capability related requirements<br>Includes the following elements:<br>MIMEType, CODEC and Complexity<br>Complexity | | 1 |
| MIMEType | MIME Media type of the video.<br>If the complexities that can be derived from the MIMEType element and the codec parameters below differ from the parameters defined under the 'Complexity' element below, then the parameters defined under the 'Complexity' element SHALL take priority.<br>Includes the following attribute: Codec | | 2 |
| codec | The codec parameters for the associated MIME Media type. If the MIME type definition specifies mandatory parameters, these MUST be included in this string. Optional parameters including information that can be used to determine as to whether the client can make use of the media SHOULD be included in the string. | | 3 |
| Complexity | The complexity the video decoder has to deal with.<br>It is RECOMMENDED that this element is included if the complexity indicated by the MIME type and codec parameters differs from the actual complexity.<br>Includes the following elements:<br>Bitrate<br>Resolution<br>MinimumBufferSize | | 2 |
| Bitrate | The total bit-rate of the video stream.<br>Includes the following attributes:<br>average<br>maximum | | 2 |
| average | The average bit-rate in kbit/s | | 3 |
| maximum | The maximum bit-rate in kbit/s | | 3 |
| Resolution | The resolution of the video.<br>Includes the following attributes:<br>horizontal<br>vertical<br>temporal | | 2 |
| horizontal | The horizontal resolution of the video in pixels. | | 3 |
| vertical | The vertical resolution of the video in pixels. | | 3 |
| temporal | The maximum temporal resolution in frames per second. | | 3 |
| MinimumBufferSize | The minimum decoder buffer size needed to process the video content in kbytes. | | 3 |
| Audio | The audio codec capability.<br>Includes the following elements:<br>MIMEType<br>Complexity | | 1 |
| MIMEType | MIME Media type of the audio.<br>If the complexities that can be derived from the MIMEType element and the codec parameters below differ from the parameters defined under the 'Complexity' element below, then the parameters defined under the 'Complexity' element SHALL take priority.<br>Includes the following attribute:<br>codec | | 2 |
| codec | The codec parameters for the associated MIME Media type. If the MIME type definition specifies mandatory parameters, these MUST | | 3 |

TABLE 37-continued

| Name | Description | Data Type | Level |
|---|---|---|---|
| | be included in this string. Optional parameters including information that can be used to determine as to whether the client can make use of the media SHOULD be included in the string. | | |
| Complexity | The complexity the audio decoder has to deal with. It is RECOMMENDED that this element is included if the complexity indicated by the MIME type and codec parameters differs from the actual complexity. Includes the following elements: Bitrate MinimumBufferSize | | 2 |
| Bitrate | The total bit-rate of the audio stream. Includes the following attributes: average maximum | | 3 |
| average | The average bit-rate in kbit/s | | 3 |
| maximum | The maximum bit-rate in kbit/s | | 3 |
| MinimumBufferSize | The minimum decoder buffer size needed to process the audio content in kbytes. | | 3 |
| DownloadFile | The required capability for the download files. Includes the following elements: MIMEType | | 1 |
| MIMEType | Assuming a download service includes a set of files with different MIME types which together make up the service, the client must support all of these MIME types in order to be able to present the service to the user. Includes the following attribute: codec | | 2 |
| codec | The codec parameters for the associated MIME Media type. If the file's MIME type definition specifies mandatory parameters, these MUST be included in this string. Optional parameters including information that can be used to determine as to whether the client can make use of the file SHOULD be included in the string. | | 3 |
| PrivateExt | An element serving as a container for proprietary or application-specific extensions. | | 1 |
| <proprietary elements> | Proprietary or application-specific elements that are not defined in this specification. These elements may further include sub-elements or attributes. | | 1 |

1.7 Descriptors

The descriptors related with S layer tables are defined here.

1.7.1 Language Descriptor

A language descriptor is used to specify a language for a media asset such as an audio, a commentary channel, a subtitle, etc. A language descriptor can be included in the MPT_descriptors syntax loop or in the asset_descriptors syntax loop in an MPT. If a language descriptor is included in the MPT_descriptors syntax loop, it specifies the language of all the assets in the package. If a language descriptor is included in the asset_descriptors syntax loop in an MPT, it specifies the language of the asset. The language descriptor included in the asset_descriptors syntax loop in an MPT takes precedence over the language descriptor included in the MPT_descriptors syntax loop in an MPT.

The syntax of language_descriptor( ) is defined in Table 38 and the semantics of its syntax elements are provided below Table 38.

TABLE 38

| Syntax | Value | No. of bits | Format |
|---|---|---|---|
| language_descriptor( ) { | | | |
| descriptor_tag | | 16 | uimsbf |
| descriptor_length | | 16 | uimsbf |
| ISO_639_language_code | | 8*3 | uimsbf |
| } | | | |

descriptor_tag: A tag value indicating the type of a descriptor.

descriptor_length: Length in bytes counted from the next byte after this field to the last byte of the descriptor.

ISO_639_language_code: A 3-byte ISO 639 language identifier.

1.7.2 Clock Reference Descriptor

A clock reference descriptor is used to specify the relationship between the encoder clock for media synchronization and the MMT system clock. The UTC in Network Time Protocol (NTP) format is used as the MMT system clock time. MMT allows that different clocks are used for different assets. A clock used in an asset encoder is specified by clock_reference_id.

Clock_reference_descriptors shall be periodically carried in the clock reference message with a short period (e.g., 100 ms).

The syntax of clock_reference_descriptor( ) is defined in Table 39 and the semantics of its syntax elements are provided below Table 39.

TABLE 39

| Syntax | Value | No. of bits | Format |
|---|---|---|---|
| clock_reference_descriptor( ) { | | | |
| descriptor_tag | | 16 | uimsbf |
| descriptor_length | | 16 | uimsbf |
| clock_reference_id | | 8 | uimsbf |
| encoder_clock_sample | | 42 | uimsbf |
| MMT_system_clock_time | | 64 | uimsbf |
| } | | | |

descriptor_tag: A tag value indicating the type of a descriptor.

descriptor_length: Length in bytes counted from the next byte after this field to the last byte of the descriptor.

clock_reference_id: The identifier of the media clock used by an asset encoder. The value '0' is reserved for other purposes and not used for a clock_reference_id.

encoder_clock_sample: A sampled value of the media clock used by an asset encoder that corresponds to the following MMT system_clock_time.

MMT_system_clock_time: A UTC time value in NTP format that corresponds to the preceding encoder_clock_sample.

1.7.3 Security Descriptor

A Security descriptor is used to specify a security system that can be used to protect MMT Asset or Package.

Securtiy_descriptor shall be periodically carried in the Security message or in the ITN message.

The syntax of security_descriptor( ) is defined in Table 40 and the semantics of its syntax elements are provided below Table 40.

TABLE 40

| Syntax | Value | No. of bits | Format |
|---|---|---|---|
| security_descriptor( ) { | | | |
| descriptor_tag | | 16 | uimsbf |
| descriptor_length | | 16 | uimsbf |
| Security_type | | 8 | uimsbf |
| If (security_type = access control){ | | | |
| Solution | | | |
| Access_control_server_address { | | | |
| } | | | |
| } | | | |
| Else if (security_type = DRM){ | | | |
| Solution | | | |
| DRM_server_address { | | | |
| } | | | |
| } | | | |
| Else if(security_type = DCAS){ | | | |
| DCAS_server_address { | | | |
| } | | | |
| } | | | |
| Else if(security_type = DDRM){ | | | |
| DDRM_server_address { | | | |
| } | | | |
| } | | | |
| } | | | |

descriptor_tag: A tag value indicating the type of a descriptor.

descriptor_length: Length in bytes counted from the next byte after this field to the last byte of the descriptor.

Security_type: Type of security solution. It indicates a solution for access control, Digital Right Management, Downloadable CAS or Downloadable DRM.

Solution: it shows what security solution used for access control, DRM, DCAS or DDRM Access_control_server_address: the address of Access Control Security Solution server where a client is to be authenticated and authorized.

DRM_server_address: the address of DRM Solution server at which a client is to be authenticated and authorized.

DCAS_server_address: the address of DCAS server at which a client can download DCAS SW after the authentication and authorization.

DDRM_server_address: the address of DDRM server at which a client can download DDRM SW after the authentication and authorization.

Figure 6:
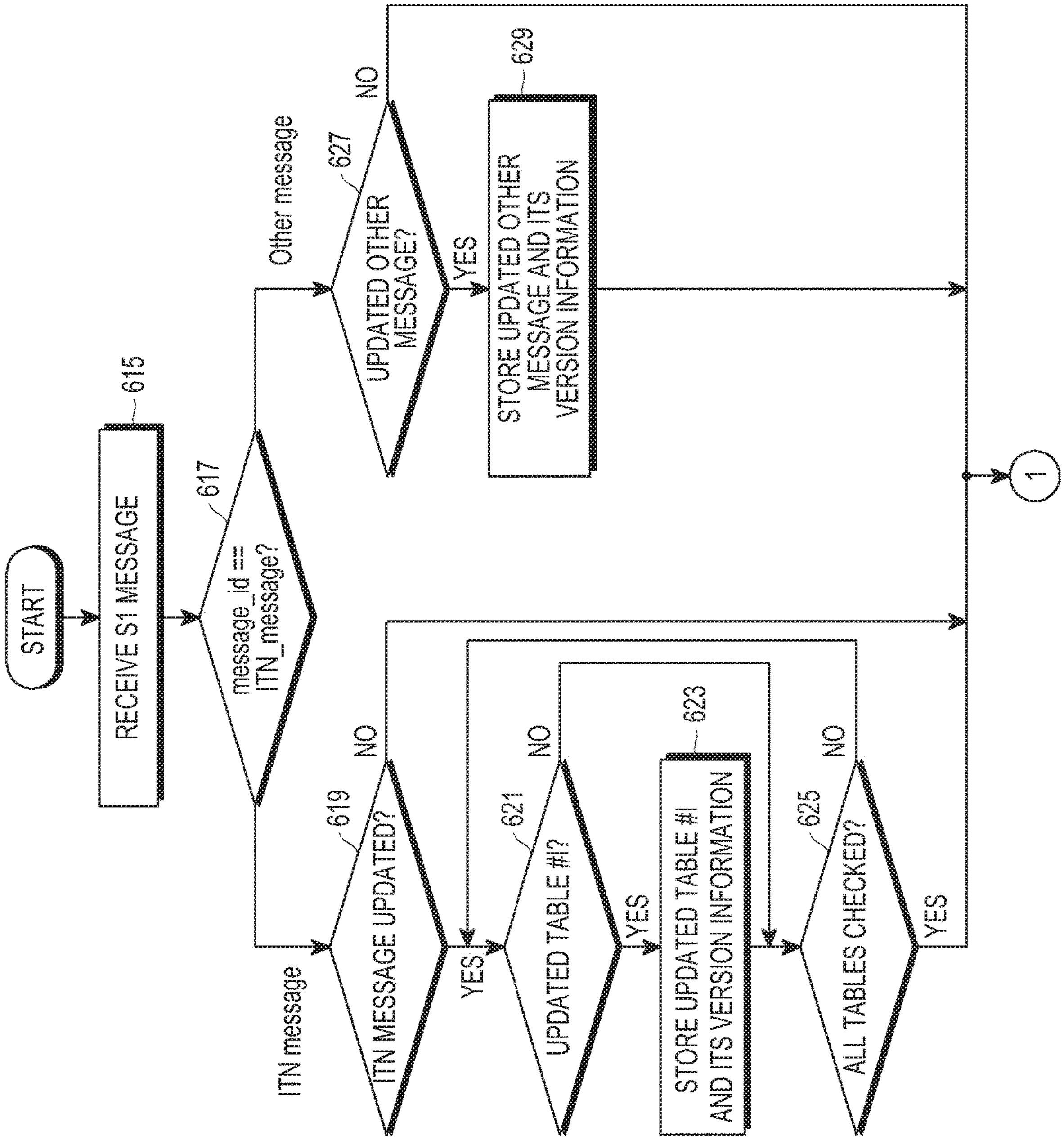
FIGS. 6 and 7 show an operation of receiving multimedia in a receiver according to an exemplary embodiment of the present invention.
Figure 7:
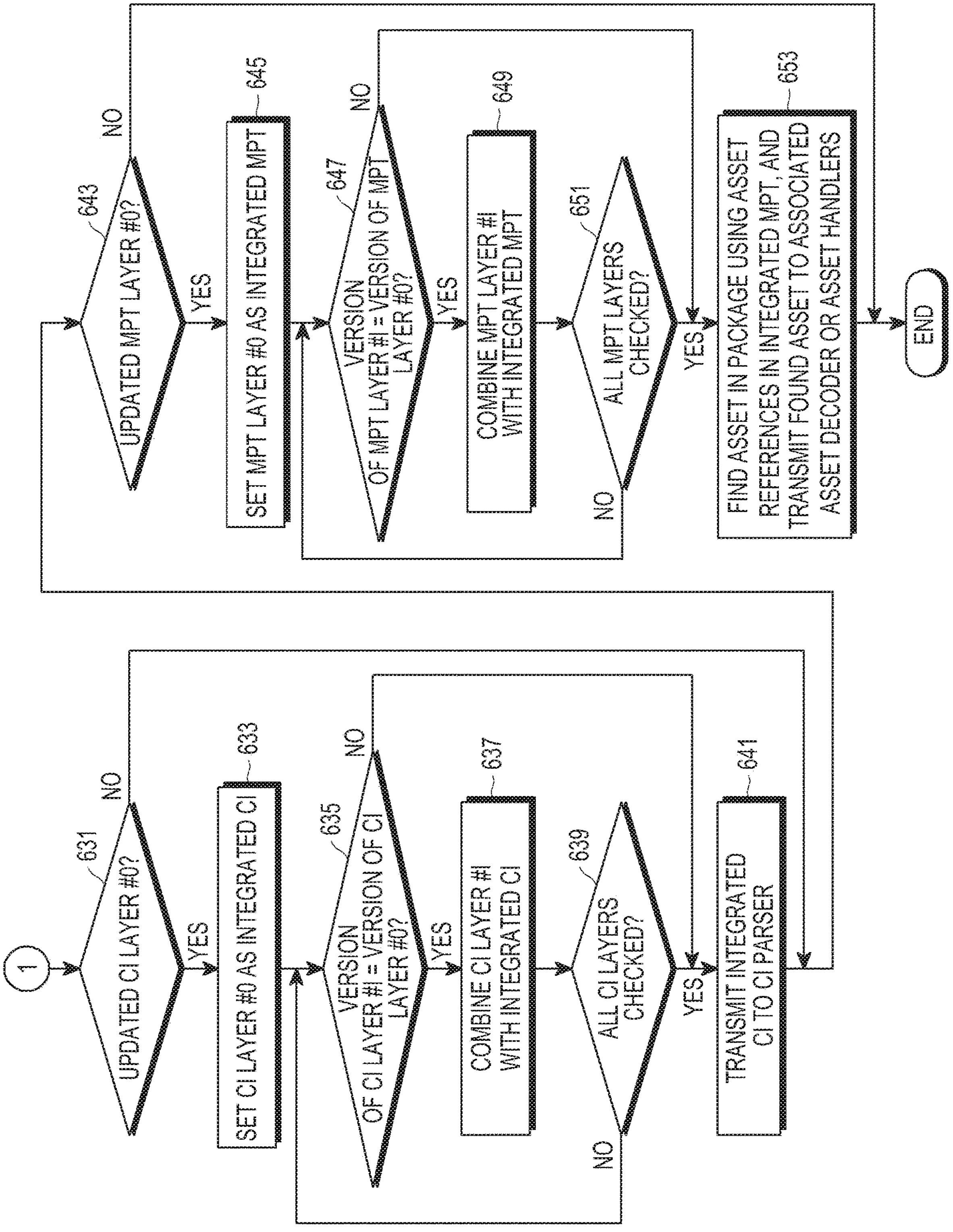

FIGS. 6 and 7 show an operation of receiving multimedia in a receiver according to an exemplary embodiment of the present invention.

Referring to FIGS. 6 and 7, a receiver receives an S1 message transmitted on the current channel in step 615. The S1 message is a message for managing all functions required for consumption of MMT assets and MMT items.

In step 617, the receiver determines based on a message ID whether the message is an ITN message included in the found S1 message. If the message is other message rather than the ITN message, the receiver determines in step 627 whether the other message is updated. If the message is an updated other message, the receiver stores the updated other message and version information of the updated other message in its memory in step 629. In contrast, if the message is not an updated other message, then the receiver proceeds to step 631.

If it is determined in step 617 that the message is an ITN message, the receiver determines in step 619 whether the ITN message included in the found S1 message is updated, based on version information. If the ITN message is updated, the receiver determines in step 621 whether at least one table #i in the ITM message is updated. If so, the receiver stores the updated at least one table #i and its version information in its memory in step 623 and proceeds to step 625. If at least one table #i in the ITM message is not updated, then the receiver proceeds to step 625. Similarly, if the ITN message is determined to not be updated in step 619, then the receiver proceeds to step 625.

In step 625, the receiver checks all tables. The receiver then proceeds to step 631.

In step 631, the receiver determines in step 631 whether a CI layer #0 is updated.

If the CI layer #0 is updated, the receiver sets the CI layer #0 as an integrated CI in step 633. Thereafter, the receiver proceeds to step 635. If the CI layer #0 is not updated, then the receiver proceeds to step 643.

In step 635, the receiver determines whether a CI layer #i is the same in version as the CI layer #0. If they are not the same, then the receiver proceeds to step 641. In contrast, if they are the same, the receiver combines the CI layer #i with the integrated CI in step 637. Thereafter, the receiver proceeds to step 639. In step 639, the receiver determines whether it has checked all CI layers. After completion of the check, the receiver transmits the integrated CI to a CI parser in step 641. For example, if the receiver determines that it has checked all CI layers in step 639, then the receiver proceeds to step 641. In contrast, if the receiver determines that it has not checked all CI layers in step 639, then the receiver returns to step 635.

In step 643, the receiver determines whether an MPT layer #0 is updated. If the MPT layer #0 is not updated, then the receiver ends the process. In contrast, if the MPT layer

#0 is updated, the receiver sets the MPT layer #0 as an integrated MPT in step 645. Thereafter, the receiver proceeds to step 647.

In step 647, the receiver determines whether an MPT layer #i is the same in version as the MPT layer #0. If the layers are not the same, then the receiver proceeds to step 653. In contrast, if they are the same, the receiver combines the MPT layer #i with the integrated MPT in step 649. Thereafter, the receiver proceeds to step 651. In step 651, the receiver determines whether it has checked all MPT layers. After completion of the check, the receiver finds an asset in a package using asset references in the integrated MPT and transmits the found asset to associated asset decoder or asset handlers, in step 653. For example, if the receiver determines that it has checked all MPT layers in step 651, then the receiver proceeds to step 653. In contrast, if the receiver determines that it has not checked all MPTS layers in step 651, then the receiver proceeds to step 647.

Figure 8:
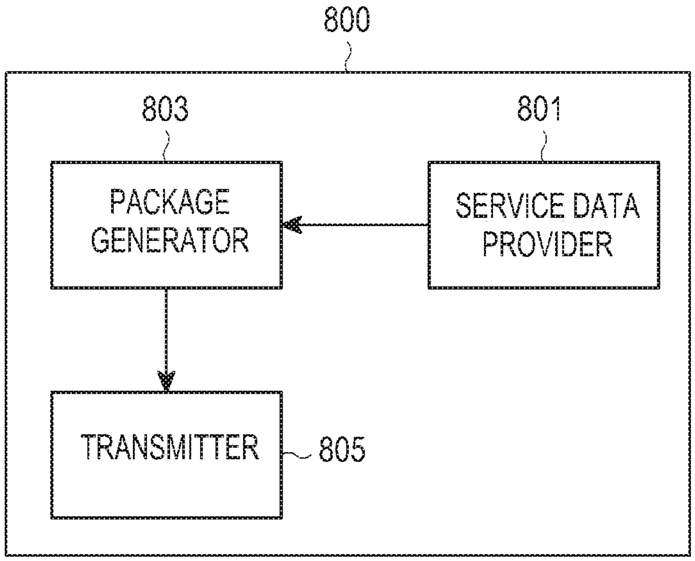
FIG. 8 shows a structure of a transmission apparatus according to an exemplary embodiment of the present invention.

FIG. 8 shows a structure of a transmission apparatus according to an exemplary embodiment of the present invention.

A service server 800, as an example of a transmission apparatus, includes a service data provider 801, a package generator 803, and a transmitter 805. Although not shown in the drawing, it will be apparent to those of ordinary skill in the art that the transmission apparatus or the service server includes a controller for controlling its components to perform an operation of exemplary embodiments of the present invention.

The service data provider 801 has all service services.

The package generator 803 generates packages using the tables described with reference to FIGS. 3 and 5.

The transmitter 805 transmits the generated packages to a terminal.

Also, the transmitter 805 may transmit the generated packages to the terminal over the networks having two different types of physical characteristics: the broadcast network and the broadband network.

Figure 9:
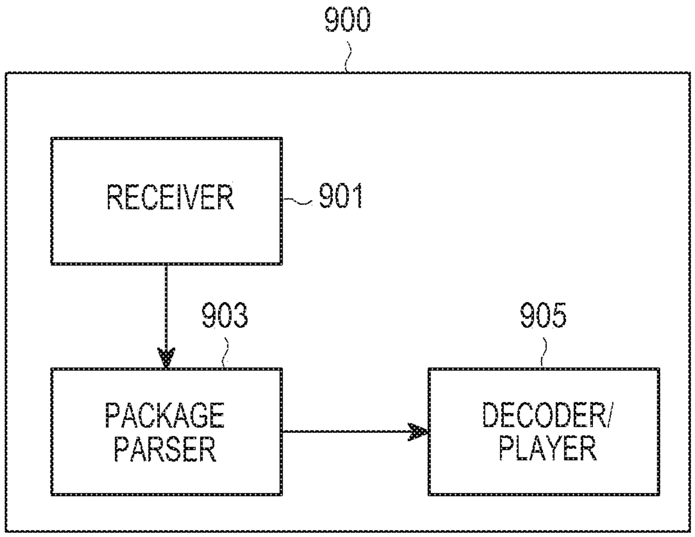
FIG. 9 shows a structure of a reception apparatus according to an exemplary embodiment of the present invention.

FIG. 9 shows a structure of a reception apparatus according to an exemplary embodiment of the present invention.

The reception apparatus may be, for example, a terminal. However, the reception apparatus is not limited thereto.

The reception apparatus 900 include a receiver 901, a package parser 903, and a decoder/player 905. Although not shown in the drawing, it will be apparent to those of ordinary skill in the art that the reception apparatus or the terminal includes a controller for controlling its components to perform an operation of exemplary embodiments of the present invention.

The receiver 901 receives packages which are generated using the tables described with reference to FIGS. 3 and 5 according to an exemplary embodiment of the present invention.

The package parser 903 parses components of the received packages.

The decoder/player 905 decodes and plays content based on the parsed package components.

Although not illustrated in the drawings, data may be recorded, stored and played based on the packages which are generated according to an exemplary embodiment of the present invention. Each package is stored in storage media (e.g., Compact Disk (CD), Digital Versatile Disc (DVD), Database DB, Universal Serial Bus (USB), etc.) to include MMT assets, Configuration information, Composition information, Transport Characteristics, Package Identification Information, Asset list Information, Rights Management Information, Transport Timeline Information, and the like. During playback, content may be played by parsing package components. When stored and played using storage media, content may be stored and played more easily by replacing the URL described in the exemplary embodiment with storage location information (e.g., memory address, and the like).

As is apparent from the foregoing description, by applying a format for providing service specific information proposed by exemplary embodiments of the present invention, a service provider may provide specification information for a service that the service provider itself provides, so a receiver may allow a viewer to easily select his/her desired broadcast content using the service specific information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving a packet by a receiving entity, the method comprising:

receiving, by the receiving entity, a packet including a packet payload comprising a signaling message including signaling information for a package of multimedia content; and processing, by the receiving entity, the package of multimedia content based on the signaling information, wherein the signaling message comprises:

a signaling message payload including a plurality of tables, the plurality of tables comprising at least two tables related to the package and a base table providing information for the at least two tables, identification information of the signaling message, length information of the signaling message, version information of the signaling message, and extension information of the signaling message, the extension information including information on a number of the plurality of tables, wherein the base table comprises:

location information of a table in the at least two tables, and flag information indicating whether the base table includes alternative location information of the table in the at least two tables, and wherein the at least two tables comprise:

a first table providing information for at least one asset included in the package, and a second table providing device capability information required for consumption of the package.

2. The method of claim 1, wherein the first table includes asset type information indicating a type of an asset of the at least one asset and an asset clock reference flag indicating whether a clock reference identifier for the asset is included in the first table.

3. The method of claim 1, wherein if the flag information indicates that the base table includes the alternative location information, the signaling message further comprises the alternative location information providing the alternative address for obtaining the table of the at least two tables.

* * * * *